United States Patent
Wang et al.

(10) Patent No.: US 12,133,229 B2
(45) Date of Patent: Oct. 29, 2024

(54) TECHNIQUES FOR SIDELINK CONTROL SIGNALING

(71) Applicant: QUALCOMM Incorporated, San Diego, CA (US)

(72) Inventors: Xiaojie Wang, Hillsborough, NJ (US); Piyush Gupta, Bridgewater, NJ (US); Junyi Li, Franklin Park, NJ (US); Jing Sun, San Diego, CA (US); Xiaoxia Zhang, San Diego, CA (US); Tao Luo, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 257 days.

(21) Appl. No.: 17/148,341

(22) Filed: Jan. 13, 2021

(65) Prior Publication Data

US 2022/0225297 A1   Jul. 14, 2022

(51) Int. Cl.
  *H04W 72/23*   (2023.01)
  *H04W 72/21*   (2023.01)
(52) U.S. Cl.
  CPC .......... *H04W 72/23* (2023.01); *H04W 72/21* (2023.01)
(58) Field of Classification Search
  None
  See application file for complete search history.

(56) References Cited

U.S. PATENT DOCUMENTS

| | | | |
|---|---|---|---|
| 2016/0066337 A1* | 3/2016 | Sartori | H04W 72/0406 370/329 |
| 2016/0073408 A1* | 3/2016 | Sartori | H04W 72/0453 370/329 |
| 2020/0112982 A1* | 4/2020 | Li | H04L 1/1819 |
| 2020/0280966 A1* | 9/2020 | Baldemair | H04L 1/0009 |
| 2020/0304969 A1* | 9/2020 | Basu Mallick | H04W 72/042 |
| 2020/0374859 A1* | 11/2020 | Han | H04W 72/0406 |
| 2021/0037549 A1* | 2/2021 | Akkarakaran | H04W 72/1247 |
| 2021/0058905 A1* | 2/2021 | Ganesan | H04L 5/14 |
| 2021/0153170 A1* | 5/2021 | Chen | H04W 72/0446 |
| 2021/0329510 A1* | 10/2021 | Tseng | H04W 36/0079 |
| 2022/0053420 A1* | 2/2022 | Xue | H04W 52/0209 |
| 2022/0053460 A1* | 2/2022 | Yu | H04W 76/28 |
| 2023/0276364 A1* | 8/2023 | Basu Mallick | H04W 76/28 370/311 |

FOREIGN PATENT DOCUMENTS

WO   WO-2020149980 A1 *   7/2020

* cited by examiner

*Primary Examiner* — Clemence S Han
(74) *Attorney, Agent, or Firm* — Holland & Hart LLP

(57) ABSTRACT

Methods, systems, and devices for wireless communications are described. A first wireless device may be configured to receive, from a second wireless device via a sidelink communication link, a sidelink control information (SCI) scheduling an uplink transmission from the first wireless device to the second wireless device. The first wireless device may then generate the uplink transmission based on the SCI. The first wireless device may then transit the uplink transmission to the second wireless device via the sidelink communication link in accordance with the SCI.

40 Claims, 22 Drawing Sheets

TECHNIQUES FOR SIDELINK CONTROL SIGNALING

FIELD OF TECHNOLOGY

The following relates to wireless communications, including techniques for sidelink control signaling.

BACKGROUND

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Sidelink communications between wireless devices (such as UEs) is typically performed via physical sidelink control channels (PSCCHs) and physical sidelink shared channels (PSSCHs). Sidelink control information (SCI) is typically transmitted between the participating devices via two different messages. SCI-1 is broadcast during a PSCCH and provides, among other information, details regarding SCI-2, which may be received during a PSSCH. However, some techniques for sidelink communications may be deficient due to a lack of flexibility for screeching sidelink transmissions, such as control information.

SUMMARY

The described techniques relate to improved methods, systems, devices, and apparatuses that support techniques for sidelink control signaling. Generally, the described techniques provide for scheduling of sidelink transmissions (e.g., control information) via sidelink communication links in the absence of sidelink data transmissions. According to some aspects, sidelink control information (SCI) (e.g., SCI-2) may be used to schedule resources for transmission of control messages (e.g., sidelink-uplink control information (S-UCI)) within a sidelink communication link. In some aspects, scheduled S-UCI resources may be in a slot that is different from that in which the SCI-2 is received. The SCI-2 may also include information regarding the content and format of the S-UCI transmission, including whether the S-UCI is to carry a channel state information (CSI) report, feedback information (including hybrid automatic repeat request (HARQ) bits), periodicity information, repetition information, and orthogonal cover code (OCC) information. In some aspects, a wireless device (e.g., UE, sensor/actuator (S/A)) may be configured to generate and transmit the S-UCI scheduled by the SCI-2 based on the information in the SCI-2, configuration information that may be additionally received via radio resource control (RRC) signaling, or both.

A method for wireless communication at a first wireless device is described. The method may include receiving, from a second wireless device via a sidelink communication link, SCI scheduling an uplink transmission from the first wireless device to the second wireless device, where the second wireless device includes a central node in a star topology sidelink network and the first wireless device includes a peripheral node in the star topology sidelink network, generating the uplink transmission based on the SCI, and transmitting the uplink transmission to the second wireless device via the sidelink communication link in accordance with the SCI.

An apparatus for wireless communication at a first wireless device is described. The apparatus may include a processor, memory in electronic communication with the processor, and instructions stored in the memory. The instructions may be executable by the processor to cause the apparatus to receive, from a second wireless device via a sidelink communication link, SCI scheduling an uplink transmission from the first wireless device to the second wireless device, where the second wireless device includes a central node in a star topology sidelink network and the first wireless device includes a peripheral node in the star topology sidelink network, generate the uplink transmission based on the SCI, and transmit the uplink transmission to the second wireless device via the sidelink communication link in accordance with the SCI.

Another apparatus for wireless communication at a first wireless device is described. The apparatus may include means for receiving, from a second wireless device via a sidelink communication link, SCI scheduling an uplink transmission from the first wireless device to the second wireless device, where the second wireless device includes a central node in a star topology sidelink network and the first wireless device includes a peripheral node in the star topology sidelink network, means for generating the uplink transmission based on the SCI, and means for transmitting the uplink transmission to the second wireless device via the sidelink communication link in accordance with the SCI.

A non-transitory computer-readable medium storing code for wireless communication at a first wireless device is described. The code may include instructions executable by a processor to receive, from a second wireless device via a sidelink communication link, SCI scheduling an uplink transmission from the first wireless device to the second wireless device, where the second wireless device includes a central node in a star topology sidelink network and the first wireless device includes a peripheral node in the star topology sidelink network, generate the uplink transmission based on the SCI, and transmit the uplink transmission to the second wireless device via the sidelink communication link in accordance with the SCI.

Some examples of the method, apparatuses, and non-transitory computer-readable medium described herein may further include operations, features, means, or instructions for receiving, from the second wireless device, a base station, or both, an RRC message that indicates a set of sidelink resources of the sidelink communication link which may be dedicated for transmission of uplink control information (UCI) (e.g., S-UCI) or reception of downlink control information (DCI) (e.g., S-DCI), where the uplink transmission may be transmitted via at least a portion of the set of sidelink resources.

Some examples of the method, apparatuses, and non-transitory computer-readable medium described herein may further include operations, features, means, or instructions for receiving, via the SCI, an indication of a subset of the set of sidelink resources to be used for transmitting the uplink transmission.

In some examples of the method, apparatuses, and non-transitory computer-readable medium described herein, the set of sidelink resources which may be dedicated for transmission of UCI or reception of DCI spans a first quantity of physical resource blocks (PRBs) at a first boundary of a sidelink bandwidth part (BWP).

In some examples of the method, apparatuses, and non-transitory computer-readable medium described herein, the first quantity of PRBs spans less than a full subchannel in a frequency domain.

In some examples of the method, apparatuses, and non-transitory computer-readable medium described herein, the set of sidelink resources which may be dedicated for transmission of UCI or reception of DCI spans a second quantity of PRBs at an additional boundary of the sidelink BWP, the additional boundary opposite the first boundary in a frequency domain with respect to the sidelink BWP.

In some examples of the method, apparatuses, and non-transitory computer-readable medium described herein, the set of sidelink resources which may be dedicated for transmission of UCI or reception of DCI spans a second quantity of PRBs, and the first quantity of PRBs and the second quantity of PRBs may be separated by at least one subchannel in a frequency domain.

Some examples of the method, apparatuses, and non-transitory computer-readable medium described herein may further include operations, features, means, or instructions for receiving an additional RRC message that indicates a sidelink BWP configured for sidelink communications, where the RRC message which indicates the set of sidelink resources which may be dedicated for transmission of UCI or reception of DCI reclaims the set of sidelink resources from the sidelink BWP.

Some examples of the method, apparatuses, and non-transitory computer-readable medium described herein may further include operations, features, means, or instructions for receiving, via the SCI, an indication of a set of sidelink resources to be used for transmitting the uplink transmission, where the uplink transmission may be transmitted via at least a portion of the set of sidelink resources.

In some examples of the method, apparatuses, and non-transitory computer-readable medium described herein, the indication of the set of sidelink resources may be included in one or more bit fields associated with an allocation of time resources, one or more bit fields associated with an allocation of frequency resources, or both.

Some examples of the method, apparatuses, and non-transitory computer-readable medium described herein may further include operations, features, means, or instructions for receiving, via the SCI, one or more bit field values associated with enabling or disabling CSI reporting and transmitting, via the uplink transmission, a CSI report associated with the sidelink communication link based on a value of the one or more bit field values.

Some examples of the method, apparatuses, and non-transitory computer-readable medium described herein may further include operations, features, means, or instructions for receiving an RRC message that indicates a relationship between a first set of sidelink resources for receiving the SCI and a second set of sidelink resources for transmitting the uplink transmission, where transmitting the uplink transmission may be based on the relationship.

Some examples of the method, apparatuses, and non-transitory computer-readable medium described herein may further include operations, features, means, or instructions for receiving an RRC message including an indication of one or more parameters associated with transmission of the uplink transmission, where transmitting the uplink transmission may be in accordance with the one or more parameters.

In some examples of the method, apparatuses, and non-transitory computer-readable medium described herein, the one or more parameters include a bundling size associated with the uplink transmission, an interleaving configuration, a frequency hopping configuration, a periodicity, or any combination thereof.

Some examples of the method, apparatuses, and non-transitory computer-readable medium described herein may further include operations, features, means, or instructions for receiving, via the SCI, an indication to transmit the uplink transmission periodically, aperiodically, semi-persistently, or any combination thereof, where the uplink transmission may be transmitted in accordance with the indication.

Some examples of the method, apparatuses, and non-transitory computer-readable medium described herein may further include operations, features, means, or instructions for receiving, via the SCI, an indication of a time interval between reception of the SCI and transmission of the uplink transmission, where transmitting the uplink transmission may be in accordance with the time interval.

Some examples of the method, apparatuses, and non-transitory computer-readable medium described herein may further include operations, features, means, or instructions for receiving, via the SCI, an indication of a format to be used for the uplink transmission, where generating the uplink transmission may be based on the format.

In some examples of the method, apparatuses, and non-transitory computer-readable medium described herein, the format includes one or more fields for indicating a frequency hopping configuration, a repetition configuration, an OCC, or any combination thereof.

In some examples of the method, apparatuses, and non-transitory computer-readable medium described herein, the uplink transmission includes an UCI message, an uplink data message, or both.

In some examples of the method, apparatuses, and non-transitory computer-readable medium described herein, the SCI may be received via a sidelink shared channel of the sidelink communication link.

Some examples of the method, apparatuses, and non-transitory computer-readable medium described herein may further include operations, features, means, or instructions for receiving additional SCI from the second wireless device via a sidelink control channel of the sidelink communication link, where receiving the SCI may be based on receiving the additional SCI.

In some examples of the method, apparatuses, and non-transitory computer-readable medium described herein, the additional SCI may be in a first SCI format, and the SCI may be in a second SCI format different from the first SCI format.

Some examples of the method, apparatuses, and non-transitory computer-readable medium described herein may further include operations, features, means, or instructions for identifying that the first wireless device may be configured to transmit a HARQ message to the second wireless device via a sidelink feedback channel of the sidelink communication link and multiplexing the HARQ message with the uplink transmission without transmitting the HARQ message via the sidelink feedback channel.

Some examples of the method, apparatuses, and non-transitory computer-readable medium described herein may further include operations, features, means, or instructions for identifying that a payload size of the HARQ message may be less than or equal to a threshold payload size, where multiplexing the HARQ message with the uplink transmission may be based on identifying that the payload size may be less than or equal to the threshold payload size.

Some examples of the method, apparatuses, and non-transitory computer-readable medium described herein may further include operations, features, means, or instructions for identifying the payload size of the HARQ message based on a periodicity of transmissions performed via the sidelink feedback channel.

Some examples of the method, apparatuses, and non-transitory computer-readable medium described herein may further include operations, features, means, or instructions for identifying that the first wireless device may be configured to transmit a HARQ message to the second wireless device via a sidelink feedback channel of the sidelink communication link and transmitting at least a first portion of the HARQ message to the second wireless device via the sidelink feedback channel of the sidelink communication link, where the uplink transmission may be transmitted on a channel which may be different from the sidelink feedback channel.

Some examples of the method, apparatuses, and non-transitory computer-readable medium described herein may further include operations, features, means, or instructions for transmitting at least a second portion of the HARQ message to the second wireless device via the uplink transmission.

In some examples of the method, apparatuses, and non-transitory computer-readable medium described herein, transmission of the uplink transmission at least partially overlaps with the sidelink feedback channel.

In some examples of the method, apparatuses, and non-transitory computer-readable medium described herein, the sidelink feedback channel punctures the uplink transmission.

Some examples of the method, apparatuses, and non-transitory computer-readable medium described herein may further include operations, features, means, or instructions for receiving, from a third wireless device, a control message indicating a set of sidelink resources to be used for the sidelink communication link, where the uplink transmission may be transmitted within at least a subset of the set of sidelink resources.

A method for wireless communication at a second wireless device is described. The method may include transmitting, to a first wireless device via a sidelink communication link, SCI scheduling an uplink transmission from the first wireless device to the second wireless device, where the second wireless device includes a central node in a star topology sidelink network and the first wireless device includes a peripheral node in the star topology sidelink network, and receiving the uplink transmission from the first wireless device via the sidelink communication link in accordance with the SCI.

An apparatus for wireless communication at a second wireless device is described. The apparatus may include a processor, memory in electronic communication with the processor, and instructions stored in the memory. The instructions may be executable by the processor to cause the apparatus to transmit, to a first wireless device via a sidelink communication link, SCI scheduling an uplink transmission from the first wireless device to the second wireless device, where the second wireless device includes a central node in a star topology sidelink network and the first wireless device includes a peripheral node in the star topology sidelink network, and receive the uplink transmission from the first wireless device via the sidelink communication link in accordance with the SCI.

Another apparatus for wireless communication at a second wireless device is described. The apparatus may include means for transmitting, to a first wireless device via a sidelink communication link, SCI scheduling an uplink transmission from the first wireless device to the second wireless device, where the second wireless device includes a central node in a star topology sidelink network and the first wireless device includes a peripheral node in the star topology sidelink network, and means for receiving the uplink transmission from the first wireless device via the sidelink communication link in accordance with the SCI.

A non-transitory computer-readable medium storing code for wireless communication at a second wireless device is described. The code may include instructions executable by a processor to transmit, to a first wireless device via a sidelink communication link, SCI scheduling an uplink transmission from the first wireless device to the second wireless device, where the second wireless device includes a central node in a star topology sidelink network and the first wireless device includes a peripheral node in the star topology sidelink network, and receive the uplink transmission from the first wireless device via the sidelink communication link in accordance with the SCI.

Some examples of the method, apparatuses, and non-transitory computer-readable medium described herein may further include operations, features, means, or instructions for transmitting, to the first wireless device, an RRC message that indicates a set of sidelink resources of the sidelink communication link which may be dedicated for reception of UCI or transmission of DCI, where the uplink transmission may be received via at least a portion of the set of sidelink resources.

Some examples of the method, apparatuses, and non-transitory computer-readable medium described herein may further include operations, features, means, or instructions for transmitting, via the SCI, an indication of a subset of the set of sidelink resources to be used for transmitting the uplink transmission.

In some examples of the method, apparatuses, and non-transitory computer-readable medium described herein, the set of sidelink resources which may be dedicated for transmission of UCI or reception of DCI span a first quantity of PRBs at a first boundary of a sidelink BWP.

In some examples of the method, apparatuses, and non-transitory computer-readable medium described herein, the first quantity of PRBs span less than a full subchannel in a frequency domain.

In some examples of the method, apparatuses, and non-transitory computer-readable medium described herein, the set of sidelink resources which may be dedicated for transmission of UCI or reception of DCI span a second quantity of PRBs at an additional boundary of the sidelink BWP, the additional boundary opposite the first boundary in a frequency domain with respect to the sidelink BWP.

In some examples of the method, apparatuses, and non-transitory computer-readable medium described herein, the set of sidelink resources which may be dedicated for transmission of UCI or reception of DCI span a second quantity of PRBs, and the first quantity of PRBs and the second quantity of PRBs may be separated by at least one subchannel in a frequency domain.

Some examples of the method, apparatuses, and non-transitory computer-readable medium described herein may further include operations, features, means, or instructions for transmitting an additional RRC message that indicates a sidelink BWP configured for sidelink communications, where the RRC message which indicates the set of sidelink resources which may be dedicated for transmission of UCI or reception of DCI reclaims the set of sidelink resources from the sidelink BWP.

Some examples of the method, apparatuses, and non-transitory computer-readable medium described herein may further include operations, features, means, or instructions for transmitting, via the SCI, an indication of a set of sidelink resources to be used for transmitting the uplink transmission, where the uplink transmission may be received via at least a portion of the set of sidelink resources.

In some examples of the method, apparatuses, and non-transitory computer-readable medium described herein, the indication of the set of sidelink resources may be included in one or more bit fields associated with an allocation of time resources, one or more bit fields associated with an allocation of frequency resources, or both.

Some examples of the method, apparatuses, and non-transitory computer-readable medium described herein may further include operations, features, means, or instructions for transmitting, via the SCI, one or more bit field values associated with enabling or disabling CSI reporting and receiving, via the uplink transmission, a CSI report associated with the sidelink communication link based on a value of the one or more bit field values.

Some examples of the method, apparatuses, and non-transitory computer-readable medium described herein may further include operations, features, means, or instructions for transmitting, to the first wireless device, an RRC message that indicates a relationship between a first set of sidelink resources for transmitting the SCI and a second set of sidelink resources for receiving the uplink transmission, where receiving the uplink transmission may be based on the relationship.

Some examples of the method, apparatuses, and non-transitory computer-readable medium described herein may further include operations, features, means, or instructions for transmitting, to the first wireless device, an RRC message including an indication of one or more parameters associated with transmission of the uplink transmission, where receiving the uplink transmission may be in accordance with the one or more parameters.

In some examples of the method, apparatuses, and non-transitory computer-readable medium described herein, the one or more parameters include a bundling size associated with the uplink transmission, an interleaving configuration, a frequency hopping configuration, a periodicity, or any combination thereof.

Some examples of the method, apparatuses, and non-transitory computer-readable medium described herein may further include operations, features, means, or instructions for transmitting, via the SCI, an indication to transmit the uplink transmission periodically, aperiodically, semi-persistently, or any combination thereof, where the uplink transmission may be transmitted in accordance with the indication.

Some examples of the method, apparatuses, and non-transitory computer-readable medium described herein may further include operations, features, means, or instructions for transmitting, via the SCI, an indication of a time interval between transmission of the SCI and reception of the uplink transmission, where receiving the uplink transmission may be in accordance with the time interval.

Some examples of the method, apparatuses, and non-transitory computer-readable medium described herein may further include operations, features, means, or instructions for transmitting, via the SCI, an indication of a format to be used for the uplink transmission, where the uplink transmission may be generated based on the format.

In some examples of the method, apparatuses, and non-transitory computer-readable medium described herein, the format includes one or more fields for indicating a frequency hopping configuration, a repetition configuration, an OCC, or any combination thereof.

In some examples of the method, apparatuses, and non-transitory computer-readable medium described herein, the uplink transmission includes an UCI message, an uplink data message, or both.

In some examples of the method, apparatuses, and non-transitory computer-readable medium described herein, the SCI may be transmitted via a sidelink shared channel of the sidelink communication link.

Some examples of the method, apparatuses, and non-transitory computer-readable medium described herein may further include operations, features, means, or instructions for transmitting additional SCI to the first wireless device via a sidelink control channel of the sidelink communication link, where transmitting the SCI may be based on transmitting the additional SCI.

In some examples of the method, apparatuses, and non-transitory computer-readable medium described herein, the additional SCI may be in a first SCI format, and the SCI may be in a second SCI format different from the first SCI format.

Some examples of the method, apparatuses, and non-transitory computer-readable medium described herein may further include operations, features, means, or instructions for identifying that the first wireless device may be configured to transmit a HARQ message to the second wireless device via a sidelink feedback channel of the sidelink communication link and receiving the HARQ message multiplexed with the uplink transmission without receiving the HARQ message via the sidelink feedback channel.

Some examples of the method, apparatuses, and non-transitory computer-readable medium described herein may further include operations, features, means, or instructions for identifying that a payload size of the HARQ message may be less than or equal to a threshold payload size, where receiving the HARQ message multiplexed with the uplink transmission may be based on identifying that the payload size may be less than or equal to the threshold payload size.

Some examples of the method, apparatuses, and non-transitory computer-readable medium described herein may further include operations, features, means, or instructions for identifying the payload size of the HARQ message based on a periodicity of transmissions performed via the sidelink feedback channel.

Some examples of the method, apparatuses, and non-transitory computer-readable medium described herein may further include operations, features, means, or instructions for identifying that the first wireless device may be configured to transmit a HARQ message to the second wireless device via a sidelink feedback channel of the sidelink communication link and receiving at least a first portion of the HARQ message from the first wireless device via the sidelink feedback channel of the sidelink communication link, where the uplink transmission may be received on a channel which may be different from the sidelink feedback channel.

Some examples of the method, apparatuses, and non-transitory computer-readable medium described herein may further include operations, features, means, or instructions for receiving at least a second portion of the HARQ message from the first wireless device via the uplink transmission.

In some examples of the method, apparatuses, and non-transitory computer-readable medium described herein, reception of the uplink transmission at least partially overlaps with the sidelink feedback channel.

In some examples of the method, apparatuses, and non-transitory computer-readable medium described herein, the sidelink feedback channel punctures the uplink transmission.

Some examples of the method, apparatuses, and non-transitory computer-readable medium described herein may further include operations, features, means, or instructions for receiving, from a third wireless device, a control message indicating a set of sidelink resources to be used for the sidelink communication link and transmitting, to the first wireless device, an indication of at least a subset of the set of sidelink resources which may be to be used for transmission of the uplink transmission based on receiving the control message, where the uplink transmission may be received within the at least the subset of the set of sidelink resources.

Some examples of the method, apparatuses, and non-transitory computer-readable medium described herein may further include operations, features, means, or instructions for monitoring the sidelink communication link, determining a set of sidelink resources to be used for the sidelink communication link based on the monitoring, and transmitting, to the first wireless device, an indication of at least a subset of the set of sidelink resources which may be to be used for transmission of the uplink transmission based on the determining, where the uplink transmission may be received within the at least the subset of the set of sidelink resources.

A method for wireless communication at a first wireless device is described. The method may include receiving, from a second wireless device via a sidelink communication link, a downlink transmission scheduling an additional transmission between the first wireless device and the second wireless device, the downlink transmission received within a set of sidelink resources of the sidelink communication link which are dedicated for reception of DCI or transmission of UCI, where the second wireless device includes a central node in a star topology sidelink network and the first wireless device includes a peripheral node in the star topology sidelink network, generating the additional transmission based on the downlink transmission, and communicating with the second wireless device via the additional transmission on the sidelink communication link in accordance with the downlink transmission.

An apparatus for wireless communication at a first wireless device is described. The apparatus may include a processor, memory in electronic communication with the processor, and instructions stored in the memory. The instructions may be executable by the processor to cause the apparatus to receive, from a second wireless device via a sidelink communication link, a downlink transmission scheduling an additional transmission between the first wireless device and the second wireless device, the downlink transmission received within a set of sidelink resources of the sidelink communication link which are dedicated for reception of DCI or transmission of UCI, where the second wireless device includes a central node in a star topology sidelink network and the first wireless device includes a peripheral node in the star topology sidelink network, generate the additional transmission based on the downlink transmission, and communicate with the second wireless device via the additional transmission on the sidelink communication link in accordance with the downlink transmission.

Another apparatus for wireless communication at a first wireless device is described. The apparatus may include means for receiving, from a second wireless device via a sidelink communication link, a downlink transmission scheduling an additional transmission between the first wireless device and the second wireless device, the downlink transmission received within a set of sidelink resources of the sidelink communication link which are dedicated for reception of DCI or transmission of UCI, where the second wireless device includes a central node in a star topology sidelink network and the first wireless device includes a peripheral node in the star topology sidelink network, means for generating the additional transmission based on the downlink transmission, and means for communicating with the second wireless device via the additional transmission on the sidelink communication link in accordance with the downlink transmission.

A non-transitory computer-readable medium storing code for wireless communication at a first wireless device is described. The code may include instructions executable by a processor to receive, from a second wireless device via a sidelink communication link, a downlink transmission scheduling an additional transmission between the first wireless device and the second wireless device, the downlink transmission received within a set of sidelink resources of the sidelink communication link which are dedicated for reception of DCI or transmission of UCI, where the second wireless device includes a central node in a star topology sidelink network and the first wireless device includes a peripheral node in the star topology sidelink network, generate the additional transmission based on the downlink transmission, and communicate with the second wireless device via the additional transmission on the sidelink communication link in accordance with the downlink transmission.

Some examples of the method, apparatuses, and non-transitory computer-readable medium described herein may further include operations, features, means, or instructions for receiving, form the second wireless device, a third wireless device, or both, an RRC message that indicates the set of sidelink resources of the sidelink communication link which may be dedicated for transmission of UCI or reception of DCI.

Some examples of the method, apparatuses, and non-transitory computer-readable medium described herein may further include operations, features, means, or instructions for receiving a control message indicating a set of resources for receiving the downlink transmission and monitoring the set of resources based on the control message, where receiving the downlink transmission may be based on the monitoring.

Some examples of the method, apparatuses, and non-transitory computer-readable medium described herein may further include operations, features, means, or instructions for determining that the first wireless device may be associated with an identifier and determining that the downlink transmission may be addressed to the first wireless device via the identifier.

Some examples of the method, apparatuses, and non-transitory computer-readable medium described herein may further include operations, features, means, or instructions for receiving a cyclic redundancy portion of the downlink transmission which may be scrambled by the identifier and demodulating the cyclic redundancy portion of the downlink transmission based on the identifier, where generating the uplink transmission may be based on demodulating the cyclic redundancy portion.

Some examples of the method, apparatuses, and non-transitory computer-readable medium described herein may further include operations, features, means, or instructions for receiving an indication of the identifier via the downlink transmission.

In some examples of the method, apparatuses, and non-transitory computer-readable medium described herein, the identifier includes a sidelink reception identifier, a UE identifier assigned by the second wireless device, or both.

In some examples of the method, apparatuses, and non-transitory computer-readable medium described herein, the identifier may be associated with a reception opportunity for downlink transmissions which may be monitored by the first wireless device.

Some examples of the method, apparatuses, and non-transitory computer-readable medium described herein may further include operations, features, means, or instructions for receiving, from the second wireless device, a control message allocating a set of resources for a set of multiple transmissions between the first wireless device and the second wireless device and receiving, via the downlink transmission, an indication to perform at least a subset of the set of multiple transmissions, where generating the uplink transmission may be based on receiving the indication.

In some examples of the method, apparatuses, and non-transitory computer-readable medium described herein, the downlink transmission may be received in a first transmission time interval and the method, apparatuses, and non-transitory computer-readable medium may include further operations, features, means, or instructions for receiving, via the downlink transmission, an indication of a format associated with one or more transmission time intervals subsequent to the first transmission time interval, where generating the uplink transmission may be based on the indication.

Some examples of the method, apparatuses, and non-transitory computer-readable medium described herein may further include operations, features, means, or instructions for receiving a control message indicating a format associated with one or more transmission time intervals associated with the sidelink communication link and monitoring the sidelink communication link based on the format associated with the one or more transmission time intervals, where the downlink transmission may be received based on the monitoring.

In some examples of the method, apparatuses, and non-transitory computer-readable medium described herein, the downlink transmission spans a set of symbols of the set of sidelink resources in a time domain, and a set of PRBs of the set of sidelink resources in a frequency domain.

In some examples of the method, apparatuses, and non-transitory computer-readable medium described herein, the downlink transmission spans a slot of the set of sidelink resources in a time domain, and a set of PRBs of the set of sidelink resources in a frequency domain.

In some examples of the method, apparatuses, and non-transitory computer-readable medium described herein, the downlink transmission may be associated with a set of multiple OCCs, and generating the additional transmission may be based on an OCC of the set of multiple OCCs being associated with the first wireless device.

In some examples of the method, apparatuses, and non-transitory computer-readable medium described herein, the downlink transmission may be multiplexed with a sidelink shared channel transmission.

In some examples of the method, apparatuses, and non-transitory computer-readable medium described herein, the downlink transmission includes an indication that the downlink transmission may be multiplexed with the sidelink shared channel transmission.

In some examples of the method, apparatuses, and non-transitory computer-readable medium described herein, the downlink transmission includes a common downlink transmission which may be transmitted by the second wireless device to a set of wireless devices including the first wireless device.

In some examples of the method, apparatuses, and non-transitory computer-readable medium described herein, the downlink transmission includes a first format associated with DCI messages, a second format associated with DCI messages, a third format associated with DCI messages, or any combination thereof.

In some examples of the method, apparatuses, and non-transitory computer-readable medium described herein, the downlink transmission includes a downlink control information message, and the additional transmission includes an UCI message, an uplink data message, a downlink data message, or any combination thereof.

A method for wireless communication at a second wireless device is described. The method may include transmitting, to a first wireless device via a sidelink communication link, a downlink transmission scheduling an additional transmission between the first wireless device and the second wireless device, where the downlink transmission is transmitted within a set of sidelink resources of the sidelink communication link which are dedicated for transmission of DCI or reception of UCI, where the second wireless device includes a central node in a star topology sidelink network and the first wireless device includes a peripheral node in the star topology sidelink network, and communicating with the first wireless device via the additional transmission on the sidelink communication link in accordance with the downlink transmission.

An apparatus for wireless communication at a second wireless device is described. The apparatus may include a processor, memory in electronic communication with the processor, and instructions stored in the memory. The instructions may be executable by the processor to cause the apparatus to transmit, to a first wireless device via a sidelink communication link, a downlink transmission scheduling an additional transmission between the first wireless device and the second wireless device, where the downlink transmission is transmitted within a set of sidelink resources of the sidelink communication link which are dedicated for transmission of DCI or reception of UCI, where the second wireless device includes a central node in a star topology sidelink network and the first wireless device includes a peripheral node in the star topology sidelink network, and communicate with the first wireless device via the additional transmission on the sidelink communication link in accordance with the downlink transmission.

Another apparatus for wireless communication at a second wireless device is described. The apparatus may include means for transmitting, to a first wireless device via a sidelink communication link, a downlink transmission scheduling an additional transmission between the first wireless device and the second wireless device, where the downlink transmission is transmitted within a set of sidelink resources of the sidelink communication link which are dedicated for transmission of DCI or reception of UCI, where the second wireless device includes a central node in a star topology sidelink network and the first wireless device includes a peripheral node in the star topology sidelink network, and means for communicating with the first wireless device via the additional transmission on the sidelink communication link in accordance with the downlink transmission.

A non-transitory computer-readable medium storing code for wireless communication at a second wireless device is described. The code may include instructions executable by a processor to transmit, to a first wireless device via a sidelink communication link, a downlink transmission scheduling an additional transmission between the first wireless device and the second wireless device, where the downlink transmission is transmitted within a set of sidelink resources of the sidelink communication link which are dedicated for transmission of DCI or reception of UCI, where the second wireless device includes a central node in a star topology sidelink network and the first wireless device includes a peripheral node in the star topology sidelink network, and communicate with the first wireless device via the additional transmission on the sidelink communication link in accordance with the downlink transmission.

Some examples of the method, apparatuses, and non-transitory computer-readable medium described herein may further include operations, features, means, or instructions for transmitting an RRC message that indicates the set of sidelink resources of the sidelink communication link which may be dedicated for transmission of UCI or reception of DCI.

Some examples of the method, apparatuses, and non-transitory computer-readable medium described herein may further include operations, features, means, or instructions for transmitting a control message indicating a set of resources for transmitting the downlink transmission, where the downlink transmission may be transmitted within the set of resources.

Some examples of the method, apparatuses, and non-transitory computer-readable medium described herein may further include operations, features, means, or instructions for determining that the first wireless device may be associated with an identifier and determining that the downlink transmission may be addressed to the first wireless device via the identifier.

Some examples of the method, apparatuses, and non-transitory computer-readable medium described herein may further include operations, features, means, or instructions for transmitting a cyclic redundancy portion of the downlink transmission which may be scrambled by the identifier.

Some examples of the method, apparatuses, and non-transitory computer-readable medium described herein may further include operations, features, means, or instructions for transmitting an indication of the identifier via the downlink transmission.

In some examples of the method, apparatuses, and non-transitory computer-readable medium described herein, the identifier includes a sidelink reception identifier, a UE identifier assigned by the second wireless device, or both.

In some examples of the method, apparatuses, and non-transitory computer-readable medium described herein, the identifier may be associated with a reception opportunity for downlink transmissions which may be monitored by the first wireless device.

Some examples of the method, apparatuses, and non-transitory computer-readable medium described herein may further include operations, features, means, or instructions for transmitting, to the first wireless device, a control message allocating a set of resources for a set of multiple transmissions between the first wireless device and the second wireless device and transmitting, via the downlink transmission, an indication to perform at least a subset of the set of multiple transmissions.

In some examples of the method, apparatuses, and non-transitory computer-readable medium described herein, the downlink transmission may be transmitted in a first transmission time interval and the method, apparatuses, and non-transitory computer-readable medium may include further operations, features, means, or instructions for transmitting, via the downlink transmission, an indication of a format associated with one or more transmission time intervals subsequent to the first transmission time interval.

Some examples of the method, apparatuses, and non-transitory computer-readable medium described herein may further include operations, features, means, or instructions for transmitting a control message indicating a format associated with one or more transmission time intervals associated with the sidelink communication link, where the downlink transmission may be transmitted in accordance with the format associated with the one or more transmission time intervals.

In some examples of the method, apparatuses, and non-transitory computer-readable medium described herein, the downlink transmission spans a set of symbols of the set of sidelink resources in a time domain, and a set of PRBs of the set of sidelink resources in a frequency domain.

In some examples of the method, apparatuses, and non-transitory computer-readable medium described herein, the downlink transmission spans a slot of the set of sidelink resources in a time domain, and a set of PRBs of the set of sidelink resources in a frequency domain.

In some examples of the method, apparatuses, and non-transitory computer-readable medium described herein, the downlink transmission may be associated with a set of multiple OCCs including an OCC associated with the first wireless device.

In some examples of the method, apparatuses, and non-transitory computer-readable medium described herein, the downlink transmission may be multiplexed with a sidelink shared channel transmission.

In some examples of the method, apparatuses, and non-transitory computer-readable medium described herein, the downlink transmission includes an indication that the downlink transmission may be multiplexed with the sidelink shared channel transmission.

In some examples of the method, apparatuses, and non-transitory computer-readable medium described herein, the downlink transmission includes a common downlink transmission which may be transmitted by the second wireless device to a set of wireless devices including the first wireless device.

In some examples of the method, apparatuses, and non-transitory computer-readable medium described herein, the downlink transmission includes a first format associated with DCI messages, a second format associated with DCI messages, a third format associated with DCI messages, or any combination thereof.

In some examples of the method, apparatuses, and non-transitory computer-readable medium described herein, the downlink transmission includes a DCI message, and the additional transmission includes an UCI message, an uplink data message, a downlink data message, or any combination thereof.

DETAILED DESCRIPTION

Figure 1:
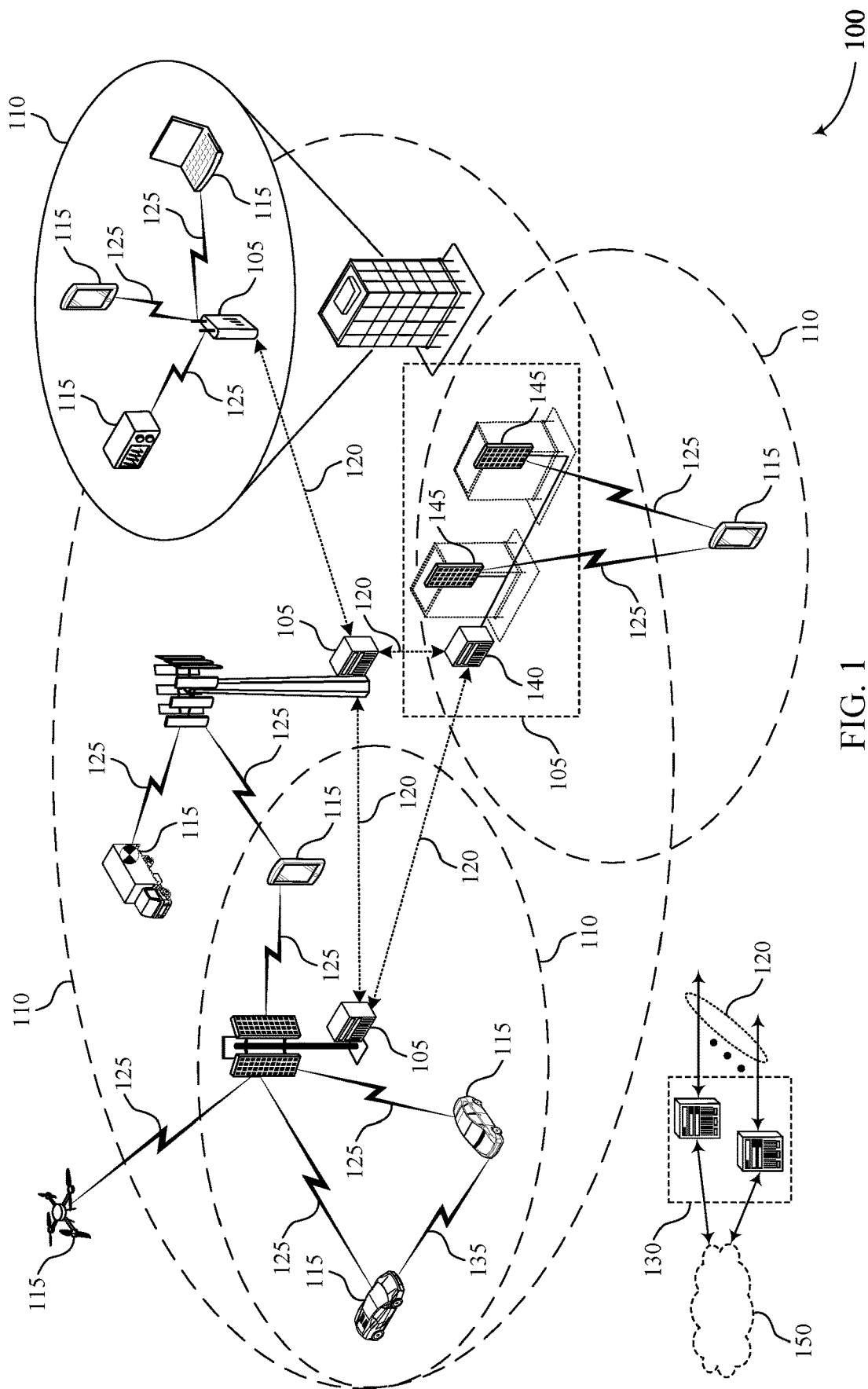
FIG. 1 illustrates an example of a wireless communications system that supports techniques for sidelink control signaling in accordance with aspects of the present disclosure.

Sidelink communications between wireless devices (such as user equipments (UE)) is typically performed via physical sidelink control channels (PSCCHs) and physical sidelink shared channels (PSSCHs). Sidelink control information (SCI) is typically transmitted between the participating devices via two different messages. SCI-1 is broadcast during a PSCCH and provides, among other information, details regarding SCI-2, which may be received during a PSSCH. According to some communications techniques, PSCCH information may only be transmitted in conjunction with PSSCH information. Thus, if no PSSCH is transmitted, a PSCCH will also not be transmitted. In this regard, according to some techniques, SCI may not be transmitted in the absence of PSSCH data. Nevertheless, there are times when a sidelink wireless device may have sidelink-related control information to transmit even in the absence of any sidelink transmissions (e.g., PSSCH data transmissions). In such cases, the sidelink wireless device may wait to transmit the sidelink-related control information until there is other sidelink data to be transmitted, which may increase latency of wireless communications. Additionally or alternatively, the sidelink wireless device may transmit the sidelink-related control information such that the sidelink-related control information occupies an entire slot of a sidelink communication link, which may result in an inefficient use of sidelink resources.

Thus, some communications techniques for sidelink communications may be deficient in some contexts, such as internet-of-things (I-IoT) networks. For example, an I-IoT network may involve one or more programmable logic controllers (PLCs) that interface between a gNB and multiple UEs or sensors-actuators (S/As). The S/As use sidelink communication protocols to communicate with associated anchor PLCs. Efficient communications between the S/As and the PLCs may be based on the transmission of various control information between the S/As and the PLCs. Therefore, techniques for transmitting this control information between S/As and PLCs, even in the absence of sidelink data transmissions, would be beneficial.

Accordingly, techniques described herein may provide for the scheduling and transmission of control information via a sidelink communication link even in the absence of sidelink data transmissions. In particular, techniques described herein may enable for control information to be scheduled via SCI-2, thereby enabling for control information to be scheduled within a wireless communications link in the absence of PSSCH data. In some aspects, control information scheduled by the SCI-2 may include sidelink-uplink control information (S-UCI). In the context of an I-IoT, the S-UCI may refer to control information which is transmitted from an S/A to a PLC, where sidelink-downlink control information (S-DCI) may refer to control information transmitted from a PLC to an S/A.

For example, according to techniques described herein, a first wireless device (e.g., UE, S/A) may receive SCI-2 from a second wireless device (e.g., PLC), where the SCI-2 schedules resources for transmission of control information (e.g., S-UCI) within a sidelink communication link from the first wireless device to the second wireless device. In some aspects, the scheduled S-UCI resources may be in a slot that is different from that in which the SCI-2 is received. In some aspects, the SCI-2 scheduling the S-UCI may include information regarding the content and format of the S-UCI transmission, including whether the S-UCI is to carry a channel state information (CSI) report, feedback information (including hybrid automatic repeat-request (HARQ) bits), periodicity information, repetition information, and orthogonal cover code (OCC) information. In some aspects, the first wireless device (e.g., UE, sensor/actuator (S/A)) may be configured to generate and transmit the S-UCI scheduled by the SCI-2 based on the information in the SCI-2, configuration information received via radio resource control (RRC) signaling, or both. In some aspects, the first wireless device may be configured to transmit HARQ information via the scheduled S-UCI, via a physical sidelink feedback channel (PSFCH) scheduled to transmit the HARQ information, or both.

Aspects of the disclosure are initially described in the context of wireless communications systems. Additional aspects of the disclosure are described in the context of example resource allocation schemes and an example, process flow. Aspects of the disclosure are further illustrated by and described with reference to apparatus diagrams, system diagrams, and flowcharts that relate to techniques for sidelink control signaling.

FIG. 1 illustrates an example of a wireless communications system 100 that supports techniques for sidelink control signaling in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size. Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to IP services 150 for one or more network operators. The IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a CSI reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the RRC protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

The UEs 115 and the base stations 105 of the wireless communications system 100 may be configured to provide for the scheduling and transmission of control information via a sidelink communication link even in the absence of sidelink data transmissions. In particular, the wireless communications system 100 may enable control information (e.g., S-UCI) to be scheduled via SCI-2 and/or S-DCI, thereby enabling for control information to be scheduled within a wireless communications link in the absence of PSSCH data.

For example, a first wireless device (e.g., UE 115, S/A) of the wireless communications system 100 may receive SCI-2 from a second wireless device (e.g., additional UE 115, PLC), where the SCI-2 schedules an uplink transmission (e.g., S-UCI) transmission from the first wireless device to the second wireless device via a sidelink communication link. In this example, the second wireless device (e.g., PLC) may include a central node in a star topology sidelink network, and the first wireless device (e.g., S/A) may include a peripheral node in the star topology sidelink network. As such, transmissions from the central node (e.g., second wireless device, PLC) to the peripheral node (e.g., first wireless device, S/A) may be referred to as downlink transmissions within the star topology sidelink network, and transmissions form the peripheral node to the central node may be referred to as uplink transmissions within the star topology sidelink network.

Continuing with reference to the same example, in some aspects, the SCI-2 scheduling the uplink transmission (e.g., S-UCI) may include information regarding the content and format of the uplink transmission, including whether the uplink transmission is to carry a CSI report, feedback information (including HARQ bits), periodicity information, repetition information, and OCC information. In this example, the first wireless device (e.g., UE 115, S/A) may be configured to generate and transmit the uplink transmission (e.g., S-UCI) scheduled by the SCI-2 via the sidelink communication link between the first wireless device and the second wireless device.

In some aspects, the first wireless device may be configured to generate and transmit the uplink transmission (e.g., S-UCI) based on the information in the SCI-2 and/or S-DCI, configuration information received via RRC signaling, or both. Additionally, in cases where the first wireless device identifies HARQ information that is to be transmitted to the second wireless device via a PSFCH, the first wireless device may be configured to transmit the HARQ information via the scheduled uplink transmission (e.g., S-UCI), via the PSFCH, or both. For example, in cases where a payload size of the HARQ information is relatively small, the first wireless device may multiplex the HARQ information within the scheduled uplink transmission (e.g., S-UCI).

Techniques described herein may enable sidelink-related transmissions (e.g., S-UCI) to be scheduled even in the absence of sidelink data. In particular, techniques described herein may enable S-UCI to be scheduled via SCI-2 and/or S-DCI, thereby enabling S-UCI to be scheduled via PSCCH resources, PSSCH resources, or both. By allowing for sidelink-related control information to be scheduled even in the absence of sidelink data, techniques described herein may reduce latency of sidelink communications and lead to more efficient use of sidelink resources.

Figure 2:
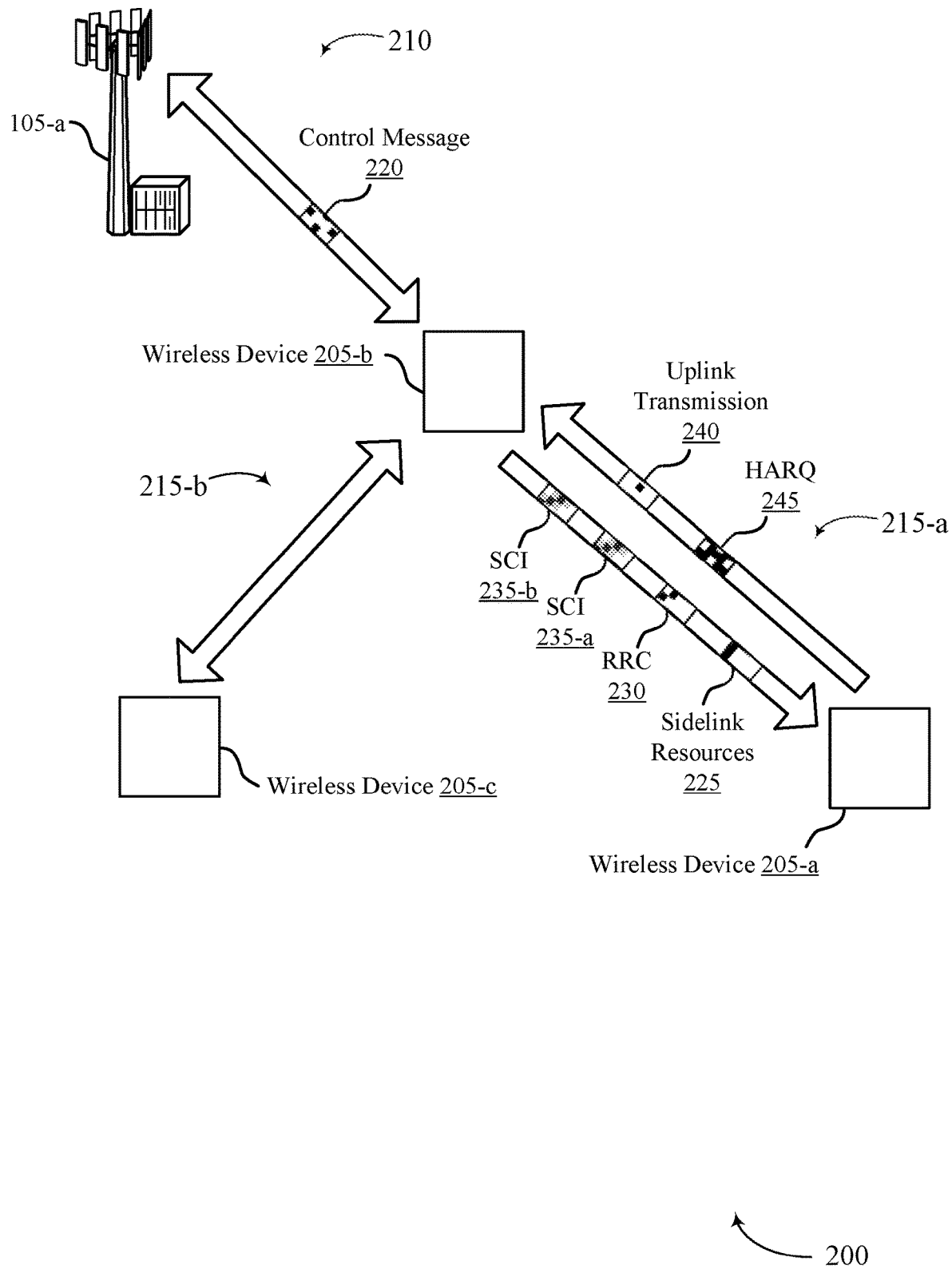
FIG. 2 illustrates an example of a wireless communications system that supports techniques for sidelink control signaling in accordance with aspects of the present disclosure.

FIG. 2 illustrates an example of a wireless communications system 200 that supports techniques for sidelink control signaling in accordance with aspects of the present disclosure. In some examples, wireless communications system 200 may implement aspects of wireless communications system 100. Wireless communications system 200 may support techniques for sidelink control signaling.

The wireless communications system 200 may include a base station 105-a, first wireless device 205-a, a second wireless device 205-b, and a third wireless device 205-c, which may be examples of UEs 115, base stations 105, and other wireless devices as described with reference to FIG. 1. For example, in some cases, the each of the wireless devices 205 may include UEs 115. By way of another example, in the context of an I-IoT, the second wireless device 205-b may include a PLC, where the first wireless device 205-a and/or the third wireless device 205-c may include S/As.

The second wireless device 205-b (e.g., PLC) may communicate with the base station 105-a using a communication link 210, which may be an example of an NR or LTE link between the second wireless device 205-*b* and the base station 105-*a*. In additional or alternative aspects, the first wireless device 205-*a* and/or the third wireless device 205-*c* may be communicatively coupled to the base station 105-*a* via additional communication links 210. In some cases, the communication link 210 and/or other communication links 210 between the base station 105-*a* and the respective wireless devices 205 may include examples of access links (e.g., Uu links) which may include bi-directional links that enable both uplink and downlink communication. For example, the second wireless device 205-*b* may transmit uplink signals, such as uplink control signals or uplink data signals, to the base station 105-*a* using the communication link 210 and the base station 105-*a* may transmit downlink signals, such as downlink control signals or downlink data signals, to the second wireless device 205-*b* using the communication link 210.

In some aspects, the first wireless device 205-*a*, the second wireless device 205-*b*, and the third wireless device 205-*c* may communicate with one another using communication links 215, which may be examples of sidelink communication links or PC5 links. For example, the first wireless device 205-*a* (e.g., first S/A) and the third wireless device 205-*c* (e.g., additional S/A) may communicate with the second wireless device 205-*b* (e.g., PLC) via communication link 215-*a* and communication link 215-*b*, respectively. In some aspects, the first wireless device 205-*a*, the second wireless device 205-*b*, and the third wireless device 205-*c* may include nodes of a star topology sidelink network. For example, the second wireless device 205-*b* (e.g., PLC) may include a central node in a star topology sidelink network, where the first wireless device 205-*a* (e.g., S/A) and the third wireless device 205-*c* may include peripheral nodes in the star topology sidelink network. As such, transmissions from the central node (e.g., second wireless device 205-*b*, PLC) to the peripheral nodes (e.g., first wireless device 205-*a*, third wireless device 205-*c*, S/As) may be referred to as downlink transmissions within the star topology sidelink network, and transmissions form the peripheral nodes to the central node may be referred to as uplink transmissions within the star topology sidelink network.

In some cases, I-IoT networks may require strict latency requirements (e.g., 1-2 ms latency) as well as high reliability requirements (e.g., $10^{-6}$ error rate). In such cases, carrying out all communications directly between the base station 105-*a* and the S/As (e.g., first wireless device 205-*a*, third wireless device 205-*c*) may and detrimentally affect latency and reliability. Accordingly, sidelink communications between a PLC (e.g., second wireless device 205-*b*) and S/As (e.g., first wireless device 205-*a*, third wireless device 205-*c*) may enable for direct communications which may reduce latency and improve reliability.

In cases where the wireless communications system 200 includes an I-IoT network, the second wireless device 205-*b* may include a PLC which may be configured to support any quantity of S/As and/or UEs 115. In the context of I-IoT networks, PLCs may be used for simple and flexible deployment of S/As, and may support (e.g., control) up to one hundred S/As, including the first wireless device 205-*a* and the third wireless device 205-*c*. Moreover, by enabling for PLCs to schedule transmissions for S/As, processing capabilities, supported bandwidths, and complexities of S/As may be significantly reduced as compared to PLCs. Traffic within an I-IoT network may generally be deterministic, with small packet sizes (e.g., 32-256 bytes). Thus, a bandwidth of transmissions within an I-IoT network may be relatively low (e.g., bandwidth of two resource blocks). However, an overall bandwidth for an I-IoT network may be relatively large, and may include dedicated frequency bands, unlicensed frequency bands, or both.

In the context of I-IoT networks, S-UCI may refer to control information which is transmitted from an S/A to a PLC. In this regard, S-UCI may refer to an "uplink transmission" including control information which is transmitted from the first wireless device 205-*a* and/or the third wireless device 205-*c* to the second wireless device 205-*b*. Conversely, S-DCI may refer to control information which is transmitted from a PLC to a S/A. In this regard, S-DCI may refer to a "downlink transmission" including control information which is transmitted from the second wireless device 205-*b* to the first wireless device 205-*a* and/or the third wireless device 205-*c*.

In some aspects, the communication links 215-*a*, 215-*b* between the respective wireless devices 205 (e.g., sidelink communication links) may be included within a sidelink network of the wireless communications system 200. The sidelink network (e.g., sidelink network including the communication links 215-*a*, 215-*b*) may be configurable to operate in a "Mode 1" and/or a "Mode 2." While operating in Mode 1, the sidelink network (e.g., communication links 215-*a*, 215-*b*) may be managed (e.g., coordinated) by the base station 105-*a*. In this regard, during Mode 1 operation, the base station 105-*a* may manage resource allocation over the communication links 215-*a*, 215-*b*, and may allocate sets of resources within the communication links 215-*a*, 215-*b* to the respective wireless devices 205-*a*, 205-*b*, and 205-*c*. In some cases, the base station 105-*a* may allocate sets of sidelink resources to the respective wireless devices 205 during Mode 1 operation via RRC signaling, DCI messages (e.g., DCI 3_0), or both. During Mode 1 operation, the base station 105-*a* may allocate sidelink resources via dynamic grants, configured grants (e.g., type 1 configured grants, type 2 configured grants), or both. Within Mode 1 operation, a modulation and coding scheme (MCS) used for transmissions across the communication links 215-*a*, 215-*b* (e.g., sidelink communication links 215-*a*, 215-*b*) may be left up to the respective wireless devices 205, within limits which are pre-configured at the wireless devices 205 and/or signaled by the base station 105-*a*.

Comparatively, while operating in Mode 2, the sidelink network (e.g., communication links 215-*a*, 215-*b*) may not be managed (e.g., may not be coordinated) by the base station 105-*a*. Without coordination or management of the resources of the sidelink network during the Mode 2 operation, the wireless devices 205 may be configured to monitor the sidelink network, and determine sets of sidelink resources which are available for transmission of sidelink signals via the sidelink communication links 215-*a*, 215-*b*. In particular, the second wireless device 205-*a* (e.g., PLC) may "autonomously" determine sidelink resources which are to be used within the communion links 215-*a*, 215-*b* by monitoring the communication links 215-*a*, 215-*b* (e.g., perform channel sensing), and blindly decoding all PSCCH channels within the communication links 215-*a*, 215-*b* to identify sidelink resources which have been reserved by other wireless devices. Subsequently, the second wireless device 205-*b* (e.g., PLC) may report available sidelink resources to the upper layer, and may allocate sets of sidelink resources to the first wireless device, 205-*a*, the third wireless device 205-*b*, or both. In this regard, Mode 2 operation of the sidelink network including the communication links 215-*a*, 215-*b* may follow contention-based access procedures in which the various wireless devices 205 to "compete" for the use of the sidelink network, including the communication links 215-a, 215-b.

In the context of cellular vehicle-to-everything (C-V2X) communications, wireless devices may be configured to perform blind decoding for all sidelink subchannels. The number of sidelink subchannels within a sidelink network may be relatively small (e.g., approximately 1-27 subchannels within a resource pool) such that blind decoding of all subchannels is still feasible. Moreover, in a sidelink communication link (e.g., communication links 215-a, 215-b), PSCCH and PSSCH may be transmitted within a same slot. In particular, PSSCH may occupy up to $N_{subchannels}^{SL}$ contiguous subchannels, where PSCCH may occupy a quantity of physical resource blocks (PRBs) (e.g., 10 PRBs, 12 PRBs, 15 PRBs, 25 PRBs, 50 PRBs, 75 PRBs, 100 PRBs) up to one subchannel (e.g., subchannel with lowest subchannel index). For example, a PSCCH may be fixed to a quantity of symbols of a defined percentage (e.g., 10-100%) of a single subchannel. Moreover, a PSCCH of a sidelink communication link may be configured (e.g., pre-configured) up to two or three symbols (e.g., first 2-3 symbols). A subchannel size for a sidelink communication link may be relatively large (e.g., relatively large (e.g., 10-100 PRBs).

As noted previously herein, sidelink communications between wireless devices 205 may be performed via PSCCHs and PSSCHs. SCI (e.g., SCI 1_0) may be transmitted between the participating wireless devices via two different messages, where SCI-1 is broadcast during via PSCCH and provides, among other information, details regarding SCI-2, which may transmitted via PSSCH. According to some techniques, SCI-1 may be used to schedule transmissions including sidelink-related control information (e.g., S-UCI, S-DCI), and may be transmitted only within PSCCH. Information which may be included within SCI-1 may include, but is not limited to, information regarding PSSCH bandwidth, frequency allocation bits (e.g., frequency domain resource allocation (FDRA) bits), time resource allocation bits (e.g., time domain resource allocation (TDRA) bits), information regarding a resource reservation period, DMRS pattern bits for sidelink communications, format bits of SCI-2, beta offset bits for rate matching, DMRS port bits, an MCS bits for sidelink communications (e.g., MCS table), PSFCH overhead indicator bits, and the like. In this regard, SCI-1 may be transmitted by wireless devices (e.g., second wireless device 205-b) to allow for channel sensing and to avoid resource collision.

Moreover, SCI-1 may include information which allows other wireless devices to receive and decode information included within SCI-2. Information included within SCI-2 may include, but is not limited to, HARQ identifier bits, new data indicator (NDI) bits, redundancy version (RV) bits, source/destination identifier bits, HARQ enable/disable bits, cast type bits, CSI request bits, zone identifier bits, communication range bits, and the like.

However, according to some communications techniques, PSCCH information (including SCI-1) may only be transmitted in conjunction with PSSCH information. In this regard, according to some techniques, SCI-1 may not be transmitted in the absence of PSSCH data. Therefore, without PSSCH data, SCI-1 which may be used to schedule transmissions for sidelink-related control information may not be sent. Nevertheless, there are times when a sidelink wireless device may have sidelink-related control information to transmit even in the absence of any sidelink transmissions (e.g., PSSCH data transmissions).

Accordingly, the wireless communications system 200 may provide for the scheduling and transmission of control information (e.g., S-UCI) via a sidelink communication link even in the absence of sidelink data transmissions. In particular, the wireless communications system 200 may support techniques which enable for control information to be scheduled via SCI-2, thereby enabling for control information to be scheduled within a wireless communications link in the absence of PSSCH data. In some aspects, control information scheduled by the SCI-2 may include S-UCI. By enabling for sidelink-related control information (e.g., S-UCI) to be scheduled via SCI-2, techniques described herein may reduce a latency of sidelink communications, and may improve resource utilization of sidelink resources.

For example, in some aspects, the base station 105-a may transmit a control message 220 indicating a set of resources to be used for a sidelink communication link (e.g., sidelink communication link 215-a). In some aspects, the base station 105-a may transmit the control message 220 to the first wireless device 205-a, the second wireless device 205-b, the third wireless device 205-c, or any combination thereof. For instance, as shown in FIG. 2, the base station 105-a may transmit the control message to the second wireless device 205-b (e.g., PLC) via the communication link 210. The control message 220 may include an allocation of resources (e.g., time resources, frequency resources, spatial resources) associated with a sidelink communication link (e.g., communication link 215-a) which may be used by the first wireless device 205-a, the second wireless device 205-b, or both. The control message 220 may include an RRC message, a DCI message, an SSB message, or any combination thereof. In some aspects, the third wireless device 105-a may transmit the control message 220 indicating the sidelink resources through a Mode 1 operation of a sidelink network.

In some aspects, the second wireless device 205-b (e.g., PLC) may monitor a sidelink network including one or more sidelink communication links (e.g., communication link 215-a, communication link 215-b). In some aspects, the second wireless device 205-b may monitor the sidelink communication link through a Mode 2 operation of the sidelink network in order to identify resources of the sidelink network which may be used by the second wireless device 205-b, the first wireless device 205-a, or both. In this regard, the second wireless device 205-b may monitor one or more sidelink communication links by performing blind decoding of the PSCCHs of the respective sidelink communication links.

In some aspects, the second wireless device 205-b may determine a set of sidelink resources of the sidelink communication link 215-a which may be used by the first wireless device 205-a, the second wireless device 205-b, or both. The second wireless device 205-b may determine the set of resources of the sidelink communication link 215-a based on monitoring the sidelink communication link 215-a. In this regard, the second wireless device 205-b may determine the set of resources as part of the Mode 2 operation of the sidelink communication link 215-a. When determining sets of sidelink resources in Mode 2 operation, the second wireless device 205-b may be said to "reserve" the set of sidelink resources of the sidelink communication link 215-a. Therefore, it is noted herein that the second wireless device 205-b may be configured to determine a set of sidelink resources of the sidelink communication link 215-a which may be used via the control message 220 received from the base station 105-a (Mode 1 operation), by monitoring and determining the set of sidelink resources at of the sidelink communication link 215-a, (Mode 2 operation), or both.

In some aspects, the second wireless device 205-b may transmit an indication of a set of sidelink resources 225 to the first wireless device 205-*a*. In some aspects, the set of sidelink resources 225 may be usable by the first wireless device 205-*a* to transmit an uplink transmission 240 (e.g., S-UCI) to the second wireless device 205-*b*. The indication of the set of sidelink resources 225 may be indicated via a sidelink communication link 215-*a* between the first wireless device 205-*a* and the second wireless device 205-*b*. Additionally, the indication of the set of sidelink resources 225 may be indicated via control signaling (e.g., RRC signaling, DCI signaling, SCI signaling). The second wireless device 205-*b* may transmit the indication of the set of sidelink resources 225 based on receiving the control message 220 from the base station 205-*a*, monitoring the sidelink communication link 215-*a*, determining a set of sidelink resources of the sidelink communication link 215-*a*, or any combination thereof.

For example, in cases where the second wireless device 205-*b* receives the control message 220 indicating a set of sidelink resources (Mode 1 operation), the second wireless device 205-*b* may transmit an indication of at least a subset of the set of resources received at via the control message 220 to the first wireless device 205-*a* via the indication of the sidelink resources 225. By way of another example, in cases where the second wireless device 205-*b* monitors the sidelink communication link 215-*a* and determines (e.g., reserves) the set of sidelink resources (Mode 2 operation), the second wireless device 205-*b* may transmit an indication of at least a subset of the determined set of resources to the first wireless device 205-*a* via the indication of the sidelink resources 225. From the perspective of the first wireless device 205-*a*, the first wireless device 205-*a* may also determine a set of sidelink resources of the sidelink communication link 215-*a* which may be used via Mode 1 operation (e.g., via a control message 220 received from the base station 105-*a* (not shown)), via Mode 2 operation (e.g., via the indication of the sidelink resources 225 received from the second wireless device 205-*b*), or both.

In some aspects, the first wireless device 205-*a* may receive, from the second wireless device 205-*b*, an RRC message 230. In some aspects, the first wireless device 205-*a* may receive the RRC message 230 based on receiving a control message 220 from the base station 105-*a* (not shown), receiving an indication of a set of sidelink resources 225, or both. In some aspects, the RRC message 230 may include information for configuring communications between the first wireless device 205-*a* and the second wireless device 205-*b* via the sidelink communication link 215-*a* between the respective devices. Data which may be indicated via the RRC message 230 may include, but is not limited to, sets of sidelink resources for transmissions between the first and second wireless devices 205-*a*, 205-*b*, relationships between sets of sidelink resources which are used to schedule transmissions between the respective wireless devices 205 and the sets of sidelink resources used for the scheduled transmission, parameters associated with scheduled transmissions between the respective wireless devices 205, or any combination thereof.

In some cases, the RRC message 230 may indicate a set of sidelink resources of the sidelink communication link 215-*a* which are dedicated for transmission of S-UCI and S-DCI (e.g., "dedicated sidelink resources"). In this example, the RRC message 230 may indicate a dedicated pool of sidelink resources for transmission/reception of S-UCI and/or S-DCI. Thus, the set of sidelink resources indicated via the RRC message 230 may be dedicated for information associated with sidelink coordination, HARQ data, CSI-reports, scheduling requests (e.g., sidelink scheduling requests), slot format indicators (SFIs), buffer status reports, link recovery requests, and the like. The set of sidelink resources which are dedicated for transmission of S-UCI and S-DCI may include sidelink resources which do not include PSCCH resources, PSSCH resources, or both. Additionally or alternatively, the set of dedicated sidelink resources 225 may include PSCCH resources, PSSCH resources, or both.

As will be discussed in further detail herein with respect to FIG. 3, the set of sidelink resources of the sidelink communication link 215-*a* which are dedicated for transmission of S-UCI and S-DCI may be multiplexed (e.g., FDM) with legacy sidelink resources. For example, in some cases, wireless devices 205 (e.g., UEs 115) may not be configured or expected to utilize the last $N_{PRB}$ mode $n_{subCHsize}$ PRBs within a pool of sidelink resources. In this example, the unused PRBs of the pool of sidelink resources may include "dedicated" sidelink resources which are reserved for transmission/reception of S-UCI and/or S-DCI. In some cases, the set of dedicated sidelink resources may span up to the size of a subchannel in the frequency domain. Moreover, the set of dedicated sidelink resources may be sub-divided up at the mini-slot or symbol level in the time domain, and may be sub-divided up at the resource block, resource element, resource element group, and/or control channel element in the frequency domain. This finer granularity within the set of dedicated sidelink resources may allow for improved flexibility of sidelink signaling (e.g., control signaling) within the sidelink network.

In additional or alternative cases, the RRC message 230 may indicate one or more parameters associated with transmissions (e.g., S-UCI, S-DCI) that are transmitted via the sidelink communication link 215-*a*. For example, in cases where the second wireless device 205-*b* is to schedule an uplink transmission 240 (e.g., UCI, S-UCI, uplink data message) from the first wireless device 205-*a* to the second wireless device 205-*b*, the RRC message 230 may indicate a set of parameters for the scheduled uplink transmission 240. Parameters associated with a scheduled uplink transmission 240 may include, but are not limited to, a bundling size of the uplink transmission 240, an interleaving configuration, a frequency hopping configuration, a periodicity, or any combination thereof.

In additional or alternative aspects, the RRC message 230 may indicate a relationship between sets of sidelink resources. In particular, the RRC message 230 may indicate a relationship between a first set of sidelink resources associated with a first transmission which schedules second transmission and a second set of sidelink resources which are to be used for the second transmission. For example, in cases where the second wireless device 205-*b* is to transmit SCI 235-*b* (e.g., SCI-2) which schedules an uplink transmission 240 (e.g., S-UCI) from the first wireless device 205-*a* to the second wireless device 205-*b*, the RRC message 230 may indicate a relationship between a first set of sidelink resources used to transmit the SCI 235-*b*, and a second set of sidelink resources for the uplink transmission 240. The relationship may include a relationship between sets of frequency resources, between sets of time resources, or both.

In some aspects, first wireless device 205-*a* may receive additional SCI 235-*a* from the second wireless device 205-*b*. The additional SCI 235-*a* may be received via a sidelink control channel (e.g., PSCCH) of the sidelink communication link 215-*a* between the first wireless device 205-*a* and the second wireless device 205-*b*. In some aspects, the additional SCI 235-*a* may include SCI in a first SCI format (e.g., SCI-1). The first wireless device 205-*a* may receive the additional SCI 235-*a* (e.g., SCI-1) based on receiving the set of sidelink resources 225, receiving the RRC message 230, or both. In some aspects, the additional SCI 235-*a* may include information which may be used by the first wireless device 205-*b* to receive, demodulate, and/or decode SCI 235-*b* (e.g., SCI-2).

The first wireless device 205-*a* may additionally receive SCI 235-*b* from the second wireless device 205-*b*, where the SCI 235-*b* schedules an uplink transmission 240 from the first wireless device 205-*a* to the second wireless device 205-*b*. The SCI 235-*b* may be received via a sidelink shared channel (e.g., PSSCH) of the sidelink communication link 215-*a* between the first wireless device 205-*a* and the second wireless device 205-*b*. In some aspects, the SCI 235-*b* may include SCI in a second SCI format (e.g., SCI-2) which is different from the first SCI format. The first wireless device 205-*a* may receive the SCI 235-*b* (e.g., SCI-2) based on, receiving the set of sidelink resources 235 for the uplink transmission 240, receiving the RRC message 230, receiving the additional SCI 235-*a* (e.g., SCI-1), or any combination thereof.

As noted previously herein, the term "uplink transmission" may be used to refer to messages or signals (e.g., S-UCI) which are transmitted from a S/A (e.g., first wireless device 205-*a*) to a PLC (e.g., second wireless device 205-*b*) via a sidelink communication link (e.g., communication link 215-*a*). Conversely, the term "downlink transmission" may be used to refer to messages or signals which are transmitted from a PLC (e.g., second wireless device 205-*b*) to a S/A (e.g., first wireless device 205-*a*) via a sidelink communication link (e.g., communication link 215-*a*). In this regard, for the purposes of the present disclosure, the term "uplink transmission" may be used to refer to messages or signals which are transmitted from the first wireless device 205-*a* to the second wireless device 205-*b* via the communication link 215-*a*. In some aspects, the uplink transmission 240 from the first wireless device 205-*a* to the second 205-*b* which is scheduled by the SCI 235-*b* may include a UCI, an uplink data message, or both. For example, in some cases, the uplink transmission scheduled by the SCI 235-*b* may include S-UCI.

In some aspects, the SCI 235-*b* (e.g., SCI-2) may include information associated with the uplink transmission 240 scheduled by the SCI 235-*b* including, but not limited to, sidelink resources for performing the uplink transmission 240, CSI reporting information, a configuration for transmitting the uplink transmission 240 (e.g., periodically, aperiodically, semi-persistently), a time interval for transmitting the uplink transmission 240, a format for the uplink transmission 240, or any combination thereof.

For example, the SCI 235-*b* (e.g., SCI-2) may include an indication of a set of sidelink resources which is to be used to transmit the uplink transmission 240. In some aspects, the indication of the set of sidelink resources may be included within the SCI 235-*b* within one or more bit fields associated with an allocation of time resources (e.g., TDRA bit fields), within one or more bit fields associated with an allocation of frequency resources (e.g., FDRA fields), or both. For instance, in some cases, the first wireless device 205-*a* may receive a set of sidelink resources 225 of the sidelink communication link 215-*a* which may be used by the first wireless device 205-*a*. In this example, the SCI 235-*b* may include TDRA fields and/or FDRA fields which indicate at least a subset of the set of sidelink resources 225 which are to be used to transmit the uplink transmission 240.

By way of another example, as noted previously herein, the RRC message 230 may indicate a set of sidelink resources which are dedicated for transmission of S-UCI and/or reception of S-DCI (e.g., set of dedicated sidelink resources). In this example, the SCI 235-*b* may include an indication of a subset of the set of sidelink resources (e.g., subset of the set of dedicated sidelink resources) which is to be used for transmitting the uplink transmission 240.

In some aspects, the SCI 235-*b* may include information associated with CSI reporting. The SCI 235-*b* may include fields for enabling or disabling CSI reporting by the first wireless device 205-*a*. For example, in some cases, the SCI 235-*b* may include one or more bit field values associated with enabling or disabling CSI reporting. In additional or alternative aspects, the SCI 235-*b* may indicate whether the first wireless device 205-*a* is to transmit the uplink transmission 240 (e.g., S-UCI) periodically, aperiodically, semi-persistently (e.g., responsive to MAC-CE messages and/or DCI messages received from the second wireless device 205-*b*), or any combination thereof.

In some aspects, the SCI 235-*b* may indicate HARQ information associated with the SCI 235-*b*, the uplink transmission 240 scheduled by the SCI 235-*b*, or both. For example, the SCI 235-*b* may indicate whether the first wireless device 205-*a* is to transmit HARQ information acknowledging receipt of the SCI 235-*b*. In this example, the first wireless device 205-*a* may transmit a feedback message (e.g., ACK, NACK) to the second wireless device 205-*b* based on receiving (or failing to receive/demodulate) the SCI 235-*b*.

In some aspects, the SCI 235-*b* may include an indication of a format associated with the uplink transmission 240 scheduled by the SCI 235-*b*. In this regard, the SCI 235-*b* may indicate a format which the first wireless device 205-*a* is to use to generate and transmit the uplink transmission 240. The format indicated by the SCI 235-*b* may include one or more fields for indicating a frequency hopping configuration, a repetition configuration, an OCC, or any combination thereof. By way of another example, the format may indicate that the uplink transmission 240 is to include a PUCCH format (e.g., PUCCH format 0_4). Additionally or alternatively, the SCI 235-*b* may include an indication of a time interval (e.g., quantity of slots) between reception of the SCI 235-*b* and transmission of the uplink transmission 240 scheduled by the SCI 235-*b*. For example, the SCI 235-*b* may indicate that the first wireless device 205-*a* is to transmit the uplink transmission 240 two slots after receiving the SCI 235-*b*. In this regard, the SCI 235-*b* may indicate a relationship between a first set of sidelink resources used for reception of the SCI 235-*b*, and a second set of sidelink resources used for transmission of the uplink transmission 240. In some aspects, the time interval may be based on a processing capability of the first wireless device 205-*a*, which may be indicated from the first wireless device 205-*a* to the second wireless device 205-*b* via capability signaling (e.g., capability report).

The SCI 235-*b* may include additional information, which may be represented in any quantity or type of bit fields. Other information which may be included within the SCI-2 may include, but is not limited to, source/destination identifiers associated with the SCI 235-*b* and/or uplink transmission 240, cast-types, HARQ process identifiers, new data indicator fields, redundancy version fields, FDRA/TDRA fields, resource indicators for pre-configured FDRA/TDRA configurations associated with the uplink transmission 240, and the like. Moreover, the RRC message 230 may also include other information for interpreting data included within the SCI 235-*b*. For example, in some cases, the RRC message 230 may configure the first wireless device 205-*a* with TDRA/TDRA tables for interpreting resource allocations indicated via the SCI-2, mapping types (e.g., mapping types for granularity, bundling size, interleaving configurations, frequency hopping configurations), parameters for scheduling uplink transmissions 240 via configured grants and/or semi-persistent scheduling, or any combination thereof.

The additional SCI 235-*a* and/or the SCI 235-*b* illustrated in FIG. 2 may be configured to support improved payload sizes and formats associated with S-DCI and/or S-UCI. In particular, the SCIs 235 may indicate different characteristics and/or parameters associated with S-UCI and/or S-DCI including, but not limited to, formats, payload sizes, coverage enhancement schemes (e.g., reliability requirements), repetitions (e.g., repetition in consecutive slots), and the like. For example, the SCIs 235-*a*, 235-*b* may indicate varying levels of repetition and/or aggregation for S-UCI and/or S-DCI in order to adjust a coverage enhancement level of the S-UCI and/or S-DCI.

In some aspects, the first wireless device 205-*a* may identify that the first wireless device 205-*a* is to transmit a HARQ message 245 to the second wireless device 205-*b* via a sidelink feedback channel (e.g., PSFCH) of the sidelink communication link 215-*a*. In some aspects, the first wireless device 205-*a* my identify the HARQ message 245 to be transmitted at based on receiving the indication of the sidelink resources 225, receiving the RRC message 230, receiving the additional SCI 235-*a* (e.g., SCI-1), receiving the SCI 235-*b* (e.g., SCI-2), or any combination thereof. Additionally or alternatively, the first wireless device 205-*a* my identify the HARQ message 245 to be transmitted based on receiving another transmission (e.g., S-DCI) from the second wireless device 205-*b*.

Upon identifying the HARQ message to be transmitted, the first wireless device 205-*a* may identify a payload size of the HARQ message 245. The payload size of the HARQ message 245 may include any metric indicative of a size of data (e.g., bits, bytes). In some aspects, the first wireless device 205-*a* may identify the payload size of the HARQ message 245 based on a periodicity of transmissions performed via the sidelink feedback channel (e.g., periodicity of PSFCH transmissions). In some aspects, the first wireless device 205-*a* may compare the determined payload size of the HARQ message 245 to one or more threshold payload sizes. In this regard, the first wireless device 205-*a* may be configured to determine whether the payload size of the HARQ message 245 satisfies the one or more threshold payload sizes. In some cases, the first wireless device 205-*a* may be configured to determine that the determined payload size associated with the HARQ message 245 ($HARQ_{PS}$) satisfies a threshold payload size ($Thresh_{PS}$) if the determined payload size is less than or equal to the threshold payload size (e.g., threshold satisfied if $HARQ_{PS} \leq Thresh_{PS}$).

In some cases, the first wireless device 205-*a* may multiplex the HARQ message 245 with the uplink transmission 240 scheduled by the SCI 235-*b* (e.g., SCI-2). In some aspects, the first wireless device 205-*a* may multiplex the HARQ message 245 with the uplink transmission 240 without transmitting the HARQ message 245 via the sidelink feedback channel (e.g., refrain from transmitting the HARQ message 245 via the PSFCH). For example, the first wireless device 205-*a* may multiplex the HARQ message 245 with the uplink transmission 240 (e.g., S-UCI) based on identifying that the determined payload size of the HARQ message 245 satisfies the threshold payload size (e.g., $HARQ_{PS} \leq Thresh_{PS}$). In this regard, the HARQ message 245 may be multiplexed with the uplink transmission 240 in cases where the HARQ message is sufficiently small. In this example, because the HARQ message 245 is multiplexed with the uplink transmission 240, the first wireless device 205-*a* may refrain from transmitting the HARQ message 245 on the sidelink feedback channel (e.g., PSFCH).

In additional or alternative cases, the first wireless device 205-*a* may determine that at least a portion of the HARQ message 245 is not to be multiplexed with the uplink transmission 240 scheduled by the SCI 235-*b*. For example, the first wireless device 205-*a* may determine that at least a portion of the HARQ message 245 is not to be multiplexed with the uplink transmission 240 based on identifying that the determined payload size of the HARQ message 245 does not satisfy the threshold payload size (e.g., $HARQ_{PS} > Thresh_{PS}$). In this regard, the first wireless device 205-*a* may determine that the HARQ message 245 is too large to be entirely multiplexed with the uplink message 240. In such cases, as will be described in further detail herein, the first wireless device 205-*a* may be configured to transmit at least portions of the HARQ message 245 via the sidelink shared channel (e.g., PSFCH), via the uplink transmission 240, or both.

In some aspects, the first wireless device 205-*a* may generate the uplink transmission 240 (e.g., UCI, S-UCI, uplink data message) scheduled by the SCI 235-*b*. In this regard, the first wireless device 205-*a* may generate the uplink transmission 240 based on receiving the SCI 235-*b*. Additionally or alternatively, the first wireless device 205-*a* may generate the uplink transmission 240 based on receiving the sidelink resources 225, receiving the RRC message 230, receiving the additional SCI 235-*a* (e.g., SCI-1), identifying the HARQ message 245, determining the payload size of the HARQ message 245, multiplexing the HARQ message 245 with the uplink transmission 240, or any combination thereof. For example, in cases where the SCI 235-*b* indicates a format for the uplink transmission 240, the first wireless device 205-*a* may generate the uplink transmission 240 based on (e.g., in accordance with) the format.

Subsequently, the first wireless device 205-*a* may transmit, to the second wireless device 205-*b*, the uplink transmission 240 scheduled by the SCI 235-*b*. In this regard, the first wireless device 205-*a* may transmit the uplink transmission 240 based on (e.g., in accordance with) the SCI 235-*b*. Additionally or alternatively, the first wireless device 205-*a* may transmit the uplink transmission 240 based on receiving the sidelink resources 225, receiving the RRC message 230, receiving the additional SCI 235-*a* (e.g., SCI-1), identifying the HARQ message 245, determining the payload size of the HARQ message 245, multiplexing the HARQ message 245 with the uplink transmission 240, generating the uplink transmission 240, or any combination thereof.

For example, in cases where the RRC message 230 indicates a set of resources of the sidelink communication link 215-*a* which are dedicated for transmission/reception of S-UCI and/or S-DCI (e.g., set of dedicated sidelink resources), the first wireless device 205-*a* may transmit the uplink transmission 240 via at least a portion (e.g., at least a subset) of the set of resources (e.g., via at least a subset of the set of dedicated sidelink resources). For instance, in some cases, the RRC message 230 may indicate a set of dedicated sidelink resources, and the SCI-2 235-*b* may indicate a subset of the set of dedicated sidelink resources. In this example, the first wireless device 205-*a* may transmit the uplink transmission 240 within the subset of the set of dedicated sidelink resources indicated via the SCI-2. By way of another example, in cases where the RRC message 230 indicates a relationship between a first set of sidelink resources for receiving the SCI 235-band a second set of sidelink resources for transmitting the uplink transmission 240, the first wireless device 205-a may transmit the uplink transmission 240 based on (e.g., in accordance with) the relationship.

The uplink transmission 240 may be transmitted based on additional or alternative parameters or characteristics indicated via the RRC message 230, the additional SCI 235-a, the SCI 235-b, or any combination thereof. For example, in cases where the RRC message 230 indicates one or more parameters associated with transmission of the uplink transmission 240 (e.g., bundling size, interleaving configuration, frequency hopping configuration, periodicity), the first wireless device 205-a may transmit the uplink transmission 240 based on (e.g., in accordance with) the one or more parameters. By way of another example, in cases where the SCI 235-b indicates a time interval between reception of the SCI 235-b and transmission of the uplink transmission 240, the first wireless device 205-a may transmit the uplink transmission 240 based on (e.g., in accordance with) the time interval. By way of another example, in cases where the SCI 235-b includes an indication to transmit the uplink transmission 240 periodically, aperiodically, and/or semi-persistently, the first wireless device 205-a may transmit the uplink transmission 240 based on (e.g., in accordance with) based on the indication. In this regard, the first wireless device 205-a may transmit the uplink transmission 240 periodically, aperiodically, and/or semi-persistently (e.g., responsive to MAC-CE messages, DCI (S-DCI) messages, and/or RRC messages received from the second wireless device 205-b).

In some aspects, the uplink transmission 240 may include CSI, inter-wireless device coordination information, or both. For example, in some cases, the SCI 235-b may include one or more bit fields associated with enabling or disabling CSI reporting. In this example, the uplink transmission 240 may include a CSI report associated with the sidelink communication link 215-a between the first wireless device 205-a and the second wireless device 205-b based on one or more values of the one or more bit field values.

In some aspects, the first wireless device 205-a may additionally or alternatively transmit the HARQ message 245 to the second wireless device 205-b. In some cases, at least a portion of the HARQ message 245 may be transmitted separately from the uplink transmission 240. In some aspects, the first wireless device 205-a may transmit the HARQ message 245 based on identifying the HARQ message 245, identifying the payload size of the HARQ message 245, multiplexing (or refraining from multiplexing) the HARQ message 245 with the uplink transmission 240, generating the uplink transmission 240, transmitting the uplink transmission 240, or any combination thereof.

For example, in cases where the determined payload size of the HARQ message 245 fails to satisfy the threshold payload size (e.g., $HARQ_{PS} > Thresh_{PS}$), the first wireless device 205-a may transmit at least a first portion of the HARQ message 245 to the second wireless device 205-b via the sidelink feedback channel (e.g., PSFCH) of the sidelink communication link 215-a. In this example, the uplink transmission 240 may be transmitted on a channel which is different from the PSFCH (e.g., PSCCH, PSSCH, other dedicated sidelink resources). Continuing with the same example, in some cases, the first wireless device 205-a may additionally transmit at least a portion (e.g., second portion) of the HARQ message 245 via the uplink transmission 240.

In this regard, the first wireless device 205-a may transmit portions of the HARQ message 245 via both the uplink transmission 240 and the sidelink shared channel. In such cases, transmission of the uplink transmission 240 may at least partially overlap with the sidelink feedback channel. Moreover, in some cases, the sidelink feedback channel (e.g., PSFCH) may puncture the uplink transmission 240. Transmission of HARQ data in the presence of the uplink transmission 240 will be discussed in further detail herein with respect to FIG. 4.

Techniques described herein may enable sidelink-related transmissions (e.g., S-UCI) to be scheduled even in the absence of sidelink data. In particular, techniques described herein may enable S-UCI to be scheduled via SCI-2, thereby enabling S-UCI to be scheduled via PSCCH resources, PSSCH resources, or both. By allowing for sidelink-related control information to be scheduled even in the absence of sidelink data, techniques described herein may reduce latency of sidelink communications and lead to more efficient use of sidelink resources.

Figure 3:
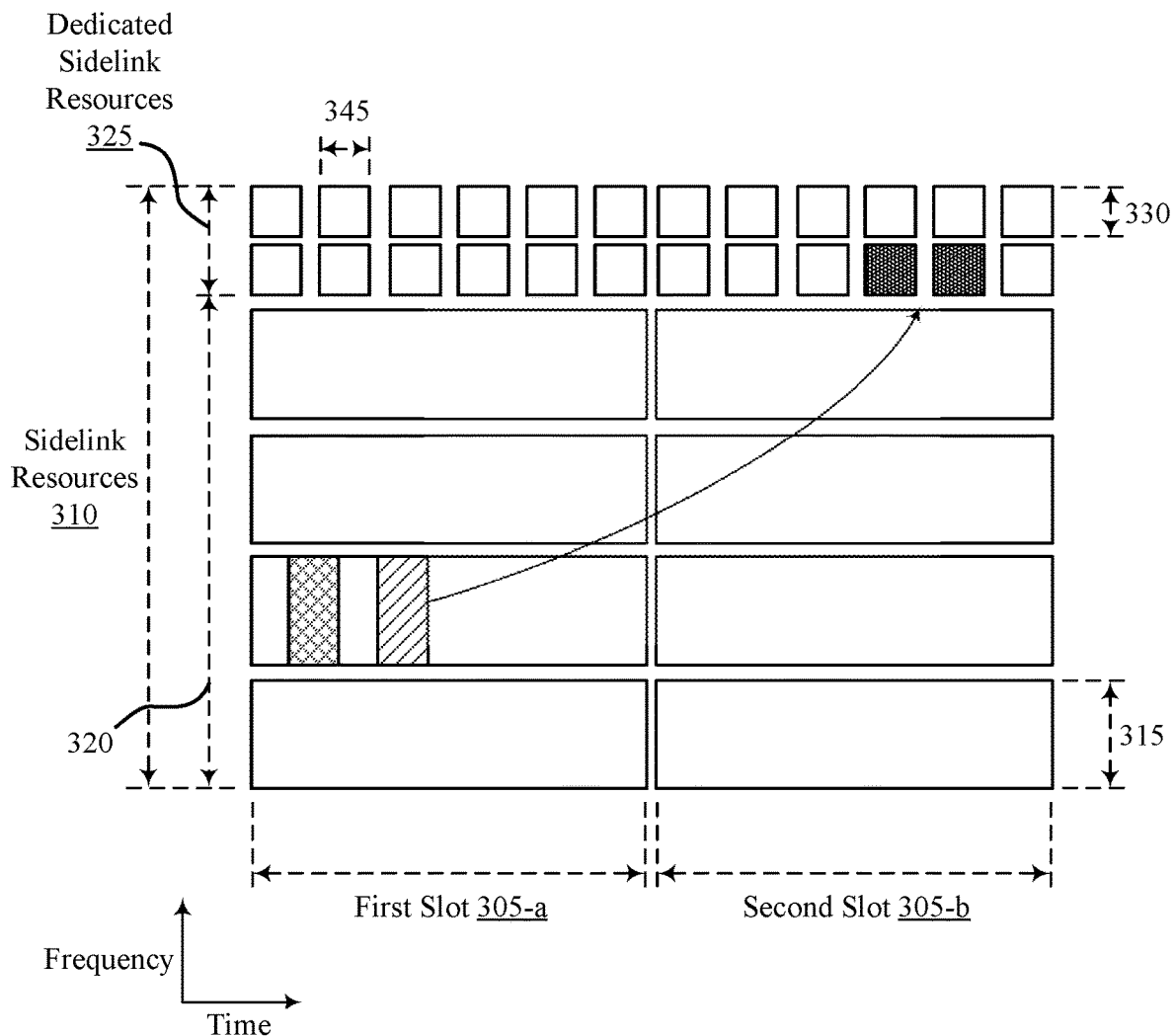
FIG. 3 illustrates an example of a resource allocation scheme that supports techniques for sidelink control signaling in accordance with aspects of the present disclosure.

FIG. 3 illustrates an example of a resource allocation scheme 300 that supports techniques for sidelink control signaling in accordance with aspects of the present disclosure. In some examples, the resource allocation scheme 300 may implement, or be implemented by, aspects of wireless communications system 100, wireless communications system 200, or both.

Resource allocation scheme 300 illustrates a set of sidelink resources 310 which include sidelink resources in a first slot 305-a and a second slot 305-a in the time domain. The set of sidelink resources 310 may span any quantity of slots 305 or other transmission time intervals. Moreover, the set of sidelink resources 310 may span a quantity of subchannels 315 (or other group of frequency resources) in the frequency domain. The set of sidelink resources 310 may include a set of sidelink resources associated with a sidelink communication link (e.g., communication link 215-a illustrated in FIG. 2) of a sidelink network.

In some aspects, the set of sidelink resources 310 may include a first portion of sidelink resources 320 and a second portion of sidelink resources 325. In some aspects, the first portion of sidelink resources 315 may be generally referred to as "legacy" sidelink resources. In this regard, the first portion of sidelink resources 320 may include PSSCH resources, PSCCH resources, or both. Accordingly, the first portion of sidelink resources 315 may include resources of a sidelink communication link which may be used for transmission of SCI 335 (e.g., SCI-1, SCI-2), PSSCH transmissions, or both.

The second portion of sidelink resources 325 may include a set of dedicated sidelink resources. For example, as noted previously herein, wireless device 305 (e.g., base station 105-a and/or second wireless device 205-b (PLC) illustrated in FIG. 2) may reserve or otherwise indicate a set of sidelink resources (e.g., second portion of sidelink resources 325) of a sidelink communication link which are dedicated for transmission of S-UCI and S-DCI (e.g., "dedicated sidelink resources 325"). In this example, the set of dedicated sidelink resources 325 may include a dedicated pool of the set of sidelink resources 310 which are reserved for transmission/reception of S-UCI and/or S-DCI. Thus, the set of dedicated sidelink resources 325 may be dedicated for information associated with sidelink coordination, HARQ data, CSI-reports, scheduling requests (e.g., sidelink scheduling requests), SFIs, and the like. In some cases, the set of dedicated sidelink resources 325 which are dedicated for transmission of S-UCI and S-DCI may include sidelink resources which do not include PSCCH resources, PSSCH resources, or both. Additionally or alternatively, the set of dedicated sidelink resources 325 may include PSCCH resources, PSSCH resources, or both.

The set of dedicated sidelink resources 325 which are dedicated for transmission/reception of S-UCI and S-DCI may be multiplexed (e.g., FDM) with legacy sidelink resources (e.g., first portion of sidelink resources 320). For example, in some cases, wireless devices (e.g., UEs 115, S/As, PLCs) may not be configured or expected to utilize the last $N_{PRB}$ mode $n_{subCHsize}$ PRBs within the set of sidelink resources 310. In this example, the unused PRBs of the set of sidelink resources 310 may include set of dedicated sidelink resources 325 which are reserved for transmission/reception of S-UCI and/or S-DCI.

In some cases, the set of dedicated sidelink resources 325 may span up to the size of a subchannel 315 in the frequency domain. Moreover, the set of dedicated sidelink resources 325 may be sub-divided up in the time domain into time units 345 which include mini-slots, symbols, or both. Similarly, the set of dedicated sidelink resources 325 may be sub-divided up in the frequency domain into frequency units 330 which include resource blocks, resource elements, resource element groups, and/or control channel elements. This finer granularity within the set of dedicated sidelink resources 325 may allow for improved flexibility of sidelink signaling (e.g., control signaling) within the sidelink network. The set of dedicated sidelink resources 325 will be described in further detail with respect to FIGS. 5-7.

As noted previously herein, the resource allocation scheme 300 may support techniques for sidelink control signaling. In particular, the resource allocation scheme 300 may support techniques for scheduling of sidelink transmissions (e.g., control information) via sidelink communication links in the absence of sidelink data transmissions.

For example, as noted previously herein, control signaling (e.g., RRC signaling) from a base station 105 and/or PLC of a wireless communications system (e.g., wireless communications systems 100, 200) may be used to reserve or otherwise indicate a set of dedicated sidelink resources 325 which are dedicated for transmission of S-UCI and S-DCI.

Continuing with the same example, a first wireless device (e.g., S/A, first wireless device 205-a illustrated in FIG. 2) may receive additional SCI 335-a from a second wireless device (e.g., PLC, second wireless device 205-b). The first wireless device may receive the SCI 335-a based on monitoring the set of sidelink resources 310 within the first slot 305-a of the resource allocation scheme 300. In some aspects, the additional SCI 335-a may be received via a sidelink control channel (e.g., PSCCH) of the sidelink communication link between the first wireless device and the second wireless device. For example, as shown in FIG. 3, the additional SCI 335-a may be transmitted/received within a subchannel 315 of the first portion of sidelink resources 320 of the set of sidelink resources 310. In some aspects, the additional SCI 335-a may include SCI in a first SCI format (e.g., SCI-1). In some aspects, the additional SCI 335-a may include information which may be used by the first wireless device to receive, demodulate, and/or decode SCI 335-b (e.g., SCI-2).

Subsequently, the first wireless device (e.g., S/A) may receive SCI 335-b from the second wireless device (PLC), where the SCI 335-b schedules an uplink transmission 340 (e.g., UCI, S-UCI, uplink data transmission) from the first wireless device to the second wireless device. The SCI 335-b may be received via a sidelink shared channel (e.g., PSSCH) of the sidelink communication link between the first wireless device and the second wireless device. For instance, as shown in FIG. 3, the SCI 335-b may be received within a subchannel of the first portion of sidelink resources 320 of the set of sidelink resources 310. In particular, the SCI 335-b may be received within a same subchannel 315 as the SCI 335-a, a different subchannel 315 as the SCI 335-a, or both. Moreover, in some cases, the first wireless device may receive, demodulate, and/or decode the SCI 335-b based on information received within the SCI 335-a.

In some aspects, the SCI 235-b may include SCI in a second SCI format (e.g., SCI-2) which is different from the first SCI format (e.g., SCI-1). In some aspects, the uplink transmission 340 may be scheduled by the SCI 335-a within a portion of the set of dedicated sidelink resources 325. For example, as shown in FIG. 3, the SCI 335-a may allocate a set of resources within the set of dedicated sidelink resources 325 for transmission of the uplink transmission 340.

In this example, the first wireless device may generate the uplink transmission 340 (e.g., UCI, S-UCI, uplink data transmission) scheduled by the SCI 335-b, and may transmit the uplink transmission 340 within the set of resources allocated for the uplink transmission 340. For example, the first wireless device 340 may transmit the uplink transmission 340 within the set of dedicated sidelink resources 325, as shown in FIG. 3. Moreover, the second wireless device may receive the uplink transmission 340 based on monitoring the set of sidelink resources 310 (e.g., the set of dedicated sidelink resources 325) within the second slot 305-b of the resource allocation scheme 300.

Figure 4:
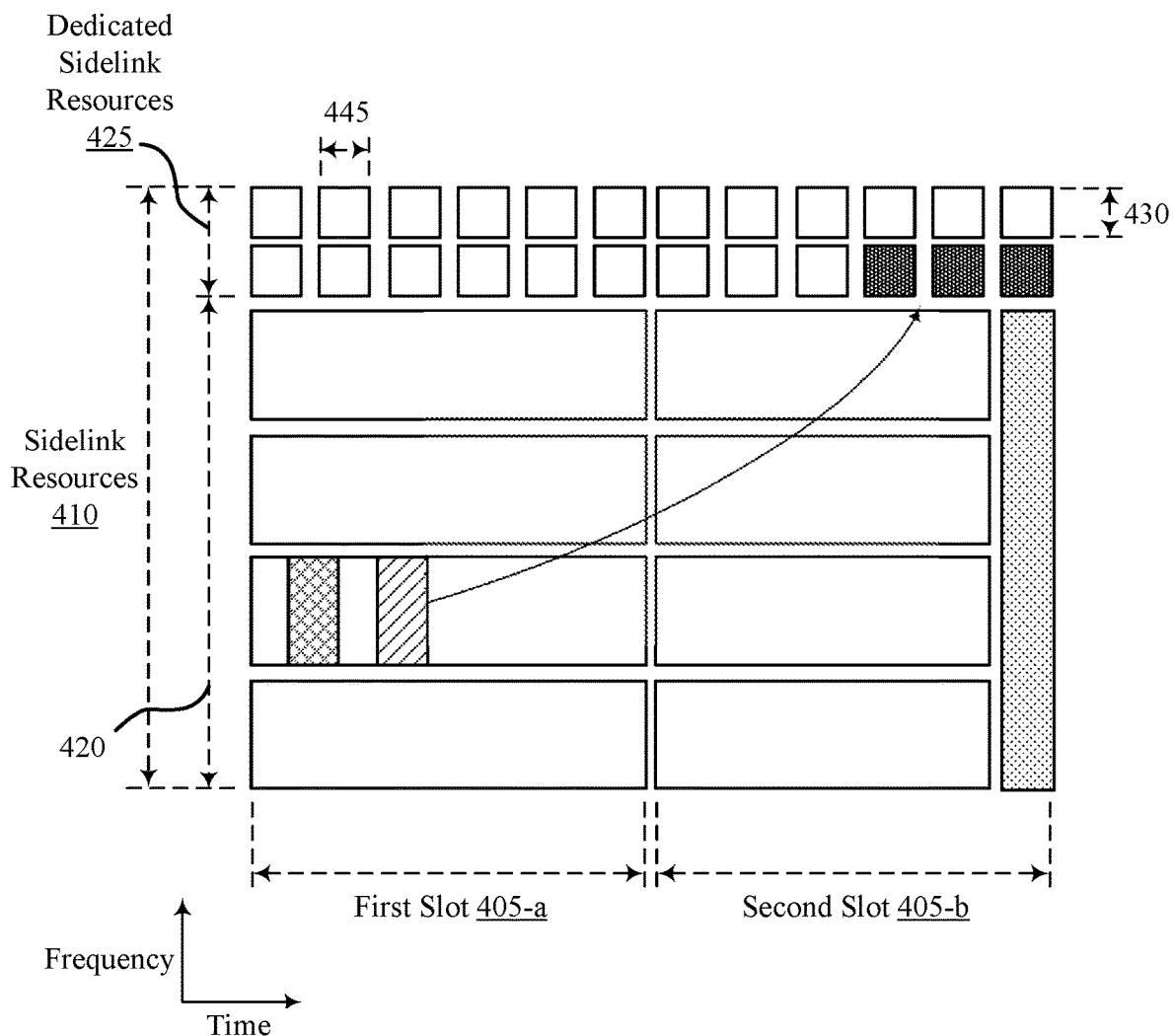
FIG. 4 illustrates an example of a resource allocation scheme that supports techniques for sidelink control signaling in accordance with aspects of the present disclosure.

FIG. 4 illustrates an example of a resource allocation scheme 400 that supports techniques for sidelink control signaling in accordance with aspects of the present disclosure. In some examples, the resource allocation scheme 400 may implement, or be implemented by, aspects of wireless communications system 100, wireless communications system 200, resource allocation scheme 300, or any combination thereof.

It is noted herein that any discussion regarding resource allocation scheme 300 illustrated in FIG. 3 may be regarded as applying to resource allocation scheme 400 illustrated in FIG. 4, to the extent applicable In this regard, the resource allocation scheme 400 illustrates a set of sidelink resources 410 which include sidelink resources in a first slot 405-a and a second slot 405-a in the time domain. The set of sidelink resources 410 may span any quantity of slots 405 or other transmission time intervals. Moreover, the set of sidelink resources 410 may span a quantity of subchannels 415 (or other group of frequency resources) in the frequency domain. The set of sidelink resources 410 may include a set of sidelink resources associated with a sidelink communication link (e.g., communication link 215-a illustrated in FIG. 2) of a sidelink network.

In some aspects, the set of sidelink resources 410 may include a first portion of sidelink resources 415 and a second portion of sidelink resources 420. In some aspects, the first portion of sidelink resources 415 may be generally referred to as "legacy" sidelink resources. In this regard, the first portion of sidelink resources 420 may include PSCCH resources, PSCCH resources, or both. Accordingly, the first portion of sidelink resources 415 may include resources of a sidelink communication link which may be used for transmission of SCI 435 (e.g., SCI-1, SCI-2).

The second portion of sidelink resources 425 may include a set of dedicated sidelink resources. For example, as noted previously herein, wireless device 405 (e.g., base station 105-a and/or second wireless device 205-b (PLC) illustrated in FIG. 2) may reserve or otherwise indicate a set of sidelink resources (e.g., second portion of sidelink resources 425) of a sidelink communication link which are dedicated for transmission of S-UCI and S-DCI (e.g., "dedicated sidelink resources 425"). In this example, the set of dedicated sidelink resources 425 may include dedicated pool of the set of sidelink resources 410 which are reserved for transmission/reception of S-UCI and/or S-DCI.

As noted previously herein, the resource allocation scheme 400 may support techniques for sidelink control signaling. In particular, the resource allocation scheme 400 may support techniques for scheduling of sidelink transmissions (e.g., control information) via sidelink communication links in the absence of sidelink data transmissions.

For example, as noted previously herein, control signaling (e.g., RRC signaling) from a base station 105 and/or PLC of a wireless communications system (e.g., wireless communications systems 100, 200) may be used to reserve or otherwise indicate a set of dedicated sidelink resources 425 which are dedicated for transmission of S-UCI and S-DCI. Continuing with the same example, a first wireless device (e.g., S/A, first wireless device 205-a illustrated in FIG. 2) may receive additional SCI 435-a from a second wireless device (e.g., PLC, second wireless device 205-b). The first wireless device may receive the SCI 435-a based on monitoring the set of sidelink resources 410 within the first slot 405-a of the resource allocation scheme 400. In some aspects, the additional SCI 435-a may be received via a sidelink control channel (e.g., PSCCH) of the sidelink communication link between the first wireless device and the second wireless device. For example, as shown in FIG. 3, the additional SCI 435-a may be transmitted/received within a subchannel 415 of the first portion of sidelink resources 420 of the set of sidelink resources 410. In some aspects, the additional SCI 435-a may include SCI in a first SCI format (e.g., SCI-1). In some aspects, the additional SCI 435-a may include information which may be used by the first wireless device to receive, demodulate, and/or decode SCI 435-b (e.g., SCI-2).

Subsequently, the first wireless device (e.g., S/A) may receive SCI 435-b from the second wireless device (PLC), where the SCI 435-b schedules an uplink transmission 440 (e.g., UCI, S-UCI, uplink data transmission) from the first wireless device to the second wireless device. The SCI 435-b may be received via a sidelink shared channel (e.g., PSSCH) of the sidelink communication link between the first wireless device and the second wireless device. For instance, as shown in FIG. 3, the SCI 435-b may be received within a subchannel of the first portion of sidelink resources 420 of the set of sidelink resources 410. In particular, the SCI 435-b may be received within a same subchannel 415 as the SCI 435-a, a different subchannel 415 as the SCI 435-a, or both. Moreover, in some cases, the first wireless device may receive, demodulate, and/or decode the SCI 435-b based on information received within the SCI 435-a.

In some aspects, the SCI 235-b may include SCI in a second SCI format (e.g., SCI-2) which is different from the first SCI format (e.g., SCI-1). In some aspects, the uplink transmission 440 may be scheduled by the SCI 435-a within a portion of the set of dedicated sidelink resources 425. For example, as shown in FIG. 3, the SCI 435-a may allocate a set of resources within the set of dedicated sidelink resources 425 for transmission of the uplink transmission 440.

In some aspects, the first wireless device may identify that the first wireless device is to transmit a HARQ message to the second wireless device via a sidelink feedback channel (e.g., PSFCH 450) of the sidelink communication link. As shown in the resource allocation scheme 400, the PSFCH 450 may coexist with the set of dedicated sidelink resources 415 within a common slot 405 (e.g., within the second slot 405-b). In particular, in some cases, the set of dedicated sidelink resources 415 may be positioned adjacent to a boundary of the PSFCH 450 in the frequency domain.

In some aspects, the first wireless device my identify the HARQ message to be transmitted at based on RRC signaling, receiving the additional SCI 435-a (e.g., SCI-1), receiving the SCI 435-b (e.g., SCI-2), or any combination thereof. Additionally or alternatively, the first wireless device my identify the HARQ message to be transmitted based on receiving another transmission (e.g., S-DCI) from the second wireless device.

In some aspects, the first wireless device may be configured to transmit the identified HARQ message according to different configurations. In particular, the first wireless device may be configured to multiplex the HARQ message within the uplink transmission 440 (and refrain from transmitting the HARQ message via the PSFCH 450), transmit both the uplink transmission 440 and a PSFCH transmission including the HARQ message, transmit portions of the HARQ message via the uplink transmission 440 and the PSFCH 450, or any combination thereof.

In some aspects, the behavior of the first wireless device with respect to the HARQ message may be based on characteristics of the HARQ message (e.g., size of the HARQ message), characteristics of the PSFCH 450, a relative arrangement of the PSFCH 450 relative to the set of dedicated sidelink resource 425, or any combination thereof.

For example, upon identifying the HARQ message to be transmitted, the first wireless device may identify a payload size of the HARQ message. In some aspects, the first wireless device may identify the payload size of the HARQ message based on a periodicity of transmissions performed via the sidelink feedback channel (e.g., periodicity of PSFCH 450 transmissions). In some aspects, the first wireless device may compare the determined payload size of the HARQ message to one or more threshold payload sizes. In this regard, the first wireless device may be configured to determine whether the payload size of the HARQ message satisfies the one or more threshold payload sizes. In some cases, the first wireless device may be configured to determine that the determined payload size associated with the HARQ message (HARQ$_{PS}$) satisfies a threshold payload size (Thresh$_{PS}$) if the determined payload size is less than or equal to the threshold payload size (e.g., threshold satisfied if HARQ$_{PS}$≤Thresh$_{PS}$).

In some cases, the first wireless device 205-a may multiplex the HARQ message 245 with the uplink transmission 440 scheduled by the SCI 435-b (e.g., SCI-2). In some aspects, the first wireless device may multiplex the HARQ message 245 with the uplink transmission 440 without transmitting the HARQ message via the sidelink feedback channel (e.g., refrain from transmitting the HARQ message via the PSFCH 450). For example, the first wireless device may multiplex the HARQ message with the uplink transmission 440 (e.g., S-UCI) based on identifying that the determined payload size of the HARQ message satisfies the threshold payload size (e.g., HARQ$_{PS}$≤Thresh$_{PS}$). In this regard, the HARQ message may be multiplexed with the uplink transmission 440 in cases where the HARQ message is sufficiently small. In this example, because the HARQ message is multiplexed with the uplink transmission 240, the first wireless device 205-a may refrain from transmitting the HARQ message on the sidelink feedback channel (e.g., PSFCH 450).

In additional or alternative cases, the first wireless device 205-a may determine that at least a portion of the HARQ message is not to be multiplexed with the uplink transmission 440 scheduled by the SCI 435-b. For example, the first wireless device may determine that at least a portion of the HARQ message is not to be multiplexed with the uplink transmission 440 based on identifying that the determined payload size of the HARQ message does not satisfy the threshold payload size (e.g., $HARQ_{PS}$>$Thresh_{PS}$). In this regard, the first wireless device may determine that the HARQ message is too large to be entirely multiplexed with the uplink message 440. In such cases, the first wireless device may be configured to transmit at least a portion of the HARQ message via the sidelink shared channel (e.g., PSFCH 450).

For example, in some cases, the first wireless device may transmit a first portion of the HARQ message via the PSFCH 450, and may transmit a second portion of the HARQ message via the HARQ message via the uplink transmission 440. In some cases, transmission of the uplink transmission 440 including the second portion of the HARQ message may at least partially overlap with the PSFCH 450 (e.g., at least partially overlap with transmission of the first portion of the HARQ message via the PSFCH 450). In this example, the first wireless device may be configured to perform simultaneous transmission of the uplink transmission 440 and a PSFCH 450 transmission.

In additional or alternative cases, the PSFCH 450 may at least partially overlap with the set of dedicated sidelink resources 425 in the time domain, in the frequency domain, or both. In this regard, the PSFCH 450 may be determined to "puncture" the uplink transmission 440, the set of resources allocated for the uplink transmission 440, or both. For example, as shown in FIG. 4, the PSFCH may puncture the uplink transmission 440 and/or the set of resources allocated for the uplink transmission 440 in the time domain.

Figure 5:
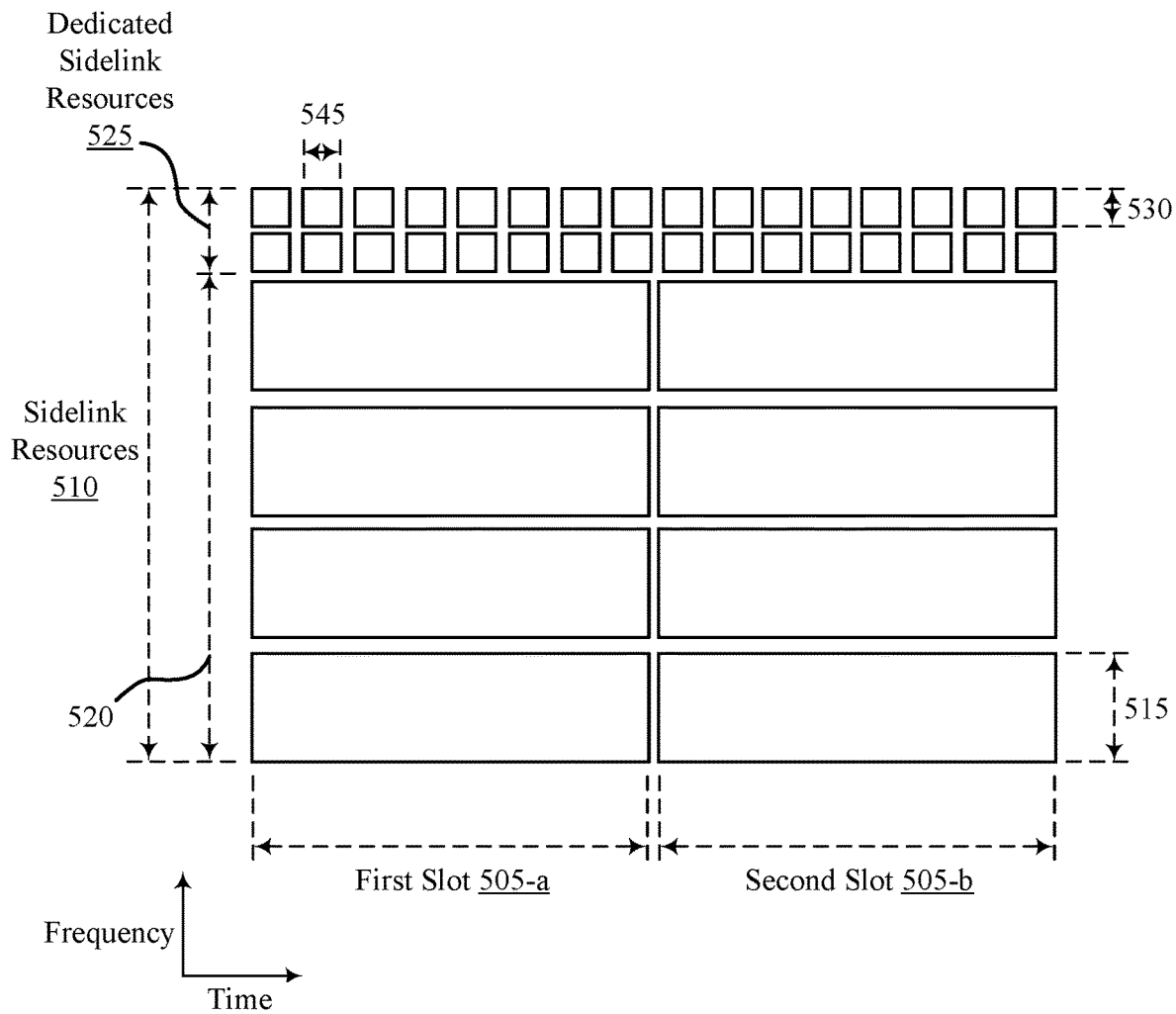
FIG. 5 illustrates an example of a resource allocation scheme that supports techniques for sidelink control signaling in accordance with aspects of the present disclosure.

FIG. 5 illustrates an example of a resource allocation scheme 500 that supports techniques for sidelink control signaling in accordance with aspects of the present disclosure. In some examples, the resource allocation scheme 500 may implement, or be implemented by, aspects of wireless communications system 100, wireless communications system 200, resource allocation scheme 300, resource allocation scheme 400, or any combination thereof.

Resource allocation scheme 500 illustrates a set of sidelink resources 510 which include sidelink resources which span one or more TTIs (e.g., first slot 505-a, second slot 505-b) in the time domain, and one or more subchannels 515 (or other group of frequency resources) in the frequency domain. The sidelink resources 510 may be an example of a sidelink resource pool, or sidelink BWP. As noted previously herein, the set of sidelink resources 510 may include a first portion of sidelink resources 520 and a second portion of sidelink resources 525. In some aspects, the first portion of sidelink resources 515 may be generally referred to as legacy sidelink resources. In this regard, the first portion of sidelink resources 520 may include PSSCH resources, PSCCH resources, or both. Accordingly, the first portion of sidelink resources 515 may include resources of a sidelink communication link which may be used for transmission of SCI (e.g., SCI-1, SCI-2), PSSCH transmissions, or both.

The second portion of sidelink resources 525 may include a set of dedicated sidelink resources 525 of a sidelink communication link which are dedicated for transmission of S-UCI and S-DCI (e.g., "dedicated sidelink resources 525"). The set of dedicated sidelink resources 525 may include a dedicated pool of the set of sidelink resources 510 which are reserved for transmission/reception of S-UCI and/or S-DCI. Thus, the set of dedicated sidelink resources 525 may be dedicated for information associated with sidelink coordination, HARQ data, CSI-reports, scheduling requests (e.g., sidelink scheduling requests), SFIs, and the like. In some cases, the set of dedicated sidelink resources 525 which are dedicated for transmission of S-UCI and S-DCI may include sidelink resources which do not include PSCCH resources, PSSCH resources, or both. Additionally or alternatively, the set of dedicated sidelink resources 525 may include PSCCH resources, PSSCH resources, or both.

The set of dedicated sidelink resources 525 may be sub-divided up in the time domain into time units 545 which include mini-slots, symbols, or both. Similarly, the set of dedicated sidelink resources 525 may be sub-divided up in the frequency domain into frequency units 530 which include resource blocks, resource elements, resource element groups, and/or control channel elements.

The set of dedicated sidelink resources 525 which are dedicated for transmission/reception of S-UCI and S-DCI may be multiplexed (e.g., FDM) with legacy sidelink resources (e.g., first portion of sidelink resources 520). For example, in some cases, wireless devices (e.g., UEs 115, S/As, PLCs) may not be configured or expected to utilize the last $N_{PRB}$ mode $n_{subCHsize}$ PRBs within the set of sidelink resources 510. In this example, the unused PRBs of the set of sidelink resources 510 may include set of dedicated sidelink resources 525 which are reserved for transmission/reception of S-UCI and/or S-DCI. For example, the dedicated set of sidelink resources 525 may span quantity of PRBs at a boundary of a sidelink resource pool (e.g., sidelink BWP, sidelink resources 510), where the quantity of PRBs is less than a full subchannel in the frequency domain. In other words, the left over, unused PRBs at a boundary of a sidelink BWP (e.g., at a boundary of the sidelink resources 510) may include the dedicated set of sidelink resources 525 which are dedicated for S-UCI and/or S-DCI.

In additional or alternative cases, the dedicated set of sidelink resources 525 may span a set of PRBs which span an integer number of subchannels 515. For example, in some cases, the dedicated set of sidelink resources 525 may span a full subchannel at a boundary of the sidelink resource pool (e.g., at a boundary of a sidelink BWP, boundary of sidelink resources 510). By way of another example, in some cases, the dedicated set of sidelink resources 525 may span a two full subchannels of the set of sidelink resources 510 in the frequency domain.

In some cases, a base station 105 and/or PLC may allocate sets of resources for sidelink communications, and may subsequently "reclaim" at least a portion of allocated resources which will be dedicated for S-UCI and/or S-DCI. For example, in some cases, a second wireless device may allocate (e.g., via RRC signaling) a sidelink resource pool and/or sidelink BWP (e.g., set of sidelink resources 510) for sidelink communications. In this example, the entirety of the set of sidelink resources 510 may be considered "legacy" sidelink resources for PSCCH and/or PSSCH transmissions. Subsequently, the second wireless device may transmit an additional RRC message which "reclaims" at least a portion of the set of sidelink resources 510 which will be dedicated for S-UCI and/or S-DCI. For instance, a subsequent RRC message may "reclaim" the dedicated set of sidelink resources 525, effectively dividing up the set of sidelink resources 510 into the first portion of sidelink resources 510 and the dedicated set of sidelink resources 525.

In some aspects, control signaling (e.g., RRC signaling) may be used to reclaim one or more subchannels 515 which will be dedicated for S-UCI and S-DCI (e.g., reclaim one or more subchannels 515 which will become the dedicated set of sidelink resources 525). Control signaling (e.g., RRC messages) may use bitmaps, indexes, or both, to indicate portions of the set of sidelink resources 510 (e.g., to indicate one or more subchannels 515) which will be reclaimed for S-UCI and S-DCI. For example, an RRC message may indicate a subchannel mask which indicates one or more subchannels 515 which will be reclaimed to become the dedicated set of sidelink resources 525 illustrated in FIG. 5. In some cases, subchannels 515 at or near the boundaries of the set of resources 510 (e.g., at or near a boundary of a sidelink BWP) may be reclaimed for S-UCI and S-DCI so that larger portions of the set of sidelink resources 510 (e.g., sidelink BWP) may remain contiguous in the frequency domain.

Figure 6:
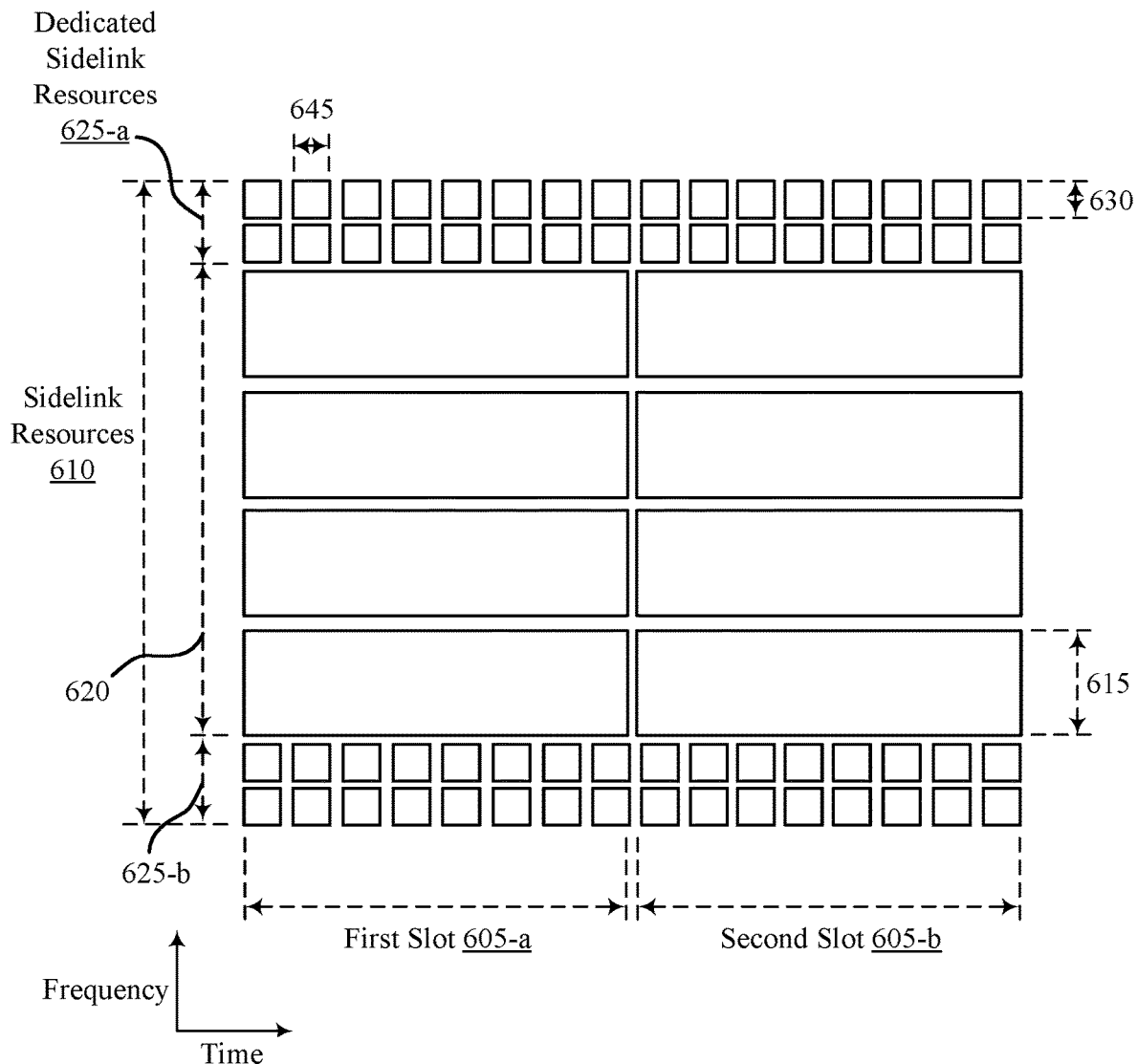
FIG. 6 illustrates an example of a resource allocation scheme that supports techniques for sidelink control signaling in accordance with aspects of the present disclosure.

FIG. 6 illustrates an example of a resource allocation scheme 600 that supports techniques for sidelink control signaling in accordance with aspects of the present disclosure. In some examples, the resource allocation scheme 600 may implement, or be implemented by, aspects of wireless communications system 100, wireless communications system 200, resource allocation scheme 300, resource allocation scheme 400, resource allocation scheme 500, or any combination thereof.

As noted previously herein with respect to resource allocation scheme 500, resource allocation scheme 600 illustrates a set of sidelink resources 610 which include sidelink resources which span one or more TTIs (e.g., first slot 605-a, second slot 605-b) in the time domain, and one or more subchannels 615 (or other group of frequency resources) in the frequency domain. The sidelink resources 510 may be an example of a sidelink resource pool, or sidelink BWP. The set of sidelink resources 610 may include a first portion of sidelink resources 620 and a second portion of sidelink resources 625 (e.g., dedicated set of sidelink resources 525), where the first portion of sidelink resources 620 may be referred to as legacy sidelink resources for PSSCH and PSCCH, and the second portion of sidelink resources 625 are reserved or dedicated for S-UCI and S-DCI. The dedicated set of sidelink resources 625 may be sub-divided up in the time domain into time units 645 which include mini-slots, symbols, or both. Similarly, the dedicated set of dedicated sidelink resources 625 may be sub-divided up in the frequency domain into frequency units 630 which include resource blocks, resource elements, resource element groups, and/or control channel elements.

In some aspects, the dedicated set of sidelink resources 625 may be made up of multiple sub-portions. For example, the dedicated set of sidelink resources 625 may include a first subset of dedicated sidelink resources 625-a and a second subset of dedicated sidelink resources 625-b. In some aspects, the subsets of dedicated sidelink resources 625-a and 625-b may be positioned at boundaries of the set of sidelink resources 610 (e.g., at boundaries of the sidelink BWP). For example, the first subset of dedicated sidelink resources 625-a may span a first set of PRBs at a first boundary of the set of sidelink resources 610 (e.g., at a first boundary of the sidelink BWP). In this example, the second subset of dedicated sidelink resources 625-b may span a second set of PRBs at a second boundary of the set of sidelink resources 610 (e.g., at a second boundary of the sidelink BWP), where the second boundary is opposite the first boundary in the frequency domain.

In cases where the subsets of dedicated sidelink resources 625-a and 625-b are positioned at opposing boundaries of the set of sidelink resources 610 in the frequency domain (e.g., opposing boundaries of a sidelink BWP), the first portion of sidelink resources 620 which are used for PSSCH and PSCCH may be contiguous in the frequency domain. Additionally, configuring the subsets of dedicated sidelink resources 625-a and 625-b at opposing boundaries of the set of sidelink resources 610 may provide diversity gain for S-UCI and S-DCI.

In some aspects, each of the subsets of dedicated sidelink resources 625-a and 625-b may span a set of PRBs which is less than a full subchannel. Additionally or alternatively, each of the subsets of dedicated sidelink resources 625-a and 625-b may span a set of PRBs which make up an integer quantity of subchannels 615 (e.g., one subchannel 615, two subchannels 615). In some cases, the subsets of dedicated sidelink resources 625-a and 625-b may be "reclaimed" from the set of sidelink resources so that they may be reserved (e.g., dedicated) for S-UCI and S-DCI.

Figure 7:
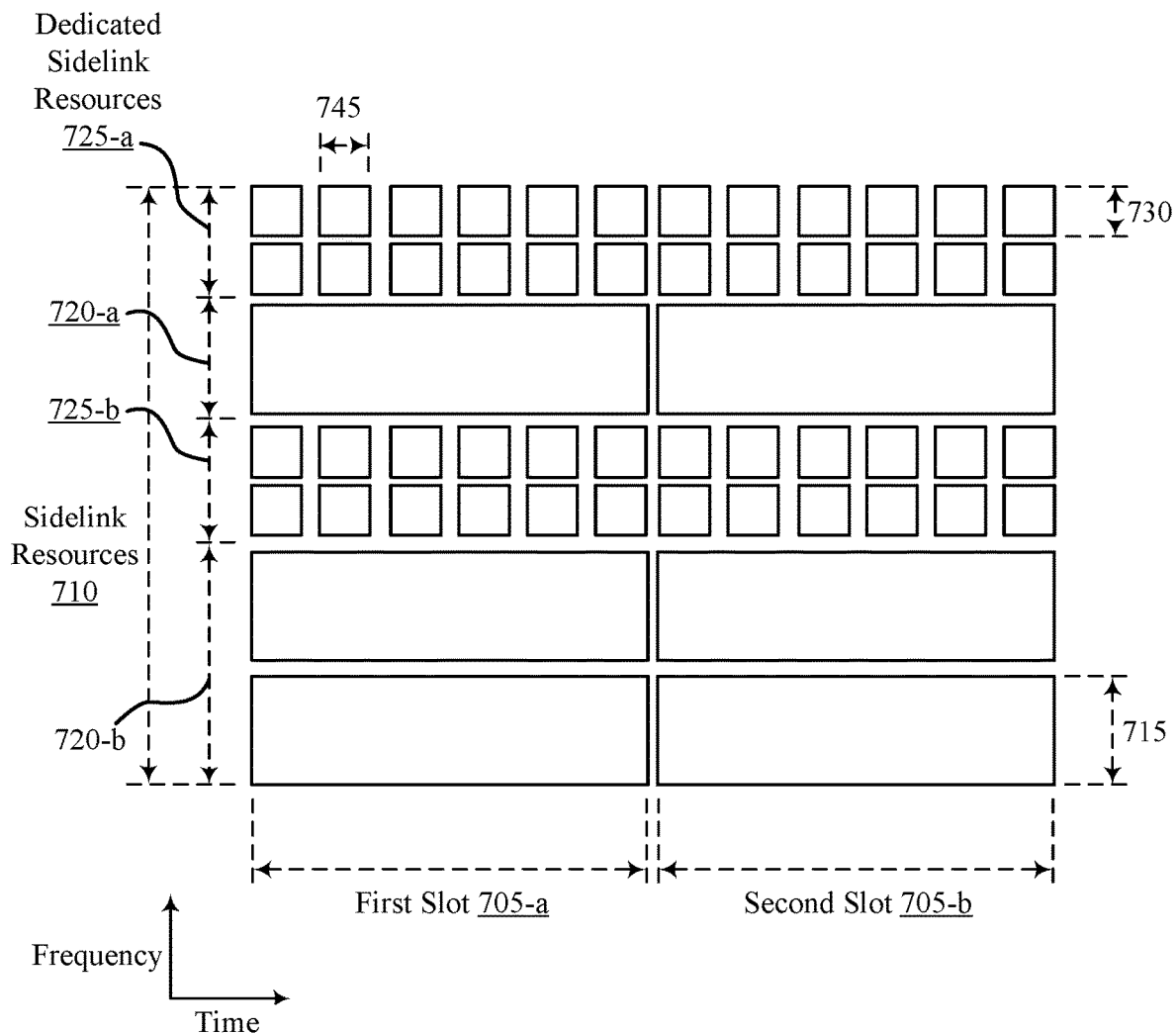
FIG. 7 illustrates an example of a resource allocation scheme that supports techniques for sidelink control signaling in accordance with aspects of the present disclosure.

FIG. 7 illustrates an example of a resource allocation scheme 700 that supports techniques for sidelink control signaling in accordance with aspects of the present disclosure. In some examples, the resource allocation scheme 700 may implement, or be implemented by, aspects of wireless communications system 100, wireless communications system 200, resource allocation scheme 300, resource allocation scheme 400, resource allocation scheme 500, resource allocation scheme 600, or any combination thereof.

As noted previously herein with respect to resource allocation schemes 500 and 600, resource allocation scheme 700 illustrates a set of sidelink resources 710 which include sidelink resources which span one or more TTIs (e.g., first slot 705-a, second slot 705-b) in the time domain, and one or more subchannels 715 (or other group of frequency resources) in the frequency domain. The sidelink resources 710 may be an example of a sidelink resource pool, or sidelink BWP. The set of sidelink resources 710 may include a first portion of sidelink resources 720 and a second portion of sidelink resources 725 (e.g., dedicated set of sidelink resources 725), where the first portion of sidelink resources 720 may be referred to as legacy sidelink resources for PSSCH and PSCCH, and the second portion of sidelink resources 725 are reserved or dedicated for S-UCI and S-DCI. The dedicated set of sidelink resources 725 may be sub-divided up in the time domain into time units 745 which include mini-slots, symbols, or both. Similarly, the dedicated set of dedicated sidelink resources 725 may be sub-divided up in the frequency domain into frequency units 730 which include resource blocks, resource elements, resource element groups, and/or control channel elements.

In some aspects, the dedicated set of sidelink resources 725 may be made up of multiple sub-portions. For example, the dedicated set of sidelink resources 725 may include a first subset of dedicated sidelink resources 725-a and a second subset of dedicated sidelink resources 725-b. In some aspects, the subsets of dedicated sidelink resources 725-a and 725-b may be separated by one or more subchannels 715 in the frequency domain. For example, the first subset of dedicated sidelink resources 725-a may span a first set of PRBs spanning a first subchannel 715 at a first boundary of the set of sidelink resources 710 (e.g., at a first boundary of the sidelink BWP). In this example, the second subset of dedicated sidelink resources 725-b may span a second set of PRBs spanning a second subchannel 715 of the set of sidelink resources 710, where the first subset of dedicated sidelink resources 725-*a* and the second subset of dedicated sidelink resources 725-*b* are separated by a single subchannel 715 in the frequency domain. In this example, separating the subsets of dedicated sidelink resources 725-*a* and 725-*b* effectively divides up the first portion of sidelink resources into a first subset of sidelink resources 720-*a* and a second subset of sidelink resources 720-*b*.

In some aspects, subsets of dedicated sidelink resources 725-*a* and 725-*b* may be separated in the frequency domain by any quantity of subchannels 715. Moreover, the dedicated set of sidelink resources 725 may be divided up into any quantity of subsets of sidelink resources 725.

In some cases, positioning at least one subset of dedicated sidelink resources (e.g., second subset of dedicated sidelink resources 725-*b*) away from a boundary of the set of sidelink resources 710 may insulate the subset of dedicated sidelink resources 725 from interference, and provide diversity in sidelink resources which may be used for S-UCI and S-DCI. For example, the first subset of dedicated sidelink resources 725-*a* positioned along a boundary of the set of sidelink resources 710 may be more susceptible to interference attributable to communications performed outside of the set of sidelink resources 710. Comparatively, because there are multiple subchannels separating the second subset of dedicated sidelink resources 725-*b* from the boundaries of the set of sidelink resources 710 in the frequency domain, the second subset of dedicated sidelink resources 725-*b* may less susceptible to interference attributable to communications performed outside of the set of sidelink resources 710 (e.g., communications outside of the sidelink BWP).

In some aspects, each of the subsets of dedicated sidelink resources 725-*a* and 725-*b* may span a set of PRBs which is less than a full subchannel. Additionally or alternatively, each of the subsets of dedicated sidelink resources 725-*a* and 725-*b* may span a set of PRBs which make up an integer quantity of subchannels 715 (e.g., one subchannel 715, two subchannels 715). In some cases, the subsets of dedicated sidelink resources 725-*a* and 725-*b* may be "reclaimed" from the set of sidelink resources 710 so that they may be reserved (e.g., dedicated) for S-UCI and S-DCI.

Figure 8:
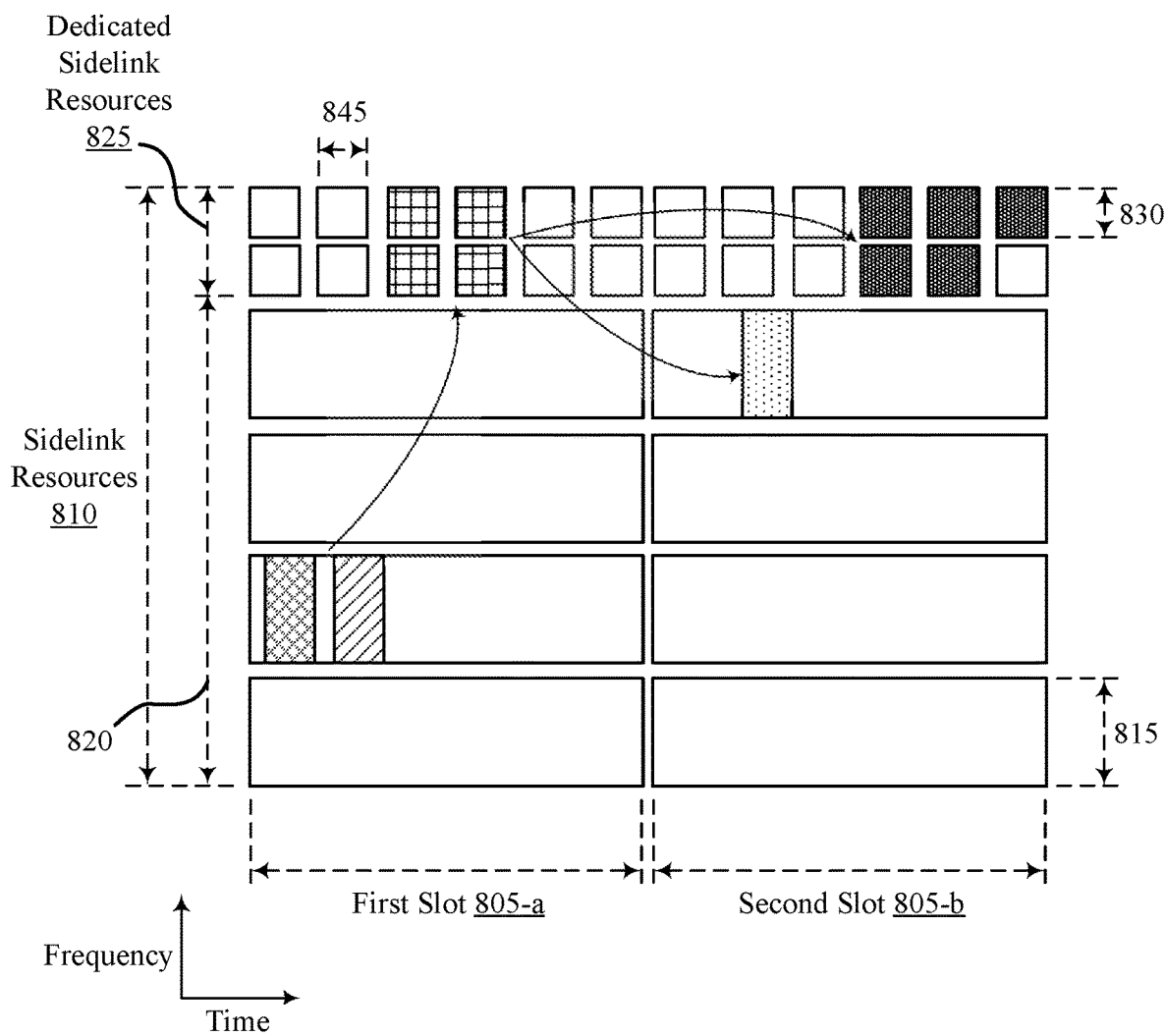
FIG. 8 illustrates an example of a resource allocation scheme that supports techniques for sidelink control signaling in accordance with aspects of the present disclosure.

FIG. 8 illustrates an example of a resource allocation scheme 800 that supports techniques for sidelink control signaling in accordance with aspects of the present disclosure. In some examples, the resource allocation scheme 3800 may implement, or be implemented by, aspects of wireless communications system 100, wireless communications system 200, resource allocation schemes 300-700, or any combination thereof.

As noted previously herein with respect to resource allocation schemes 300-700, resource allocation scheme 800 illustrates a set of sidelink resources 810 which include sidelink resources which span one or more TTIs (e.g., first slot 805-*a*, second slot 805-*b*) in the time domain, and one or more subchannels 815 (or other group of frequency resources) in the frequency domain. The sidelink resources 810 may be an example of a sidelink resource pool, or sidelink BWP. The set of sidelink resources 810 may include a first portion of sidelink resources 820 and a second portion of sidelink resources 825 (e.g., dedicated set of sidelink resources 825), where the first portion of sidelink resources 820 may be referred to as legacy sidelink resources for PSSCH and PSCCH, and the second portion of sidelink resources 825 are reserved or dedicated for S-UCI and S-DCI. The dedicated set of sidelink resources 825 may be sub-divided up in the time domain into time units 845 which include mini-slots, symbols, or both. Similarly, the dedicated set of dedicated sidelink resources 825 may be sub-divided up in the frequency domain into frequency units 830 which include resource blocks, resource elements, resource element groups, and/or control channel elements.

In some aspects, the resource allocation scheme 800 may support techniques for sidelink control signaling. In particular, the resource allocation scheme 800 may support techniques for scheduling of sidelink transmissions (e.g., control information) via sidelink communication links in the absence of sidelink data transmissions.

For example, as noted previously herein, control signaling (e.g., RRC signaling) from a base station 105 and/or PLC of a wireless communications system (e.g., wireless communications systems 100, 200) may allocate a set of sidelink resources for transmissions between wireless devices. In this regard, RRC signaling may configure the set of sidelink resources 810 (e.g., sidelink resource pool and/or one or more sidelink BWPs for sidelink communications). Additionally, RRC signaling transmitted by a second wireless device to a first wireless device may be used to reserve or otherwise indicate a set of dedicated sidelink resources 825 which are dedicated for transmission of S-UCI and S-DCI. Other data which may be indicated via RRC signaling may include, but is not limited to, relationships between sets of sidelink resources which are used to schedule transmissions between the respective devices and the sets of sidelink resources used for the scheduled transmission, parameters associated with scheduled transmissions between the respective devices, or any combination thereof.

In additional or alternative aspects, RRC signaling may indicate a relationship between sets of sidelink resources. In particular, an RRC message may indicate a relationship between a first set of sidelink resources associated with a downlink transmission 850 (e.g., S-DCI) which schedules an additional transmission (e.g., uplink transmission 840, PSSCH transmission 855) and a second set of sidelink resources which are to be used for the additional transmission (e.g., uplink transmission 840, PSSCH transmission 855).

Continuing with the same example, the first wireless device may receive a control message within the set of sidelink resources 810. The control message may include, but is not limited to, a DCI message, an SCI message (e.g., SCI 835-*a*, 835-*b*), an RRC message, a MAC-CE message, or any combination thereof. In some cases, information conveyed via the control message and the RRC message may be conveyed in a single transmission, in separate transmissions, or both.

In some aspects, the control message (e.g., SCI 835-*a*, 835-*b*) may indicate a set of resources (e.g., set of sidelink resources) usable by the first wireless device for receiving a downlink transmission 850 (e.g., S-DCI) from the second wireless device. In this regard, in some cases, SCI 835-*a* and/or SCI 835-*b* may schedule the downlink transmission 850 (e.g., S-DCI) illustrated in FIG. 8. In cases where an RRC message allocates the set of sidelink resources 810 for transmissions between the first and second wireless devices (e.g., configures a sidelink resource pool and/or one or more sidelink BWPs), the control message (e.g., SCI 835) may "reclaim" at least a portion of the set of sidelink resources 810 which will be reserved (e.g., dedicated) for transmission/reception of S-DCI and S-UCI. In this regard, the control message (e.g., SCI 835) may "reclaim" the dedicated set of sidelink resources 825 from the set of sidelink resources 810 so that the dedicated set of sidelink resources may be reserved or dedicated for S-DCI and/or S-UCI.

In some aspects, the control message (e.g., SCI 835) may allocate a set of resources for a set of transmissions between the first wireless device and the second wireless device. In this regard, the control message may serve as a configured grant (e.g., CG-2) and/or semi-persistent scheduling for transmissions between the first wireless device and the second wireless device. For example, the control message may allocate a set of resources usable by the first wireless device to transmit CSI reports, sounding reference signals, inter-UE coordination messages, PSSCH transmissions 855, S-UCI transmissions (e.g., uplink transmissions 840), or any combination thereof. Similarly, by way of another example, the control message may allocate a set of resources usable by the second wireless device to transmit PSSCH transmissions 855, S-DCI transmissions, or both.

Additionally, or alternatively, the control message (e.g., SCI 835-a or 835-b) may indicate a format (e.g., SFI) associated with one or more TTIs (e.g., slots 805) of the sidelink communication link between the first wireless device and the second wireless device. For example, the control message may indicate that the second slot 805-b is configured for uplink transmissions (e.g., uplink format) from the first wireless device to the second wireless device, a third slot 805 is configured for downlink transmissions (e.g., downlink format) from the second wireless device to the first wireless device, and a third slot 805 is configured for uplink and downlink transmissions (e.g., flexible format) between the wireless devices. By indicating a format for TTIs (e.g., slots 805) of the sidelink communication link, techniques described herein may reduce a quantity of blind decoding which is performed by the respective wireless devices.

In some aspects, the first wireless device may monitor the sidelink communication link (e.g., monitor the set of sidelink resources 810) between the first wireless device and the second wireless device. In some aspects, the first wireless device may monitor the sidelink communication link based on receiving the RRC message, receiving the control message (e.g., SCI 835), or both.

For example, in some cases, the control message (e.g., SCI 835-a or 835-b) may indicate a set of resources for receiving a downlink transmission 850 (e.g., S-DCI) from the second wireless device. In this regard, the control message may schedule a downlink transmission 850 from the second wireless device to the first wireless device. In this example, the first wireless device may monitor the set of sidelink resources 810 indicated in the control message. By way of another example, the control message (e.g., SCI 835) may indicate a format for a set of slots 805 of the sidelink communication link. For instance, the control message may indicate a set of slots 805 which are configured for downlink transmissions (e.g., downlink format). In this example, the first wireless device may monitor the sidelink communication link based on (e.g., in accordance with) the indicated formats. In particular, the first wireless device may monitor TTIs which are associated with a downlink format.

The first wireless device may receive a downlink transmission 850 from the second wireless device. In some aspects, the downlink transmission 850 may include a downlink control information message (e.g., S-DCI). In some aspects, the downlink transmission 850 may schedule an additional transmission (e.g., uplink transmission 840, PSSCH transmission 855) between the first wireless device and the second wireless device. For example, the downlink transmission 850 may be received in the first slot 805-a, and may schedule an uplink transmission 840 in the second slot 805-b which is subsequent to the first slot 805-a. Moreover, in some cases, the downlink transmission 850 may be received within the dedicated set of sidelink resources 825 of the set of sidelink resources 810 associated with the sidelink communication link which are dedicated for transmission/reception of S-DCI and S-UCI.

In this regard, the first wireless device may receive the downlink transmission 850 based on receiving an RRC message, receiving the control message (e.g., SCI 835-a or 835-b), monitoring the sidelink communication link (e.g., monitoring the set of sidelink resources 810), or any combination thereof. For example, the RRC message and/or the control message may indicate a format for a set of slots 805 of the sidelink communication link. In this example, the first wireless device may monitor the sidelink communication link based on the indicated formats (e.g., monitor downlink and flexible slots), and may receive the downlink transmission 850 within a slot 805 (e.g., first slot 805-a) which is configured for downlink and/or flexible communications. Comparatively, in cases where the first wireless device does not know a format for the respective slots 805 or TTIs of the sidelink communication link, the first wireless device may be configured to receive the downlink transmission 850 based on blind decoding.

The additional transmission scheduled by the downlink transmission 850 may include an uplink transmission 840 (e.g., uplink control information message (e.g., S-UCI), an uplink data message (e.g., uplink PSSCH transmission 855)), a downlink data message (e.g., downlink PSSCH transmission 855), or any combination thereof. Accordingly, the downlink transmission 850 may schedule forward and/or reverse sidelink traffic with or without S-UCI indicators in cases where the additional transmission scheduled by the downlink transmission 850 includes S-UCI. In some cases, the additional transmission may include a PSSCH transmission 855, in which case the PSSCH transmission 855 may be scheduled via one or more indicators within the downlink transmission 850 (e.g., indicators similar to UL-SCH indicator in DCI 0_1).

The downlink transmission 850 (e.g., S-DCI) may include various formats and fields (e.g., PDCCH-like formats and fields). In particular, the downlink transmission 850 may include one or more formats which are associated with DCI messages. For example, the downlink transmission 850 may include a first format (e.g., DCI 0_0, DCI 0_1, DCI 0_2) for scheduling uplink transmissions, a second format (e.g., DCI 1_0, DCI 1_1, DCI 1_2) for scheduling downlink transmissions, a third format (e.g., DCI 2_0, DCI 2_1, DCI 2_2, DCI 2_3, DCI 2_4, DCI 2_5, DCI 2_6) for SFI commands, transmit power control (TPC) commands, and/or pre-emption commands.

The downlink transmission 850 may exhibit varying sizes within the dedicated set of sidelink resources 825 which are dedicated for S-DCI and S-UCI, depending on the payload size of the downlink transmission 850. Moreover, the size of the downlink transmission 850 in the time and frequency domain may be based on a coverage requirement and/or aggregation level for the downlink transmission 850. For example, in some cases, the downlink transmission 850 may span a set of symbols of the set of dedicated sidelink resources 825 in the time domain, and a set of PRBs of the set of dedicated sidelink resources 825 in the frequency domain. In cases where the downlink transmission 850 spans relatively few symbols in the time domain, the set of dedicated sidelink resources 825 may include multiple opportunities for downlink transmissions 850 (e.g., multiple S-DCI transmission opportunities) per slot 805, which may allow for fast and efficient scheduling. By way of another example, in other cases, the downlink transmission 850 may span a slot 805 of the set of dedicated sidelink resources 825 in the time domain, and a set of PRBs of the set of dedicated sidelink resources 825 in the frequency domain. Such cases may be beneficial for AGC.

In some cases, the downlink transmission 850 (e.g., S-DCI) may be transmitted and/or addressed to multiple wireless devices. For example, the downlink transmission 850 may include a common downlink transmission 850 (e.g., GC-PSCCH) which is transmitted by the second wireless device to a set of wireless devices including the first wireless device. For instance, the second wireless device may transmit a common downlink transmission 850 (e.g., common S-DCI) to a group of wireless devices to indicate SFIs for the respective wireless devices. In some cases, the downlink transmission 850 (e.g., S-DCI) may be addressed to different wireless devices and transmitted (e.g., multiplexed) using multiple OCCs. For example, in some cases, the downlink transmission 850 may be associated with a set of OCCs, where at least one OCC of the set of OCCs is associated with the first wireless device.

In some implementations, the downlink transmission 850 may be multiplexed (e.g., TDM) with a sidelink shared channel transmission (e.g., PSSCH transmission 855). In some aspects, a PSSCH transmission 855 multiplexed with the downlink transmission 850 may be multiplexed using a subset of the set of dedicated sidelink resources 825 dedicated for S-DCI and S-UCI, using a portion of legacy sidelink resources (e.g., first portion of sidelink resources 820, PSSCH data channel), or both. In such cases, the downlink transmission 850 may indicate that it is multiplexed with the sidelink shared channel transmission. In particular, the downlink transmission 850 may indicate whether resources of a PSSCH data channel is multiplexed with the downlink transmission 850 in the slot 805 (e.g., first slot 805-a) in which the downlink transmission 850 is received.

In some cases, the downlink transmission 850 (e.g., S-DCI) may activate transmissions and/or sets of resources which were allocated or scheduled via an RRC message and/or control message (e.g., SCI 835). In this regard, the downlink transmission 850 may activate transmissions which were previously scheduled/allocated via semi-persistent scheduling, configured grants, or both. For example, the SCI 835-a may allocate a set of resources for a set of transmissions (e.g., set of CSI reports) from the first wireless device to the second wireless device. In this example, the downlink transmission 850 may include an indication for the first wireless device to perform at least a subset of the set of transmissions. In other words, the downlink transmission 850 may activate the CSI reporting which was scheduled/allocated via the SCI 835-a.

The downlink transmission 850 may additionally or alternatively indicate formats (e.g., uplink format, downlink format, flexible format) for subsequent slots 805. For example, the downlink transmission 805 may be received in the first slot 805-a, and may indicate a format associated with one or more slots 805 which are subsequent to the first slot 805-a (e.g., second slot 805-b). In this regard, the downlink transmission 850 may indicate an SFI for slots 805 of the sidelink communication link.

Upon receiving the downlink transmission 850, the first wireless device may generate the additional transmission scheduled by the downlink transmission 850. In this regard, the first wireless device may generate the additional transmission (e.g., uplink transmission 840, PSSCH transmission 855) based on receiving the downlink transmission 850.

Additionally or alternatively, the first wireless device may generate the additional transmission scheduled by the downlink transmission 850 based on receiving the RRC message, receiving the control message (e.g., SCI 835), monitoring the sidelink communication link, or any combination thereof.

As noted previously herein, the additional transmission scheduled by the downlink transmission 850 may include an uplink control information message (e.g., S-UCI), an uplink data message (e.g., uplink PSSCH transmission 855), a downlink data message (e.g., downlink PSSCH transmission 855), or any combination thereof.

In some aspects, the first wireless device may communicate with the second wireless device via the additional transmission on the sidelink communication link between the respective wireless devices. The first wireless device and the second wireless device may communicate via the additional transmission based on transmitting/receiving the RRC message, transmitting/receiving the control message (e.g., SCI 835), generating the additional transmission, or any combination thereof. For example, in cases where the additional transmission includes an uplink transmission 840 (e.g., S-UCI), the first wireless device may transmit the S-UCI to the second wireless device. By way of another example, in cases where the additional transmission includes a downlink data message (e.g., downlink PSSCH transmission 855), the second wireless device may transmit the downlink data message to the first wireless device.

Techniques described herein may enable sidelink-related transmissions (e.g., S-UCI, PSSCH transmissions) to be scheduled even in the absence of sidelink data. In particular, techniques described herein may enable transmissions over a sidelink communication link to be scheduled via downlink transmissions (e.g., S-DCI), thereby enabling the respective transmissions to be scheduled via PSCCH resources, PSSCH resources, or both.

Figure 9:
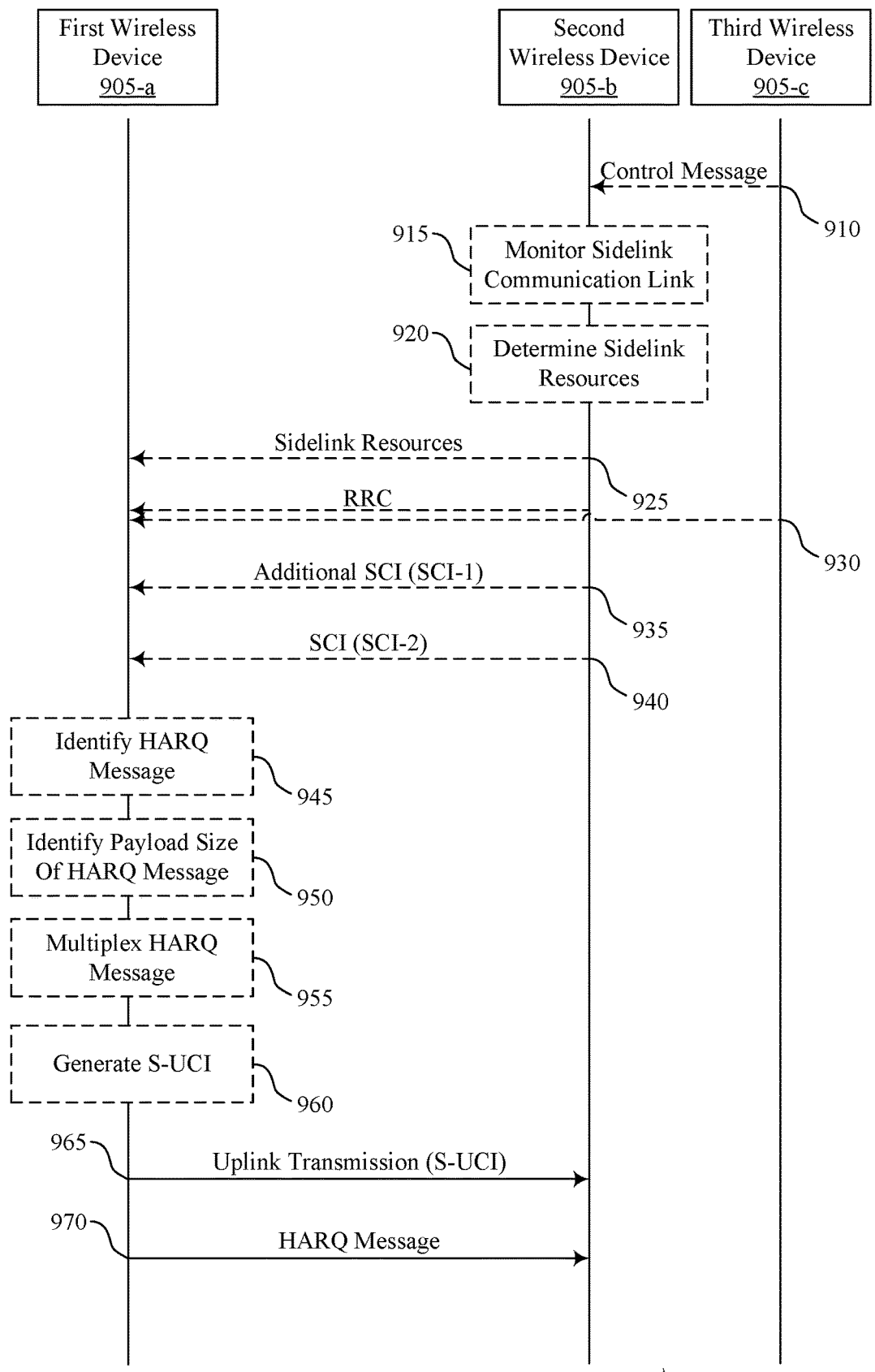
FIG. 9 illustrates an example of a process flow that supports techniques for sidelink control signaling in accordance with aspects of the present disclosure.

FIG. 9 illustrates an example of a process flow 900 that supports techniques for sidelink control signaling in accordance with aspects of the present disclosure. In some examples, process flow 900 may implement, or be implemented by, aspects of wireless communications systems 100, wireless communications systems 200, resource allocation schemes 300-800, or any combination thereof. For example, the process flow 900 may illustrate a first wireless device 905-a receiving SCI-2, generating an S-UCI, and transmitting the S-UCI, as described with reference to FIGS. 1-8.

In some cases, process flow 900 may include a first wireless device 905-a, a second wireless device 905-b, and a third wireless device 905-c, which may be examples of corresponding devices as described herein. In particular, the wireless devices 905 illustrated in FIG. 9 may include UEs 115, base stations 105, PLCs, and/or S/As. For example, in some cases, the first wireless device 905-a may include a S/A, such as the first wireless device 205-a illustrated in FIG. 2. Moreover, the second wireless device 1005-b may include a PLC and the third wireless device 905-c may include a base station 105, such as the second wireless device 205-b and the base station 105-a illustrated in FIG. 2.

In some examples, the operations illustrated in process flow 900 may be performed by hardware (e.g., including circuitry, processing blocks, logic components, and other components), code (e.g., software or firmware) executed by a processor, or any combination thereof. Alternative examples of the following may be implemented, where some steps are performed in a different order than described or are not performed at all. In some cases, steps may include additional features not mentioned below, or further steps may be added.

At 910, the third wireless device 905-*c* (e.g., base station 105) may transmit a control message indicating a set of resources to be used for a sidelink communication link. In some aspects, the third wireless device 905-*c* may transmit the control message to the first wireless device 905-*a*, the second wireless device 905-*b*, or both. The control message may include an allocation of resources (e.g., time resources, frequency resources, spatial resources) associated with a sidelink communication link which may be used by the first wireless device 905-*a*, the second wireless device 905-*b*, or both. The control message may include an RRC message, a DCI message, an SSB message, or any combination thereof. In some aspects, the third wireless device 905-*c* may transmit the control message indicating the sidelink resources through a Mode 1 operation of a sidelink network.

At 915, the second wireless device 905-*b* (e.g., PLC) may monitor a sidelink communication link. In some aspects, the second wireless device 905-*b* may monitor the sidelink communication link through a Mode 2 operation of the sidelink network in order to identify resources of the sidelink network which may be used by the second wireless device 905-*b*, the first wireless device 905-*a*, or both. In this regard, the second wireless device 905-*b* may monitor the sidelink communication link by performing blind decoding of the PDCCHs of the sidelink communication link.

At 920, the second wireless device 905-*b* may determine a set of sidelink resources of the sidelink communication link which may be used by the first wireless device 905-*a*, the second wireless device 905-*b*, or both. The second wireless device 905-*b* may determine the set of resources of the sidelink communication link based on monitoring the sidelink communication link at 915. In this regard, the second wireless device 905-*b* may determine the set of resources as part of the Mode 2 operation of the sidelink communication link. When determining sets of sidelink resources in Mode 2 operation, the second wireless device may be said to "reserve" the set of sidelink resources of the sidelink communication link. Therefore, it is noted herein that the second wireless device 905-*b* may be configured to determine a set of sidelink resources of the sidelink communication link which may be used via the control message received at 910 (Mode 1 operation), by monitoring and determining the set of sidelink resources at 915-920 (Mode 2 operation), or both.

At 925, the second wireless device 905-*b* may transmit an indication of a set of sidelink resources to the first wireless device 905-*a*. In some aspects, the set of sidelink resources may be usable by the first wireless device 905-*a* to transmit an uplink transmission (e.g., S-UCI) to the second wireless device 905-*b*. The indication of the set of sidelink resources may be indicated via a sidelink communication link between the first wireless device 905-*a* and the second wireless device 905-*b*. Additionally, the indication of the set of sidelink resources may be indicated via control signaling (e.g., RRC signaling, DCI signaling, SCI signaling). The second wireless device 905-*b* may transmit the indication of the set of sidelink resources based on receiving the control message at 910, monitoring the sidelink communication link at 915, determining a set of sidelink resources at 920, or any combination thereof.

For example, in cases where the second wireless device 905-*b* receives the control message indicating a set of sidelink resources (Mode 1 operation), the second wireless device 905-*b* may transmit an indication of at least a subset of the set of resources received at 910 to the first wireless device 905-*a* at 925. By way of another example, in cases where the second wireless device 905-*b* monitors the sidelink communication link and determines the set of sidelink resources at 915-920 (Mode 2 operation), the second wireless device 905-*b* may transmit an indication of at least a subset of the set of resources determined at 920 to the first wireless device 905-*a* at 925. From the perspective of the first wireless device 905-*a*, the first wireless device 905-*a* may also determine a set of sidelink resources of the sidelink communication link which may be used via Mode 1 operation (e.g., via control message received at 910), via Mode 2 operation (e.g., via the indication of the sidelink resources received via the second wireless device 905-*b* at 925), or both.

At 930, the first wireless device 905-*a* may receive an RRC message from the second wireless device 905-*b*, the third wireless device 905-*c* (e.g., base station 105), or both. In some aspects, the first wireless device 905-*a* may receive the RRC message at 930 based on receiving a control message at 910, receiving an indication of a set of sidelink resources at 925, or both. In some aspects, the RRC message may include information for configuring communications between the first wireless device 905-*a* and the second wireless device 905-*b* via the sidelink communication link between the respective devices. Data which may be indicated via the RRC message may include, but is not limited to, sets of sidelink resources for transmissions between the first and second wireless devices 905-*a*, 905-*b*, relationships between sets of sidelink resources which are used to schedule transmissions between the respective devices and the sets of sidelink resources used for the scheduled transmission, parameters associated with scheduled transmissions between the respective devices, or any combination thereof.

In some cases, the RRC message may indicate a set of sidelink resources of the sidelink communication link which are dedicated for transmission of S-UCI and S-DCI. In this example, the RRC message may indicate a dedicated pool of sidelink resources for transmission/reception of S-UCI and/or S-DCI. Thus, the set of sidelink resources indicated via the RRC message may be dedicated for information associated with sidelink coordination, HARQ data, CSI-reports, scheduling requests (e.g., sidelink scheduling requests), SFIs, and the like. The set of sidelink resources which are dedicated for transmission of S-UCI and S-DCI may include sidelink resources which do not include PSCCH resources, PSSCH resources, or both.

In additional or alternative cases, the RRC message may indicate one or more parameters associated with transmissions (e.g., S-UCI, S-DCI) that are transmitted via the sidelink communication link. For example, in cases where the second wireless device 905-*b* is to schedule an S-UCI from the first wireless device 905-*a* to the second wireless device 905-*b*, the RRC message may indicate a set of parameters for the scheduled S-UCI. Parameters associated with the scheduled transmissions performed via the sidelink communication link (e.g., S-UCI) may include, but are not limited to, a bundling size of the scheduled transmission, an interleaving configuration, a frequency hopping configuration, a periodicity, or any combination thereof.

In additional or alternative aspects, the RRC message may indicate a relationship between sets of sidelink resources. In particular, the RRC message may indicate a relationship between a first set of sidelink resources associated with a first transmission which schedules second transmission and a second set of sidelink resources which are to be used for the second transmission. For example, in cases where the second wireless device 905-*b* is to transmit SCI (e.g., SCI-2) which schedules an S-UCI from the first wireless device 905-*a* to the second wireless device 905-*b*, the RRC message may indicate a relationship between a first set of sidelink resources used to transmit the SCI, and a second set of sidelink resources for the S-UCI. The relationship may include a relationship between sets of frequency resources, between sets of time resources, or both.

At 935, the first wireless device 905-*a* may receive additional SCI from the second wireless device 905-*b*. The additional SCI may be received via a sidelink control channel (e.g., PSCCH) of the sidelink communication link between the first wireless device 905-*a* and the second wireless device 905-*b*. In some aspects, the additional SCI received at 935 may include SCI in a first SCI format (e.g., SCI-1). The first wireless device 905-*a* may receive the additional SCI (e.g., SCI-1) at 935 based on receiving the control message at 910, receiving the set of sidelink resources for an uplink transmission (e.g., S-UCI) at 925, receiving the RRC message at 930, or any combination thereof. In some aspects, the additional SCI may include information which may be used by the first wireless device 905-*b* to receive, demodulate, and/or decode other SCI (e.g., SCI-2).

At 940, the first wireless device 905-*a* may receive SCI from the second wireless device 905-*b*, where the SCI schedules an uplink transmission from the first wireless device 905-*a* to the second wireless device 905-*b*. The SCI may be received via a sidelink shared channel (e.g., PSSCH) of the sidelink communication link between the first wireless device 905-*a* and the second wireless device 905-*b*. In some aspects, the SCI received at 940 may include SCI in a second SCI format (e.g., SCI-2) which is different from the first SCI format. In some aspects, the uplink transmission from the first wireless device 905-*a* to the second 905-*b* which is scheduled by the SCI may include UCI, an uplink data message, or both. For example, in some cases, the uplink transmission scheduled by the SCI may include S-UCI.

The first wireless device 905-*a* may receive the SCI (e.g., SCI-2) at 940 based on receiving the control message at 910, receiving the set of sidelink resources for an uplink transmission (e.g., S-UCI) at 925, receiving the RRC message at 930, receiving the additional SCI (e.g., SCI-1) at 935, or any combination thereof.

In some aspects, the SCI (e.g., SCI-2) received at 940 may include information associated with the uplink transmission (e.g., S-UCI) scheduled by the SCI including, but not limited to, sidelink resources for performing the uplink transmission, CSI reporting information, a configuration for transmitting the uplink transmission (e.g., periodically, aperiodically, semi-persistently), a time interval for transmitting the uplink transmission, a format for the uplink transmission, or any combination thereof.

For example, the SCI (e.g., SCI-2) received at 940 may include an indication of a set of sidelink resources which is to be used to transmit the uplink transmission. In some aspects, the indication of the set of sidelink resources may be included within the SCI within one or more bit fields associated with an allocation of time resources (e.g., TDRA bit fields), within one or more bit fields associated with an allocation of frequency resources (e.g., FDRA fields), or both. For instance, in some cases, the first wireless device 905-*a* may receive a set of sidelink resources of the sidelink communication link which may be used by the first wireless device 905-*a*. In this example, the SCI may include TDRA fields and/or FDRA fields which indicate at least a subset of the set of sidelink resources which are to be used to transmit the uplink transmission.

By way of another example, as noted previously herein, the RRC message received at 930 may indicate a set of sidelink resources which are dedicated for transmission of S-UCI and/or reception of S-DCI (e.g., set of dedicated sidelink resources). In this example, the SCI (e.g., SCI-2) received at 940 may include an indication of a subset of the set of sidelink resources (e.g., subset of the set of dedicated sidelink resources) which is to be used for transmitting the uplink transmission.

In some aspects, the SCI received at 940 may include information associated with CSI reporting. The SCI may include fields for enabling or disabling CSI reporting by the first wireless device 905-*a*. For example, in some cases, the SCI received at 940 may include one or more bit field values associated with enabling or disabling CSI reporting. In additional or alternative aspects, the SCI received at 940 may indicate whether the first wireless device 905-*a* is to transmit the uplink transmission (e.g., S-UCI) periodically, aperiodically, semi-persistently (e.g., responsive to MAC-CE messages and/or DCI messages received from the second wireless device 905-*b*), or any combination thereof.

In some aspects, the SCI received at 940 may indicate HARQ information associated with the SCI, the uplink transmission scheduled by the SCI, or both. For example, the SCI may indicate whether the first wireless device 905-*a* is to transmit HARQ information acknowledging receipt of the SCI. In this example, the first wireless device 905-*a* may transmit a feedback message (e.g., ACK, NACK) to the second wireless device 905-*b* based on receiving (or failing to receive/demodulate) the SCI at 940.

In some aspects, the SCI received at 940 may include an indication of a format associated with the uplink transmission scheduled by the SCI. In this regard, the SCI may indicate a format which the first wireless device 905-*a* is to use to generate and transmit the uplink transmission. The format indicated by the SCI may include one or more fields for indicating a frequency hopping configuration, a repetition configuration, an OCC, or any combination thereof. Additionally or alternatively, the SCI received at 940 may include an indication of a time interval (e.g., quantity of slots) between reception of the SCI and transmission of the uplink transmission scheduled by the SCI. For example, the SCI may indicate that the first wireless device 905-*a* is to transmit the uplink transmission two slots after receiving the SCI. In this regard, the SCI may indicate a relationship between a first set of sidelink resources used for reception of the SCI, and a second set of sidelink resources used for transmission of the uplink transmission. In some aspects, the time interval may be based on a processing capability of the first wireless device 905-*a*, which may be indicated from the first wireless device 905-*a* to the second wireless device 905-*b* via capability signaling (e.g., capability report).

At 945, the first wireless device 905-*a* may identify that the first wireless device 905-*a* is to transmit a HARQ message to the second wireless device 905-*b* via a sidelink feedback channel (e.g., PSFCH) of the sidelink communication link. In some aspects, the first wireless device 905-*a* my identify the HARQ message to be transmitted at 945 based on receiving the control message at 910, receiving the indication of the sidelink resources at 925, receiving the RRC message at 930, receiving the additional SCI (e.g., SCI-1) at 935, receiving the SCI (e.g., SCI-2) at 940, or any combination thereof. Additionally or alternatively, the first wireless device 905-*a* my identify the HARQ message to be transmitted at 945 based on receiving another transmission (e.g., S-DCI) from the second wireless device 905-*b*.

At 950, the first wireless device 905-*a* may identify a payload size of the HARQ message identified at 945. The payload size of the HARQ message may include any metric indicative of a size of data (e.g., bits, bytes). In some aspects, the first wireless device 905-*a* may identify the payload size of the HARQ message based on a periodicity of transmissions performed via the sidelink feedback channel (e.g., periodicity of PSFCH transmissions). In some aspects, the first wireless device 905-*a* may compare the determined payload size of the HARQ message to one or more threshold payload sizes. In this regard, the first wireless device 905-*a* may be configured to determine whether the payload size of the HARQ message satisfies the one or more threshold payload sizes. In some cases, the first wireless device 905-*a* may be configured to determine that the determined payload size associated with the HARQ message (HARQ$_{PS}$) satisfies a threshold payload size (Thresh$_{PS}$) if the determined payload size is less than or equal to the threshold payload size (e.g., threshold satisfied if HARQ$_{PS}$≤Thresh$_{PS}$).

At 955, the first wireless device 905-*a* may multiplex the HARQ message with the uplink transmission (e.g., S-UCI) scheduled by the SCI (e.g., SCI-2) received at 940. In some aspects, the first wireless device 905-*a* may multiplex the HARQ message with the uplink transmission without transmitting the HARQ message via the sidelink feedback channel (e.g., refrain from transmitting the HARQ message via the PSFCH). For example, the first wireless device 905-*a* may multiplex the HARQ message with the uplink transmission (e.g., S-UCI) based on identifying that the determined payload size of the HARQ message satisfies the threshold payload size (e.g., HARQ$_{PS}$≤Thresh$_{PS}$). In this regard, the HARQ message may be multiplexed with the uplink transmission in cases where the HARQ message is sufficiently small. In this example, because the HARQ message is multiplexed with the uplink transmission, the first wireless device 905-*a* may refrain from transmitting the HARQ message on the sidelink feedback channel (e.g., PSFCH).

In additional or alternative cases, the first wireless device 905-*a* may determine that at least a portion of the HARQ message is not to be multiplexed with the uplink transmission scheduled by the SCI. For example, the first wireless device 905-*a* may determine that at least a portion of the HARQ message is not to be multiplexed with the uplink transmission based on identifying that the determined payload size of the HARQ message does not satisfy the threshold payload size (e.g., HARQ$_{PS}$>Thresh$_{PS}$). In this regard, the first wireless device 905-*a* may determine that the HARQ message is too large to be entirely multiplexed with the uplink message. In such cases, as will be described in further detail herein, the first wireless device 905-*a* may be configured to transmit at least portions of the HARQ message via the sidelink shared channel (e.g., PSFCH), via the uplink transmission, or both.

At 960, the first wireless device 905-*a* may generate the uplink transmission (e.g., UCI, S-UCI, uplink data message) scheduled by the SCI. In this regard, the first wireless device 905-*a* may generate the uplink transmission based on receiving the SCI at 940. Additionally or alternatively, the first wireless device 905-*a* may generate the uplink transmission at 965 based on receiving the control message at 910, receiving the sidelink resources at 925, receiving the RRC message at 930, receiving the additional SCI (e.g., SCI-1) at 935, identifying the HARQ message at 945, determining the payload size of the HARQ message at 950, multiplexing the HARQ message with the uplink transmission at 955, or any combination thereof. For example, in cases where the SCI received at 940 indicates a format for the uplink transmission, the first wireless device 905-*a* may generate the uplink transmission at 960 based on (e.g., in accordance with) the format.

At 965, the first wireless device 905-*a* may transmit, to the second wireless device 905-*b*, the uplink transmission scheduled by the SCI received at 940. In this regard, the first wireless device 905-*a* may transmit the uplink transmission at 965 based on (e.g., in accordance with) the SCI received at 940. Additionally or alternatively, the first wireless device 905-*a* may transmit the uplink transmission at 965 based on receiving the control message at 910, receiving the sidelink resources at 925, receiving the RRC message at 930, receiving the additional SCI (e.g., SCI-1) at 935, identifying the HARQ message at 945, determining the payload size of the HARQ message at 950, multiplexing the HARQ message with the uplink transmission at 955, generating the uplink transmission at 960, or any combination thereof.

For example, in cases where the RRC message received at 930 indicates a set of resources of the sidelink communication link which are dedicated for transmission/reception of S-UCI and/or S-DCI (e.g., set of dedicated sidelink resources), the first wireless device 905-*a* may transmit the uplink transmission at 965 via at least a portion (e.g., at least a subset) of the set of resources (e.g., via at least a subset of the set of dedicated sidelink resources). For instance, in some cases, the RRC message received at 930 may indicate a set of dedicated sidelink resources, and the SCI-2 received at 940 may indicate a subset of the set of dedicated sidelink resources. In this example, the first wireless device 905-*a* may transmit the uplink transmission at 965 within the subset of the set of dedicated sidelink resources indicated via the SCI-2. By way of another example, in cases where the RRC message received at 930 indicates a relationship between a first set of sidelink resources for receiving the SCI at 940 and a second set of sidelink resources for transmitting the uplink transmission, the first wireless device 905-*a* may transmit the uplink transmission based on (e.g., in accordance with) the relationship.

The uplink transmission may be transmitted at 965 based on additional or alternative parameters or characteristics indicated via the RRC message received at 930, the additional SCI received at 935, the SCI received at 940, or any combination thereof. For example, in cases where the RRC message received at 930 indicates one or more parameters associated with transmission of the uplink transmission (e.g., bundling size, interleaving configuration, frequency hopping configuration, periodicity), the first wireless device 905-*a* may transmit the uplink transmission at 965 based on (e.g., in accordance with) the one or more parameters. By way of another example, in cases where the SCI received at 940 indicates a time interval between reception of the SCI and transmission of the uplink transmission, the first wireless device 905-*a* may transmit the uplink transmission at 965 based on (e.g., in accordance with) the time interval. By way of another example, in cases where the SCI received at 940 includes an indication to transmit the uplink transmission periodically, aperiodically, and/or semi-persistently, the first wireless device 905-*a* may transmit the uplink transmission at 965 based on (e.g., in accordance with) based on the indication. In this regard, the first wireless device 905-*a* may transmit the uplink transmission periodically, aperiodically, and/or semi-persistently (e.g., responsive to MAC-CE messages, DCI (S-DCI) messages, and/or RRC messages received from the second wireless device 905-*b*).

In some aspects, the uplink transmission may include CSI, inter-wireless device coordination information, or both. For example, in some cases, the SCI received at 940 may include one or more bit fields associated with enabling or disabling CSI reporting. In this example, the uplink transmission may include a CSI report associated with the sidelink communication link between the first wireless device 905-a and the second wireless device 905-b based on one or more values of the one or more bit field values.

At 970, the first wireless device 905-a may transmit the HARQ message to the second wireless device 905-b. In some aspects, the first wireless device 905-a may transmit the HARQ message at 970 based on identifying the HARQ message at 945, identifying the payload size of the HARQ message at 950, multiplexing (or refraining from multiplexing) the HARQ message with the uplink transmission at 955, generating the uplink transmission at 960, transmitting the uplink transmission at 965, or any combination thereof.

For example, in cases where the determined payload size of the HARQ message fails to satisfy the threshold payload size (e.g., $HARQ_{PS} > Thresh_{PS}$), the first wireless device 905-a may transmit at least a first portion of the HARQ message to the second wireless device 905-b via the sidelink feedback channel (e.g., PSFCH) of the sidelink communication link. In this example, the uplink transmission may be transmitted on a channel which is different from the PSFCH (e.g., PSCCH, PSSCH, other dedicated sidelink resources). Continuing with the same example, in some cases, the first wireless device 905-a may additionally transmit at least a portion (e.g., second portion) of the HARQ message via the uplink transmission transmitted at 965. In this regard, the first wireless device 905-a may transmit portions of the HARQ message via both the uplink transmission and the sidelink shared channel. In such cases, transmission of the uplink transmission may at least partially overlap with the sidelink feedback channel. Moreover, in some cases, the sidelink feedback channel (e.g., PSFCH) may puncture the uplink transmission.

Techniques described herein may enable sidelink-related transmissions (e.g., S-UCI) to be scheduled even in the absence of sidelink data. In particular, techniques described herein may enable S-UCI to be scheduled via SCI-2, thereby enabling S-UCI to be scheduled via PSCCH resources, PSSCH resources, or both. By allowing for sidelink-related control information to be scheduled even in the absence of sidelink data, techniques described herein may reduce latency of sidelink communications and lead to more efficient use of sidelink resources.

Figure 10:
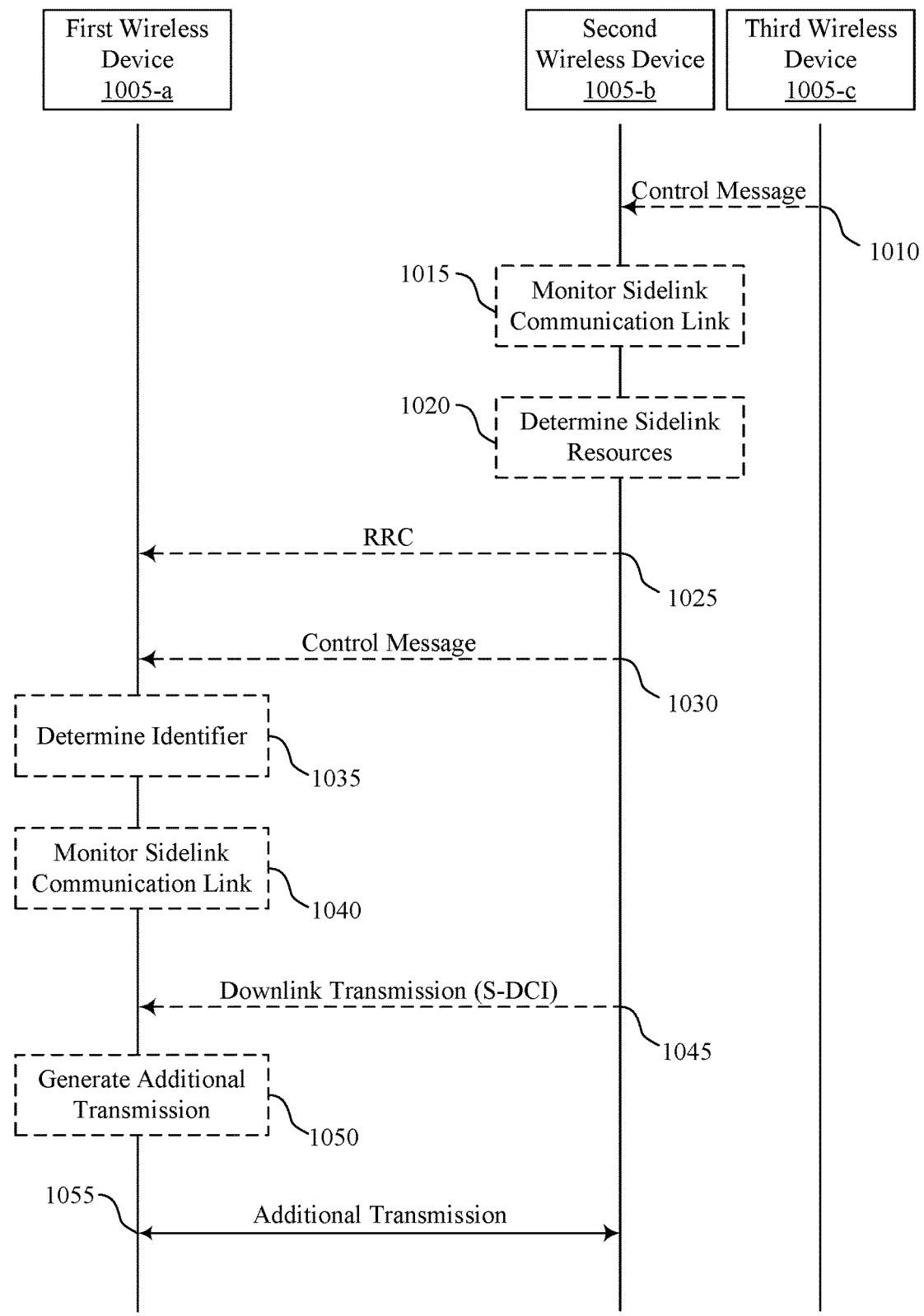
FIG. 10 illustrates an example of a process flow that supports techniques for sidelink control signaling in accordance with aspects of the present disclosure.

FIG. 10 illustrates an example of a process flow 1000 that supports techniques for sidelink control signaling in accordance with aspects of the present disclosure. In some examples, process flow 1000 may implement, or be implemented by, aspects of wireless communications systems 100, wireless communications systems 200, resource allocation schemes 300-800, process flow 900, or any combination thereof. For example, the process flow 900 may illustrate a first wireless device 1005-a receiving a downlink transmission (e.g., S-DCI), generating an additional transmission scheduled by the downlink transmission, and communicating with the additional wireless device via the additional transmission, as described with reference to FIGS. 1-9.

In some cases, process flow 1000 may include a first wireless device 1005-a, a second wireless device 1005-b, and a third wireless device 1005-c, which may be examples of corresponding devices as described herein. In particular, the wireless devices 1005 illustrated in FIG. 10 may include UEs 115, base stations 105, PLCs, and/or S/As. For example, in some cases, the first wireless device 1005-a may include a S/A, such as the first wireless device 205-a illustrated in FIG. 2. Moreover, the second wireless device 1005-b may include a PLC and the third wireless device 1005-c may include a base station 105, such as the second wireless device 205-b and the base station 105-a illustrated in FIG. 2.

In some examples, the operations illustrated in process flow 1000 may be performed by hardware (e.g., including circuitry, processing blocks, logic components, and other components), code (e.g., software or firmware) executed by a processor, or any combination thereof. Alternative examples of the following may be implemented, where some steps are performed in a different order than described or are not performed at all. In some cases, steps may include additional features not mentioned below, or further steps may be added.

At 1010, the third wireless device 1005-c (e.g., base station 105) may transmit a control message indicating a set of resources to be used for a sidelink communication link. In some aspects, the third wireless device 1005-c may transmit the control message to the first wireless device 1005-a, the second wireless device 1005-b, or both. The control message may include an allocation of resources (e.g., time resources, frequency resources, spatial resources) associated with a sidelink communication link which may be used by the first wireless device 1005-a, the second wireless device 1005-b, or both. The control message may include an RRC message, a DCI message, an SSB message, or any combination thereof. In some aspects, the third wireless device 1005-c may transmit the control message indicating the sidelink resources through a Mode 1 operation of a sidelink network.

At 1015, the second wireless device 1005-b (e.g., PLC) may monitor a sidelink communication link. In some aspects, the second wireless device 1005-b may monitor the sidelink communication link through a Mode 2 operation of the sidelink network in order to identify resources of the sidelink network which may be used by the second wireless device 1005-b, the first wireless device 1005-a, or both. In this regard, the second wireless device 1005-b may monitor the sidelink communication link by performing blind decoding of the PDCCHs of the sidelink communication link.

At 1020, the second wireless device 1005-b may determine a set of sidelink resources of the sidelink communication link which may be used by the first wireless device 1005-a, the second wireless device 1005-b, or both. The second wireless device 1005-b may determine the set of resources of the sidelink communication link based on monitoring the sidelink communication link at 1015. In this regard, the second wireless device 1005-b may determine the set of resources as part of the Mode 2 operation of the sidelink communication link. When determining sets of sidelink resources in Mode 2 operation, the second wireless device may be said to "reserve" the set of sidelink resources of the sidelink communication link. Therefore, it is noted herein that the second wireless device 1005-b may be configured to determine a set of sidelink resources of the sidelink communication link which may be used via the control message received at 1010 (Mode 1 operation), by monitoring and determining the set of sidelink resources at 1015-1020 (Mode 2 operation), or both.

At 1025, the first wireless device 1005-a may receive, from the second wireless device 1005-b, an RRC message. In some aspects, the RRC message may include information for configuring communications between the first wireless device 1005-a and the second wireless device 1005-b via the sidelink communication link between the respective devices. Data which may be indicated via the RRC message may include, but is not limited to, sets of sidelink resources for transmissions between the first and second wireless devices 1005-*a*, 1005-*b*, relationships between sets of sidelink resources which are used to schedule transmissions between the respective devices and the sets of sidelink resources used for the scheduled transmission, parameters associated with scheduled transmissions between the respective devices, or any combination thereof.

In some cases, the RRC message may allocate a set of sidelink resources for transmissions between the first and second wireless devices 1005-*a* and 1005-*b*. In this regard, the RRC message may configure a sidelink resource pool and/or one or more sidelink BWPs for sidelink communications between the respective wireless devices 1005.

In some cases, the RRC message may indicate a set of sidelink resources of the sidelink communication link which are dedicated for transmission of S-UCI and S-DCI. In this example, the RRC message may indicate a dedicated pool of sidelink resources for transmission/reception of S-UCI and/or S-DCI. Thus, the set of sidelink resources indicated via the RRC message may be dedicated for information associated with sidelink coordination, HARQ data, CSI-reports, scheduling requests (e.g., sidelink scheduling requests), SFIs, and the like. The set of sidelink resources which are dedicated for transmission of S-UCI and S-DCI may include sidelink resources which do not include PSCCH resources, PSSCH resources, or both.

In additional or alternative cases, the RRC message may indicate one or more parameters associated with transmissions (e.g., S-UCI, S-DCI) that are transmitted via the sidelink communication link. For example, in cases where the second wireless device 1005-*b* is to schedule an S-UCI from the first wireless device 1005-*a* to the second wireless device 1005-*b*, the RRC message may indicate a set of parameters for the scheduled S-UCI. Parameters associated with the scheduled transmissions performed via the sidelink communication link (e.g., S-UCI) may include, but are not limited to, a bundling size of the scheduled transmission, an interleaving configuration, a frequency hopping configuration, a periodicity, or any combination thereof.

In additional or alternative aspects, the RRC message may indicate a relationship between sets of sidelink resources. In particular, the RRC message may indicate a relationship between a first set of sidelink resources associated with a first transmission which schedules second transmission and a second set of sidelink resources which are to be used for the second transmission. For example, in cases where the second wireless device 1005-*b* is to transmit S-DCI which schedules an additional transmission between the first wireless device 1005-*a* and the second wireless device 1005-*b*, the RRC message may indicate a relationship between a first set of sidelink resources used to transmit the S-DCI, and a second set of sidelink resources for the additional transmission. The relationship may include a relationship between sets of frequency resources, between sets of time resources, or both.

At 1030, the second wireless device 1005-*b* may transmit a control message to the first wireless device 1005-*a*. The control message may include, but is not limited to, a DCI message, an SCI message, an RRC message, a MAC-CE message, or any combination thereof. The second wireless device 1005-*b* may transmit the control message based on receiving the control message at 1010, monitoring the sidelink communication link at 1015, determining a set of sidelink resources at 1020, transmitting the RRC message at 1030, or any combination thereof. In some cases, information conveyed via the control message and the RRC message may be conveyed in a single transmission, in separate transmissions, or both.

In some aspects, the control message may indicate a set of resources (e.g., set of sidelink resources) usable by the first wireless device for receiving a downlink transmission (e.g., S-DCI) from the second wireless device 1005-*b*. Additionally or alternatively, the control message may indicate a set of sidelink resources may be usable by the first wireless device 1005-*a* to transmit an uplink transmission (e.g., S-UCI, PSSCH) to the second wireless device 1005-*b*. In cases where the RRC message at 1025 allocates a set of sidelink resources for transmissions between the first and second wireless devices 1005-*a* and 1005-*b* (e.g., configures a sidelink resource pool and/or one or more sidelink BWPs), the control message may "reclaim" at least a portion of the set of resources which will be reserved (e.g., dedicated) for transmission/reception of S-DCI and S-UCI.

In some aspects, the control message may allocate a set of resources for a set of transmissions between the first wireless device 1005-*a* and the second wireless device 1005-*b*. In this regard, the control message may serve as a configured grant (e.g., CG-2) and/or semi-persistent scheduling for transmissions between the first wireless device 1005-*a* and the second wireless device 1005-*b*. For example, the control message may allocate a set of resources usable by the first wireless device 1005-*a* to transmit CSI reports, sounding reference signals, inter-UE coordination messages, PSSCH transmissions, S-UCI transmissions, or any combination thereof. Similarly, by way of another example, the control message may allocate a set of resources usable by the second wireless device 1005-*b* to transmit PSSCH transmissions, S-DCI transmissions, or both.

Additionally, or alternatively, the control message may indicate a format (e.g., SFI) associated with one or more TTIs of the sidelink communication link between the first wireless device 1005-*a* and the second wireless device 1005-*b*. For example, the control message may indicate that a first TTI (e.g., first slot) is configured for uplink transmissions (e.g., uplink format) from the first wireless device 1005-*a* to the second wireless device 1005-*b*, a second TTI (e.g., second slot) is configured for downlink transmissions (e.g., downlink format) from the second wireless device 1005-*b* to the first wireless device 1005-*a*, and a third TTI (e.g., third slot) is configured for uplink and downlink transmissions (e.g., flexible format) between the wireless devices 1005. By indicating a format for TTIs of the sidelink communication link, techniques described herein may reduce a quantity of blind decoding which is performed by the respective wireless devices 1005.

At 1035, the first wireless device 1005-*a* may determine that the first wireless device 1005-*a* is associated with an identifier. In some aspects, the first wireless device 1005-*a* may determine that it is associated with an identifier in order to determine whether transmissions (e.g., S-DCI, SCI, RRC) received by the first wireless device 1005-*a* are intended for the first wireless device wireless device 1005-*a*.

In some cases, the RRC message and/or control message received at 1025 and 1030 may indicate the identifier associated with the first wireless device 1005-*a*. In this regard, the first wireless device 1005-*a* may determine an identifier associated with the first wireless device 1005-*a* based on receiving the RRC message at 1025, receiving the control message at 1030, or both. The identifier associated with the first wireless device 1005-*a* may include a sidelink reception identifier (e.g., sidelink Rx-ID). Additionally or alternatively, the identifier may be assigned to the first wireless device 1005-*a* (e.g., UE-assigned identifier) by the second wireless device 1005-*b* (e.g., PLC), the third wireless device 1005-*c* (e.g., base station 105), or both. monitoring the sidelink communication link at 1035, receiving the downlink transmission at 1040, or any combination thereof.

At 1040, the first wireless device 1005-*a* may monitor the sidelink communication link between the first wireless device 1005-*a* and the second wireless device 1005-*b*. In some aspects, the first wireless device 1005-*a* may monitor the sidelink communication link based on receiving the RRC at 1025, receiving the control message at 1030, determining the identifier at 1035, or any combination thereof.

For example, in some cases, the control message (e.g., SCI) may indicate a set of resources for receiving a downlink transmission (e.g., S-DCI) from the second wireless device 1005-*b*. In this regard, the control message may schedule a downlink transmission from the second wireless device 1005-*b* to the first wireless device 1005-*a*. In this example, the first wireless device may monitor the set of resources indicated in the control message. By way of another example, the control message may indicate a format for a set of TTIs of the sidelink communication link. For instance, the control message may indicate a set of TTIs which are configured for downlink transmissions (e.g., downlink format). In this example, the first wireless device may monitor the sidelink communication link based on (e.g., in accordance with) the indicated formats. In particular, the first wireless device 1005-*a* may monitor TTIs which are associated with a downlink format.

At 1045, the first wireless device 1005-*a* may receive a downlink transmission from the second wireless device 1005-*b*. In some aspects, the downlink transmission may include a downlink control information message (e.g., S-DCI). In some aspects, the downlink transmission may schedule an additional transmission between the first wireless device 1005-*a* and the second wireless device 1005-*b*. For example, the downlink transmission may be received in a first TTI (e.g., first slot), and may schedule a transmission in a second TTI (e.g., second slot) which is subsequent to the first TTI. Moreover, in some cases, the downlink transmission may be received within the set of sidelink resources of the sidelink communication link which are dedicated for transmission/reception of S-DCI and S-UCI.

In this regard, the first wireless device 1005-*a* may receive the downlink transmission at 1040 based on receiving the RRC message at 1025, receiving the control message at 1030, determining the identifier at 1035, monitoring the sidelink communication link at 1040, or any combination thereof. For example, the RRC message and/or the control message may indicate a format for a set of slots of the sidelink communication link. In this example, the first wireless device 1005-*a* may monitor the sidelink communication link based on the indicated formats (e.g., monitor downlink and flexible slots), and may receive the downlink transmission within a slot configured for downlink and/or flexible communications which was monitored by the first wireless device 1005-*a*. Comparatively, in cases where the first wireless device 1005-*a* does not know a format for the respective slots or TTIs of the sidelink communication link, the first wireless device 1005-*a* may be configured to receive the downlink transmission based on blind decoding.

The additional transmission scheduled by the downlink transmission may include an uplink control information message (e.g., S-UCI), an uplink data message (e.g., uplink PSSCH transmission), a downlink data message (e.g., downlink PSSCH transmission), or any combination thereof. Accordingly, the downlink transmission may schedule forward and/or reverse sidelink traffic with or without S-UCI indicators in cases where the additional transmission scheduled by the downlink transmission includes S-UCI. In some cases, the additional transmission may include a PSSCH transmission, in which case the PSSCH transmission may be scheduled via one or more indicators within the downlink transmission (e.g., indicators similar to UL-SCH indicator in $DCI_{0\_1}$).

The downlink transmission (e.g., S-DCI) may include various formats and fields (e.g., PDCCH-like formats and fields). In particular, the downlink transmission may include one or more formats which are associated with DCI messages. For example, the downlink transmission may include a first format (e.g., DCI 0_0, DCI 0_1, DCI 0_2) for scheduling uplink transmissions, a second format (e.g., DCI 1_0, DCI 1_1, DCI 1_2) for scheduling downlink transmissions, a third format (e.g., DCI 2_0, DCI 2_1, DCI 2_2, DCI 2_3, DCI 2_4, DCI 2_5, DCI 2_6) for SFI commands, transmit power control (TPC) commands, and/or pre-emption commands.

The downlink transmission may exhibit varying sizes within the set of sidelink resources dedicated for S-DCI and S-UCI, depending on the payload size of the downlink transmission. Moreover, the size of the downlink transmission in the time and frequency domain may be based on a coverage requirement and/or aggregation level for the downlink transmission. For example, in some cases, the downlink transmission may span a set of symbols of the set of dedicated sidelink resources in the time domain, and a set of PRBs of the set of dedicated sidelink resources in the frequency domain. In cases where the downlink transmission spans relatively few symbols in the time domain, the set of dedicated sidelink resources may include multiple opportunities for downlink transmissions (e.g., multiple S-DCI transmission opportunities) per slot, which may allow for fast and efficient scheduling. By way of another example, in other cases, the downlink transmission may span a slot of the set of dedicated sidelink resources in the time domain, and a set of PRBs of the set of dedicated sidelink resources in the frequency domain. Such cases may be beneficial for AGC.

In some cases, the downlink transmission (e.g., S-DCI) may be transmitted and/or addressed to multiple wireless devices 1005. For example, the downlink transmission may include a common downlink transmission (e.g., GC-PSCCH) which is transmitted by the second wireless device 1005-*b* to a set of wireless devices 1005 including the first wireless device 1005-*a*. For instance, the second wireless device 1005-*b* may transmit a common downlink transmission (e.g., common S-DCI) to a group of wireless devices 1005 to indicate SFIs for the respective wireless devices 1005. In some cases, the downlink transmission (e.g., S-DCI) may be addressed to different wireless devices 1005 and transmitted (e.g., multiplexed) using multiple OCCs. For example, in some cases, the downlink transmission may be associated with a set of OCCs, where at least one OCC of the set of OCCs is associated with the first wireless device 1005-*a*.

In some implementations, the downlink transmission may be multiplexed (e.g., TDM) with a sidelink shared channel transmission (e.g., PSSCH). In some aspects, a PSSCH transmission multiplexed with the downlink transmission may be multiplexed using a subset of the set of dedicated sidelink resources dedicated for S-DCI and S-UCI, using a portion of legacy sidelink resources (e.g., PSSCH data channel), or both. In such cases, the downlink transmission may indicate that it is multiplexed with the sidelink shared channel transmission. In particular, the downlink transmission may indicate whether resources of a PSSCH data channel is multiplexed with the downlink transmission in the TTI/slot in which the downlink transmission is received.

In some cases, the downlink transmission (e.g., S-DCI) may activate transmissions and/or sets of resources which were allocated or scheduled via the RRC message and/or control message at 1025 and 1030. In this regard, the downlink transmission may activate transmissions which were previously scheduled/allocated via semi-persistent scheduling, configured grants, or both. For example, the control message received at 1030 may allocate a set of resources for a set of transmissions (e.g., set of CSI reports) from the first wireless device 1005-*a* to the second wireless device 1005-*b*. In this example, the downlink transmission may include an indication for the first wireless device 1005-*a* to perform at least a subset of the set of transmissions. In other words, the downlink transmission may activate the CSI reporting which was scheduled/allocated via the control message at 1030.

The downlink transmission may additionally or alternatively indicate formats (e.g., uplink format, downlink format, flexible format) for subsequent TTIs/subsequent slots. For example, the downlink transmission may be received in a first TTI, and may indicate a format associated with one or more TTIs which are subsequent to the first TTI. In this regard, the downlink transmission may indicate an SFI for TTIs of the sidelink communication link.

In some aspects, the first wireless device 1005-*a* may determine that the downlink transmission is addressed to (e.g., intended for) the first wireless device 1005-*a* based on the identifier associated with the first wireless device 1005-*a* which was determined at 1035. For example, in some cases, the downlink transmission may include an indication of the identifier (e.g., sidelink Rx-ID, UE-assigned ID) via one or more bit field values of the downlink transmission. By way of another example, the downlink transmission may include a cyclic redundancy portion (e.g., CRC portion) which is scrambled via the identifier. In this example, the first wireless device 1005-*a* may be configured to demodulate the cyclic redundancy portion of the downlink transmission based on the identifier to determine that the downlink transmission is addressed to (e.g., intended for) the first wireless device 1005-*a*.

The first wireless device 1005-*a* may utilize other techniques to determine that the downlink transmission is addressed to the first wireless device 1005-*a*. In some case, the second wireless device 1005-*b* may indicate that the downlink transmission is addressed to the first wireless device 1005-*a* by transmitting the downlink transmission within a downlink transmission opportunity (e.g., S-DCI transmission opportunity). For example, in some cases, the identifier may be associated with a reception opportunity for downlink transmissions which is monitored by the first wireless device 1005-*a*. In other cases where the downlink transmission is scheduled via the RRC message at 1025 and/or the control message at 1030, the first wireless device 1005-*a* may determine that the downlink transmission is addressed to the first wireless device 1005-*a* based on receiving the downlink transmission within the allocated set of resources.

In some cases, the downlink transmission (e.g., S-DCI) may additionally, or alternatively, be transmitted by the second wireless device 1005-*b* (e.g., PLC) to additional PLCs for inter-PLC coordination. For example, the second wireless device 1005-*b* may transmit (e.g., broadcast) the downlink transmission at 1045 to other PLCs in order to manage traffic within a sidelink communication network. In this example, the other PLCs may be configured to monitor for inter-PLC coordination messages including the downlink transmission. In some cases, resources for transmitting/receiving inter-PLC coordination messages (e.g., downlink transmission) may be configured via the third wireless device 1005-*c* (e.g., base station 105) via RRC signaling.

At 1050, the first wireless device 1005-*a* may generate the additional transmission scheduled by the downlink transmission. In this regard, the first wireless device 1005-*a* may generate the additional transmission based on receiving the downlink transmission at 1045. Additionally or alternatively, the first wireless device 1005-*a* may generate the additional transmission at 1050 based on receiving the RRC message at 1025, receiving the control message at 1030, determining the identifier at 1035, monitoring the sidelink communication link at 1040, receiving the downlink transmission at 1045, or any combination thereof.

As noted previously herein, the additional transmission scheduled by the downlink transmission may include an uplink control information message (e.g., S-UCI), an uplink data message (e.g., uplink PSSCH transmission), a downlink data message (e.g., downlink PSSCH transmission), or any combination thereof.

At 1055, the first wireless device 1005-*a* may communicate with the second wireless device 1005-*b* via the additional transmission on the sidelink communication link between the respective wireless devices 1005. The first wireless device 1005-*a* and the second wireless device 1005-*b* may communicate via the additional transmission based on transmitting/receiving the RRC message at 1025, transmitting/receiving the control message at 1030, determining the identifier at 1035, monitoring the sidelink communication link at 1040, transmitting/receiving the downlink transmission at 1045, generating the additional transmission at 1050, or any combination thereof.

For example, in cases where the additional transmission includes an S-UCI, the first wireless device 1005-*a* may transmit the S-UCI to the second wireless device 1005-*b* at 1055. By way of another example, in cases where the additional transmission includes downlink data message (e.g., downlink PSSCH transmission), the second wireless device 1005-*b* may transmit the downlink data message to the first wireless device 1005-*a* at 1055.

The additional transmission may be transmitted/received at 1055 based on additional or alternative parameters or characteristics indicated via the RRC message received at 1025, the control message received at 1030, the downlink transmission at 1045, or any combination thereof. For example, in cases where the RRC message received at 1025 indicates one or more parameters associated with transmission of the uplink transmission (e.g., bundling size, interleaving configuration, frequency hopping configuration, periodicity), the wireless devices 1005 may communicate via the additional transmission at 1055 based on (e.g., in accordance with) the one or more parameters. By way of another example, in cases where the downlink transmission transmitted/received at 1045 includes an indication to perform the additional transmission periodically, aperiodically, and/or semi-persistently, the wireless devices 1005 may transmit/receive the additional transmission at 1055 based on (e.g., in accordance with) based on the indication. In this regard, in cases where the additional transmission includes an S-UCI, the first wireless device 1005-*a* may transmit the S-UCI periodically, aperiodically, and/or semi-persistently (e.g., responsive to MAC-CE messages, DCI (S-DCI) messages, or RRC messages received from the second wireless device 1005-b).

Techniques described herein may enable sidelink-related transmissions (e.g., S-UCI, PSSCH transmissions) to be scheduled even in the absence of sidelink data. In particular, techniques described herein may enable transmissions over a sidelink communication link to be scheduled via downlink transmissions (e.g., S-DCI), thereby enabling the respective transmissions to be scheduled via PSCCH resources, PSSCH resources, or both.

Figure 11:
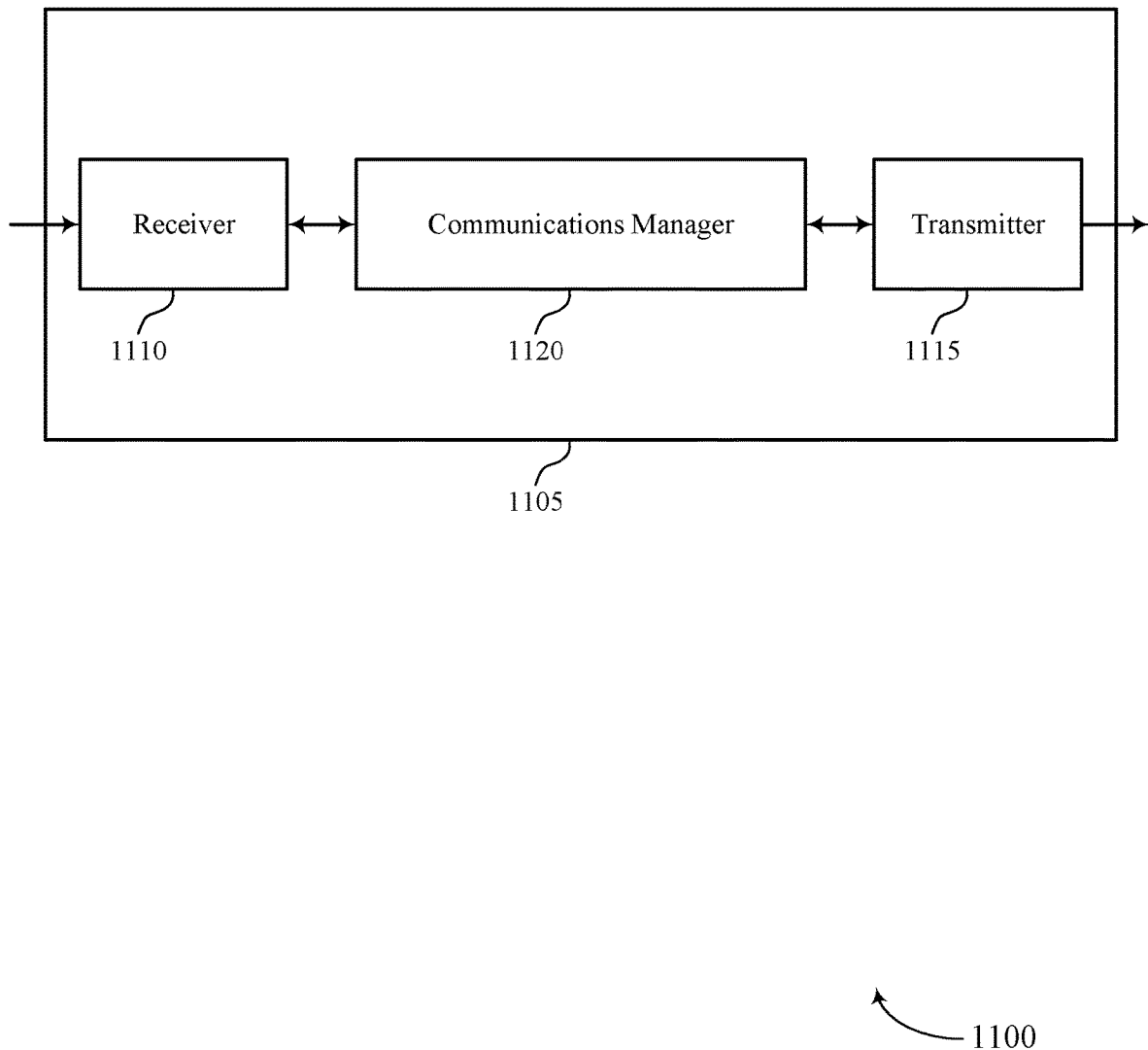
FIGS. 11 and 12 show block diagrams of devices that support techniques for sidelink control signaling in accordance with aspects of the present disclosure.

FIG. 11 shows a block diagram 1100 of a device 1105 that supports techniques for sidelink control signaling in accordance with aspects of the present disclosure. The device 1105 may be an example of aspects of a UE 115 as described herein. The device 1105 may include a receiver 1110, a transmitter 1115, and a communications manager 1120. The device 1105 may also include a processor. Each of these components may be in communication with one another (e.g., via one or more buses).

The receiver 1110 may provide a means for receiving information such as packets, user data, control information, or any combination thereof associated with various information channels (e.g., control channels, data channels, information channels related to techniques for sidelink control signaling). Information may be passed on to other components of the device 1105. The receiver 1110 may utilize a single antenna or a set of multiple antennas.

The transmitter 1115 may provide a means for transmitting signals generated by other components of the device 1105. For example, the transmitter 1115 may transmit information such as packets, user data, control information, or any combination thereof associated with various information channels (e.g., control channels, data channels, information channels related to techniques for sidelink control signaling). In some examples, the transmitter 1115 may be co-located with a receiver 1110 in a transceiver module. The transmitter 1115 may utilize a single antenna or a set of multiple antennas.

The communications manager 1120, the receiver 1110, the transmitter 1115, or various combinations thereof or various components thereof may be examples of means for performing various aspects of techniques for sidelink control signaling as described herein. For example, the communications manager 1120, the receiver 1110, the transmitter 1115, or various combinations or components thereof may support a method for performing one or more of the functions described herein.

In some examples, the communications manager 1120, the receiver 1110, the transmitter 1115, or various combinations or components thereof may be implemented in hardware (e.g., in communications management circuitry). The hardware may include a processor, a digital signal processor (DSP), an application-specific integrated circuit (ASIC), a field-programmable gate array (FPGA) or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1120, the receiver 1110, the transmitter 1115, or various combinations or components thereof may be implemented in code (e.g., as communications management software or firmware) executed by a processor. If implemented in code executed by a processor, the functions of the communications manager 1120, the receiver 1110, the transmitter 1115, or various combinations or components thereof may be performed by a general-purpose processor, a DSP, a central processing unit (CPU), an ASIC, an FPGA, or any combination of these or other programmable logic devices (e.g., configured as or otherwise supporting a means for performing the functions described in the present disclosure).

In some examples, the communications manager 1120 may be configured to perform various operations (e.g., receiving, monitoring, transmitting) using or otherwise in cooperation with the receiver 1110, the transmitter 1115, or both. For example, the communications manager 1120 may receive information from the receiver 1110, send information to the transmitter 1115, or be integrated in combination with the receiver 1110, the transmitter 1115, or both to receive information, transmit information, or perform various other operations as described herein.

The communications manager 1120 may support wireless communication at a first wireless device in accordance with examples as disclosed herein. For example, the communications manager 1120 may be configured as or otherwise support a means for receiving, from a second wireless device via a sidelink communication link, SCI scheduling an uplink transmission from the first wireless device to the second wireless device. The communications manager 1120 may be configured as or otherwise support a means for generating the uplink transmission based on the SCI. The communications manager 1120 may be configured as or otherwise support a means for transmitting the uplink transmission to the second wireless device via the sidelink communication link in accordance with the SCI.

Additionally or alternatively, the communications manager 1120 may support wireless communication at a first wireless device in accordance with examples as disclosed herein. For example, the communications manager 1120 may be configured as or otherwise support a means for receiving, from a second wireless device via a sidelink communication link, a downlink transmission scheduling an additional transmission between the first wireless device and the second wireless device, the downlink transmission received within a set of sidelink resources of the sidelink communication link which are dedicated for reception of downlink control information or transmission of uplink control information. The communications manager 1120 may be configured as or otherwise support a means for generating the additional transmission based on the downlink transmission. The communications manager 1120 may be configured as or otherwise support a means for communicating with the second wireless device via the additional transmission on the sidelink communication link in accordance with the downlink transmission.

By including or configuring the communications manager 1120 in accordance with examples as described herein, the device 1105 (e.g., a processor controlling or otherwise coupled to the receiver 1110, the transmitter 1115, the communications manager 1120, or a combination thereof) may support techniques for scheduling sidelink-related transmissions to be scheduled via SCI (e.g., SCI-2) and/or S-DCI even in the absence of sidelink data. In particular, techniques described herein may enable S-UCI, S-DCI, and/or PSSCH transmissions to be scheduled via SCI-2 and/or S-DCI, thereby enabling such sidelink transmissions to be scheduled via PSCCH resources, PSSCH resources, or both. By allowing for sidelink-related control information to be scheduled even in the absence of sidelink data, techniques described herein may reduce latency of sidelink communications and lead to more efficient use of sidelink resources.

Figure 12:
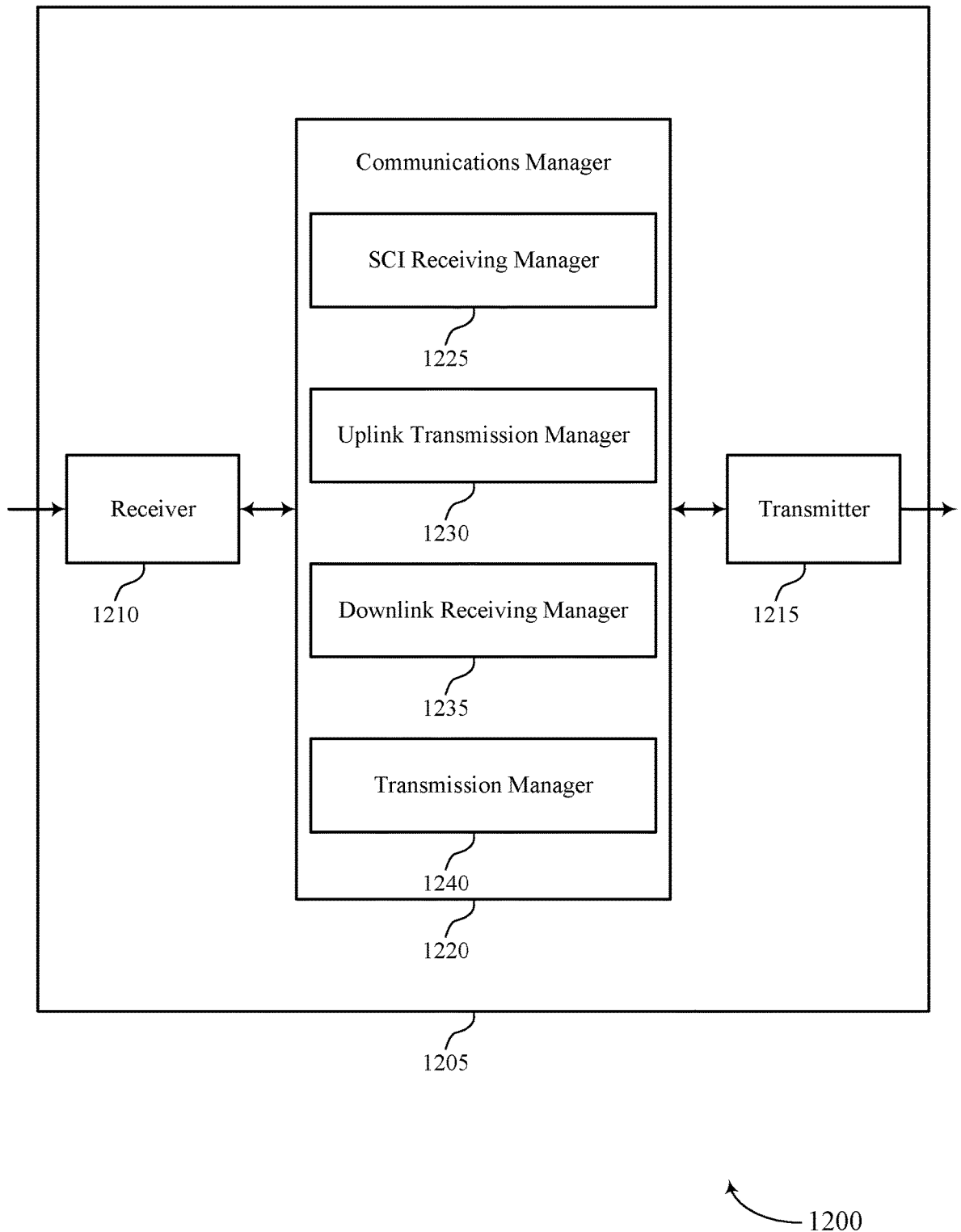

FIG. 12 shows a block diagram 1200 of a device 1205 that supports techniques for sidelink control signaling in accordance with aspects of the present disclosure. The device 1205 may be an example of aspects of a device 1105 or a UE 115 as described herein. The device 1205 may include a receiver 1210, a transmitter 1215, and a communications manager 1220. The device 1205 may also include a processor. Each of these components may be in communication with one another (e.g., via one or more buses).

The receiver 1210 may provide a means for receiving information such as packets, user data, control information, or any combination thereof associated with various information channels (e.g., control channels, data channels, information channels related to techniques for sidelink control signaling). Information may be passed on to other components of the device 1205. The receiver 1210 may utilize a single antenna or a set of multiple antennas.

The transmitter 1215 may provide a means for transmitting signals generated by other components of the device 1205. For example, the transmitter 1215 may transmit information such as packets, user data, control information, or any combination thereof associated with various information channels (e.g., control channels, data channels, information channels related to techniques for sidelink control signaling). In some examples, the transmitter 1215 may be co-located with a receiver 1210 in a transceiver module. The transmitter 1215 may utilize a single antenna or a set of multiple antennas.

The device 1205, or various components thereof, may be an example of means for performing various aspects of techniques for sidelink control signaling as described herein. For example, the communications manager 1220 may include an SCI receiving manager 1225, an uplink transmission manager 1230, a downlink receiving manager 1235, a transmission manager 1240, or any combination thereof. The communications manager 1220 may be an example of aspects of a communications manager 1120 as described herein. In some examples, the communications manager 1220, or various components thereof, may be configured to perform various operations (e.g., receiving, monitoring, transmitting) using or otherwise in cooperation with the receiver 1210, the transmitter 1215, or both. For example, the communications manager 1220 may receive information from the receiver 1210, send information to the transmitter 1215, or be integrated in combination with the receiver 1210, the transmitter 1215, or both to receive information, transmit information, or perform various other operations as described herein.

The communications manager 1220 may support wireless communication at a first wireless device in accordance with examples as disclosed herein. The SCI receiving manager 1225 may be configured as or otherwise support a means for receiving, from a second wireless device via a sidelink communication link, SCI scheduling an uplink transmission from the first wireless device to the second wireless device. The uplink transmission manager 1230 may be configured as or otherwise support a means for generating the uplink transmission based on the SCI. The uplink transmission manager 1230 may be configured as or otherwise support a means for transmitting the uplink transmission to the second wireless device via the sidelink communication link in accordance with the SCI.

Additionally or alternatively, the communications manager 1220 may support wireless communication at a first wireless device in accordance with examples as disclosed herein. The downlink receiving manager 1235 may be configured as or otherwise support a means for receiving, from a second wireless device via a sidelink communication link, a downlink transmission scheduling an additional transmission between the first wireless device and the second wireless device, the downlink transmission received within a set of sidelink resources of the sidelink communication link which are dedicated for reception of downlink control information or transmission of uplink control information. The transmission manager 1240 may be configured as or otherwise support a means for generating the additional transmission based on the downlink transmission. The transmission manager 1240 may be configured as or otherwise support a means for communicating with the second wireless device via the additional transmission on the sidelink communication link in accordance with the downlink transmission.

Figure 13:
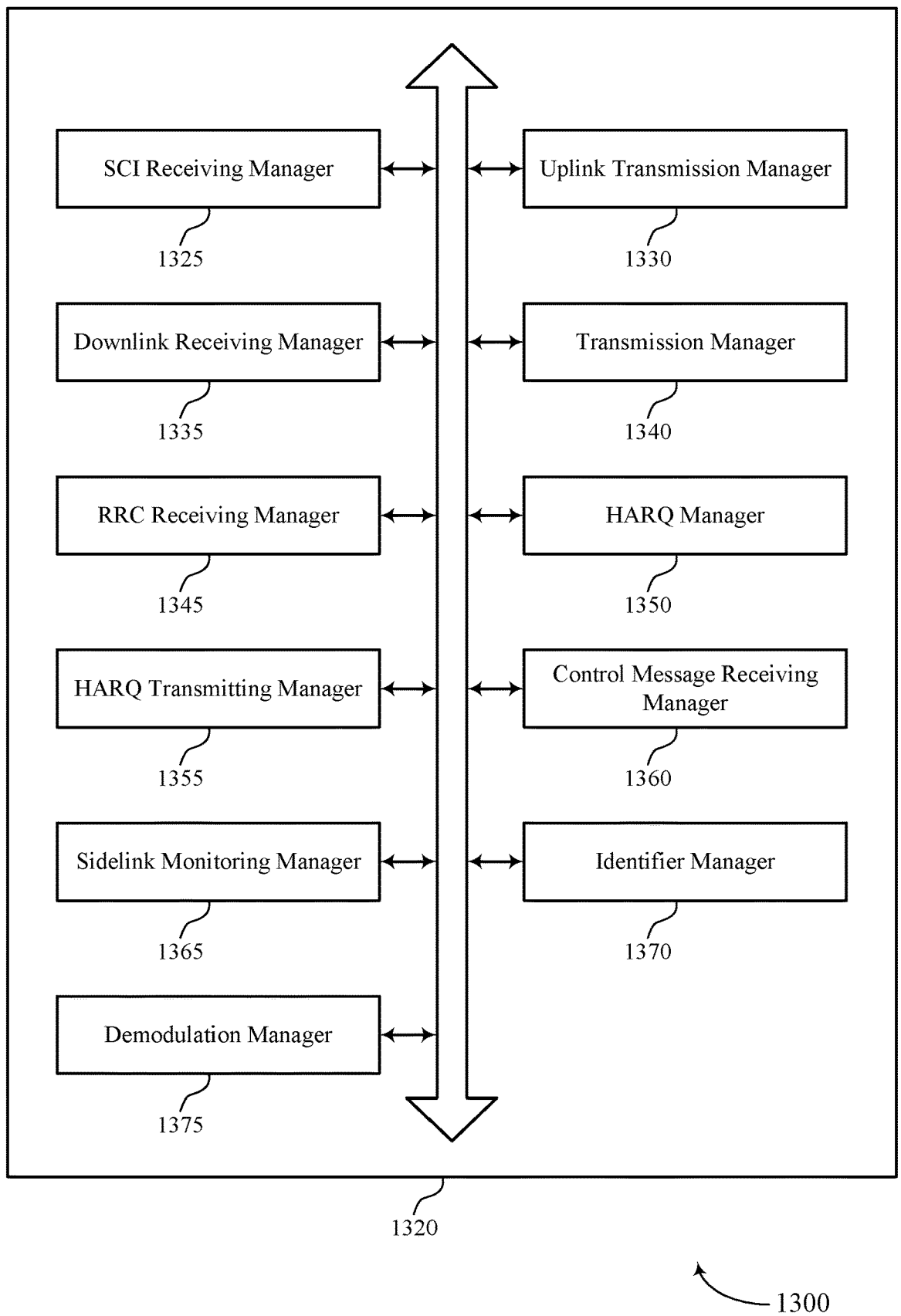
FIG. 13 shows a block diagram of a communications manager that supports techniques for sidelink control signaling in accordance with aspects of the present disclosure.

FIG. 13 shows a block diagram 1300 of a communications manager 1320 that supports techniques for sidelink control signaling in accordance with aspects of the present disclosure. The communications manager 1320 may be an example of aspects of a communications manager 1120, a communications manager 1220, or both, as described herein. The communications manager 1320, or various components thereof, may be an example of means for performing various aspects of techniques for sidelink control signaling as described herein. For example, the communications manager 1320 may include an SCI receiving manager 1325, an uplink transmission manager 1330, a downlink receiving manager 1335, a transmission manager 1340, an RRC receiving manager 1345, an HARQ manager 1350, an HARQ transmitting manager 1355, a control message receiving manager 1360, a sidelink monitoring manager 1365, an identifier manager 1370, a demodulation manager 1375, or any combination thereof. Each of these components may communicate, directly or indirectly, with one another (e.g., via one or more buses).

The communications manager 1320 may support wireless communication at a first wireless device in accordance with examples as disclosed herein. The SCI receiving manager 1325 may be configured as or otherwise support a means for receiving, from a second wireless device via a sidelink communication link, SCI scheduling an uplink transmission from the first wireless device to the second wireless device. The uplink transmission manager 1330 may be configured as or otherwise support a means for generating the uplink transmission based on the SCI. In some examples, the uplink transmission manager 1330 may be configured as or otherwise support a means for transmitting the uplink transmission to the second wireless device via the sidelink communication link in accordance with the SCI.

In some examples, the RRC receiving manager 1345 may be configured as or otherwise support a means for receiving a RRC message that indicates a set of sidelink resources of the sidelink communication link which are dedicated for transmission of uplink control information or reception of downlink control information, where the uplink transmission is transmitted via at least a portion of the set of sidelink resources.

In some examples, the SCI receiving manager 1325 may be configured as or otherwise support a means for receiving, via the SCI, an indication of a subset of the set of sidelink resources to be used for transmitting the uplink transmission. In some examples, the set of sidelink resources which are dedicated for transmission of uplink control information or reception of downlink control information spans a first quantity of PRBs at a first boundary of a sidelink BWP.

In some examples, the first quantity of PRBs spans less than a full subchannel in a frequency domain.

In some examples, the set of sidelink resources which are dedicated for transmission of uplink control information or reception of downlink control information spans a second quantity of PRBs at an additional boundary of the sidelink BWP, the additional boundary opposite the first boundary in a frequency domain with respect to the sidelink BWP.

In some examples, the set of sidelink resources which are dedicated for transmission of uplink control information or reception of downlink control information spans a second quantity of PRBs. In some examples, the first quantity of PRBs and the second quantity of PRBs are separated by at least one subchannel in a frequency domain.

In some examples, the RRC receiving manager 1345 may be configured as or otherwise support a means for receiving an additional RRC message that indicates a sidelink BWP configured for sidelink communications, where the RRC message which indicates the set of sidelink resources which are dedicated for transmission of uplink control information or reception of downlink control information reclaims the set of sidelink resources from the sidelink BWP.

In some examples, the SCI receiving manager 1325 may be configured as or otherwise support a means for receiving, via the SCI, an indication of a set of sidelink resources to be used for transmitting the uplink transmission, where the uplink transmission is transmitted via at least a portion of the set of sidelink resources.

In some examples, the indication of the set of sidelink resources is included in one or more bit fields associated with an allocation of time resources, one or more bit fields associated with an allocation of frequency resources, or both.

In some examples, the SCI receiving manager 1325 may be configured as or otherwise support a means for receiving, via the SCI, one or more bit field values associated with enabling or disabling CSI reporting. In some examples, the uplink transmission manager 1330 may be configured as or otherwise support a means for transmitting, via the uplink transmission, a CSI report associated with the sidelink communication link based on a value of the one or more bit field values.

In some examples, the RRC receiving manager 1345 may be configured as or otherwise support a means for receiving a RRC message that indicates a relationship between a first set of sidelink resources for receiving the SCI and a second set of sidelink resources for transmitting the uplink transmission, where transmitting the uplink transmission is based on the relationship.

In some examples, the RRC receiving manager 1345 may be configured as or otherwise support a means for receiving a RRC message including an indication of one or more parameters associated with transmission of the uplink transmission, where transmitting the uplink transmission is in accordance with the one or more parameters. In some examples, the one or more parameters include a bundling size associated with the uplink transmission, an interleaving configuration, a frequency hopping configuration, a periodicity, or any combination thereof.

In some examples, the SCI receiving manager 1325 may be configured as or otherwise support a means for receiving, via the SCI, an indication to transmit the uplink transmission periodically, aperiodically, semi-persistently, or any combination thereof, where the uplink transmission is transmitted in accordance with the indication. In some examples, the SCI receiving manager 1325 may be configured as or otherwise support a means for receiving, via the SCI, an indication of a time interval between reception of the SCI and transmission of the uplink transmission, where transmitting the uplink transmission is in accordance with the time interval. In some examples, the SCI receiving manager 1325 may be configured as or otherwise support a means for receiving, via the SCI, an indication of a format to be used for the uplink transmission, where generating the uplink transmission is based on the format.

In some examples, the format includes one or more fields for indicating a frequency hopping configuration, a repetition configuration, an OCC, or any combination thereof. In some examples, the uplink transmission includes an uplink control information message, an uplink data message, or both. In some examples, the SCI is received via a sidelink shared channel of the sidelink communication link.

In some examples, the SCI receiving manager 1325 may be configured as or otherwise support a means for receiving additional SCI from the second wireless device via a sidelink control channel of the sidelink communication link, where receiving the SCI is based on receiving the additional SCI.

In some examples, the additional SCI is in a first SCI format. In some examples, the SCI is in a second SCI format different from the first SCI format.

In some examples, the HARQ manager 1350 may be configured as or otherwise support a means for identifying that the first wireless device is configured to transmit a HARQ message to the second wireless device via a sidelink feedback channel of the sidelink communication link. In some examples, the HARQ transmitting manager 1355 may be configured as or otherwise support a means for multiplexing the HARQ message with the uplink transmission without transmitting the HARQ message via the sidelink feedback channel.

In some examples, the HARQ transmitting manager 1355 may be configured as or otherwise support a means for identifying that a payload size of the HARQ message is less than or equal to a threshold payload size, where multiplexing the HARQ message with the uplink transmission is based on identifying that the payload size is less than or equal to the threshold payload size. In some examples, the HARQ transmitting manager 1355 may be configured as or otherwise support a means for identifying the payload size of the HARQ message based on a periodicity of transmissions performed via the sidelink feedback channel.

In some examples, the HARQ manager 1350 may be configured as or otherwise support a means for identifying that the first wireless device is configured to transmit a HARQ message to the second wireless device via a sidelink feedback channel of the sidelink communication link. In some examples, the HARQ transmitting manager 1355 may be configured as or otherwise support a means for transmitting at least a first portion of the HARQ message to the second wireless device via the sidelink feedback channel of the sidelink communication link, where the uplink transmission is transmitted on a channel which is different from the sidelink feedback channel.

In some examples, the HARQ transmitting manager 1355 may be configured as or otherwise support a means for transmitting at least a second portion of the HARQ message to the second wireless device via the uplink transmission. In some examples, transmission of the uplink transmission at least partially overlaps with the sidelink feedback channel. In some examples, the sidelink feedback channel punctures the uplink transmission.

In some examples, the control message receiving manager 1360 may be configured as or otherwise support a means for receiving, from a third wireless device, a control message indicating a set of sidelink resources to be used for the sidelink communication link, where the uplink transmission is transmitted within at least a subset of the set of sidelink resources.

Additionally or alternatively, the communications manager 1320 may support wireless communication at a first wireless device in accordance with examples as disclosed herein. The downlink receiving manager 1335 may be configured as or otherwise support a means for receiving, from a second wireless device via a sidelink communication link, a downlink transmission scheduling an additional transmission between the first wireless device and the second wireless device, the downlink transmission received within a set of sidelink resources of the sidelink communication link which are dedicated for reception of downlink control information or transmission of uplink control information. The transmission manager 1340 may be configured as or otherwise support a means for generating the additional transmission based on the downlink transmission. In some examples, the transmission manager 1340 may be configured as or otherwise support a means for communicating with the second wireless device via the additional transmission on the sidelink communication link in accordance with the downlink transmission.

In some examples, the RRC receiving manager 1345 may be configured as or otherwise support a means for receiving a RRC message that indicates the set of sidelink resources of the sidelink communication link which are dedicated for transmission of uplink control information or reception of downlink control information.

In some examples, the control message receiving manager 1360 may be configured as or otherwise support a means for receiving a control message indicating a set of resources for receiving the downlink transmission. In some examples, the sidelink monitoring manager 1365 may be configured as or otherwise support a means for monitoring the set of resources based on the control message, where receiving the downlink transmission is based on the monitoring.

In some examples, the identifier manager 1370 may be configured as or otherwise support a means for determining that the first wireless device is associated with an identifier. In some examples, the identifier manager 1370 may be configured as or otherwise support a means for determining that the downlink transmission is addressed to the first wireless device via the identifier.

In some examples, the downlink receiving manager 1335 may be configured as or otherwise support a means for receiving a cyclic redundancy portion of the downlink transmission which is scrambled by the identifier. In some examples, the demodulation manager 1375 may be configured as or otherwise support a means for demodulating the cyclic redundancy portion of the downlink transmission based on the identifier, where generating the uplink transmission is based on demodulating the cyclic redundancy portion.

In some examples, the downlink receiving manager 1335 may be configured as or otherwise support a means for receiving an indication of the identifier via the downlink transmission. In some examples, the identifier includes a sidelink reception identifier, a UE identifier assigned by the second wireless device, or both. In some examples, the identifier is associated with a reception opportunity for downlink transmissions which is monitored by the first wireless device.

In some examples, the control message receiving manager 1360 may be configured as or otherwise support a means for receiving, from the second wireless device, a control message allocating a set of resources for a set of multiple transmissions between the first wireless device and the second wireless device. In some examples, the downlink receiving manager 1335 may be configured as or otherwise support a means for receiving, via the downlink transmission, an indication to perform at least a subset of the set of multiple transmissions, where generating the uplink transmission is based on receiving the indication.

In some examples, the downlink transmission is received in a first transmission time interval, and the downlink receiving manager 1335 may be configured as or otherwise support a means for receiving, via the downlink transmission, an indication of a format associated with one or more transmission time intervals subsequent to the first transmission time interval, where generating the uplink transmission is based on the indication.

In some examples, the control message receiving manager 1360 may be configured as or otherwise support a means for receiving a control message indicating a format associated with one or more transmission time intervals associated with the sidelink communication link. In some examples, the sidelink monitoring manager 1365 may be configured as or otherwise support a means for monitoring the sidelink communication link based on the format associated with the one or more transmission time intervals, where the downlink transmission is received based on the monitoring.

In some examples, the downlink transmission spans a set of symbols of the set of sidelink resources in a time domain, and a set of PRBs of the set of sidelink resources in a frequency domain. In some examples, the downlink transmission spans a slot of the set of sidelink resources in a time domain, and a set of PRBs of the set of sidelink resources in a frequency domain. In some examples, the downlink transmission is associated with a set of multiple OCCs. In some examples, generating the additional transmission is based on an OCC of the set of multiple OCCs being associated with the first wireless device.

In some examples, the downlink transmission is multiplexed with a sidelink shared channel transmission. In some examples, the downlink transmission includes an indication that the downlink transmission is multiplexed with the sidelink shared channel transmission. In some examples, the downlink transmission includes a common downlink transmission which is transmitted by the second wireless device to a set of wireless devices including the first wireless device.

In some examples, the downlink transmission includes a first format associated with downlink control information messages, a second format associated with downlink control information messages, a third format associated with downlink control information messages, or any combination thereof. In some examples, the downlink transmission includes a downlink control information message. In some examples, the additional transmission includes an uplink control information message, an uplink data message, a downlink data message, or any combination thereof.

Figure 14:
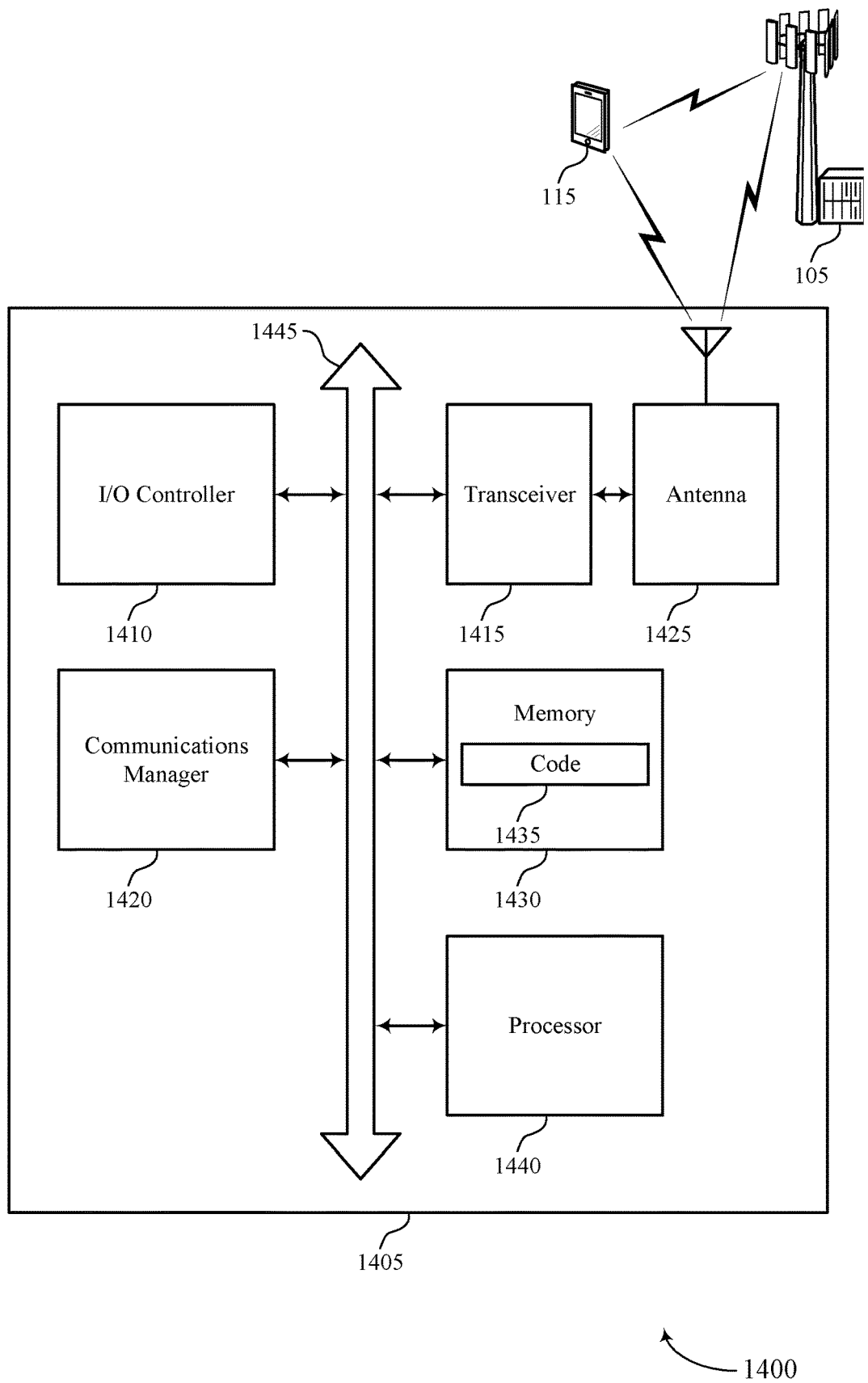
FIG. 14 shows a diagram of a system including a device that supports techniques for sidelink control signaling in accordance with aspects of the present disclosure.

FIG. 14 shows a diagram of a system 1400 including a device 1405 that supports techniques for sidelink control signaling in accordance with aspects of the present disclosure. The device 1405 may be an example of or include the components of a device 1105, a device 1205, or a UE 115 as described herein. The device 1405 may communicate wirelessly with one or more base stations 105, UEs 115, or any combination thereof. The device 1405 may include components for bi-directional voice and data communications including components for transmitting and receiving communications, such as a communications manager 1420, an input/output (I/O) controller 1410, a transceiver 1415, an antenna 1425, a memory 1430, code 1435, and a processor 1440. These components may be in electronic communication or otherwise coupled (e.g., operatively, communicatively, functionally, electronically, electrically) via one or more buses (e.g., a bus 1445).

The I/O controller 1410 may manage input and output signals for the device 1405. The I/O controller 1410 may also manage peripherals not integrated into the device 1405. In some cases, the I/O controller 1410 may represent a physical connection or port to an external peripheral. In some cases, the I/O controller 1410 may utilize an operating system such as iOS®, ANDROID®, MS-DOS®, MS-WINDOWS®, OS/2®, UNIX®, LINUX®, or another known operating system. Additionally or alternatively, the I/O controller 1410 may represent or interact with a modem, a keyboard, a mouse, a touchscreen, or a similar device. In some cases, the I/O controller 1410 may be implemented as part of a processor, such as the processor 1440. In some cases, a user may interact with the device 1405 via the I/O controller 1410 or via hardware components controlled by the I/O controller 1410.

In some cases, the device 1405 may include a single antenna 1425. However, in some other cases, the device 1405 may have more than one antenna 1425, which may be capable of concurrently transmitting or receiving multiple wireless transmissions. The transceiver 1415 may communicate bi-directionally, via the one or more antennas 1425, wired, or wireless links as described herein. For example, the transceiver 1415 may represent a wireless transceiver and may communicate bi-directionally with another wireless transceiver. The transceiver 1415 may also include a modem to modulate the packets, to provide the modulated packets to one or more antennas 1425 for transmission, and to demodulate packets received from the one or more antennas 1425. The transceiver 1415, or the transceiver 1415 and one or more antennas 1425, may be an example of a transmitter 1115, a transmitter 1215, a receiver 1110, a receiver 1210, or any combination thereof or component thereof, as described herein.

The memory 1430 may include random access memory (RAM) and read-only memory (ROM). The memory 1430 may store computer-readable, computer-executable code 1435 including instructions that, when executed by the processor 1440, cause the device 1405 to perform various functions described herein. The code 1435 may be stored in a non-transitory computer-readable medium such as system memory or another type of memory. In some cases, the code 1435 may not be directly executable by the processor 1440 but may cause a computer (e.g., when compiled and executed) to perform functions described herein. In some cases, the memory 1430 may contain, among other things, a basic I/O system (BIOS) which may control basic hardware or software operation such as the interaction with peripheral components or devices.

The processor 1440 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1440 may be configured to operate a memory array using a memory controller. In some other cases, a memory controller may be integrated into the processor 1440. The processor 1440 may be configured to execute computer-readable instructions stored in a memory (e.g., the memory 1430) to cause the device 1405 to perform various functions (e.g., functions or tasks supporting techniques for sidelink control signaling). For example, the device 1405 or a component of the device 1405 may include a processor 1440 and memory 1430 coupled to the processor 1440, the processor 1440 and memory 1430 configured to perform various functions described herein.

The communications manager 1420 may support wireless communication at a first wireless device in accordance with examples as disclosed herein. For example, the communications manager 1420 may be configured as or otherwise support a means for receiving, from a second wireless device via a sidelink communication link, SCI scheduling an uplink transmission from the first wireless device to the second wireless device. The communications manager 1420 may be configured as or otherwise support a means for generating the uplink transmission based on the SCI. The communications manager 1420 may be configured as or otherwise support a means for transmitting the uplink transmission to the second wireless device via the sidelink communication link in accordance with the SCI.

Additionally or alternatively, the communications manager 1420 may support wireless communication at a first wireless device in accordance with examples as disclosed herein. For example, the communications manager 1420 may be configured as or otherwise support a means for receiving, from a second wireless device via a sidelink communication link, a downlink transmission scheduling an additional transmission between the first wireless device and the second wireless device, the downlink transmission received within a set of sidelink resources of the sidelink communication link which are dedicated for reception of downlink control information or transmission of uplink control information. The communications manager 1420 may be configured as or otherwise support a means for generating the additional transmission based on the downlink transmission. The communications manager 1420 may be configured as or otherwise support a means for communicating with the second wireless device via the additional transmission on the sidelink communication link in accordance with the downlink transmission.

By including or configuring the communications manager 1420 in accordance with examples as described herein, the device 1405 may support techniques for scheduling sidelink-related transmissions to be scheduled via SCI (e.g., SCI-2) and/or S-DCI even in the absence of sidelink data. In particular, techniques described herein may enable S-UCI, S-DCI, and/or PSSCH transmissions to be scheduled via SCI-2 and/or S-DCI, thereby enabling such sidelink transmissions to be scheduled via PSCCH resources, PSSCH resources, or both. By allowing for sidelink-related control information to be scheduled even in the absence of sidelink data, techniques described herein may reduce latency of sidelink communications and lead to more efficient use of sidelink resources.

In some examples, the communications manager 1420 may be configured to perform various operations (e.g., receiving, monitoring, transmitting) using or otherwise in cooperation with the transceiver 1415, the one or more antennas 1425, or any combination thereof. Although the communications manager 1420 is illustrated as a separate component, in some examples, one or more functions described with reference to the communications manager 1420 may be supported by or performed by the processor 1440, the memory 1430, the code 1435, or any combination thereof. For example, the code 1435 may include instructions executable by the processor 1440 to cause the device 1405 to perform various aspects of techniques for sidelink control signaling as described herein, or the processor 1440 and the memory 1430 may be otherwise configured to perform or support such operations.

Figure 15:
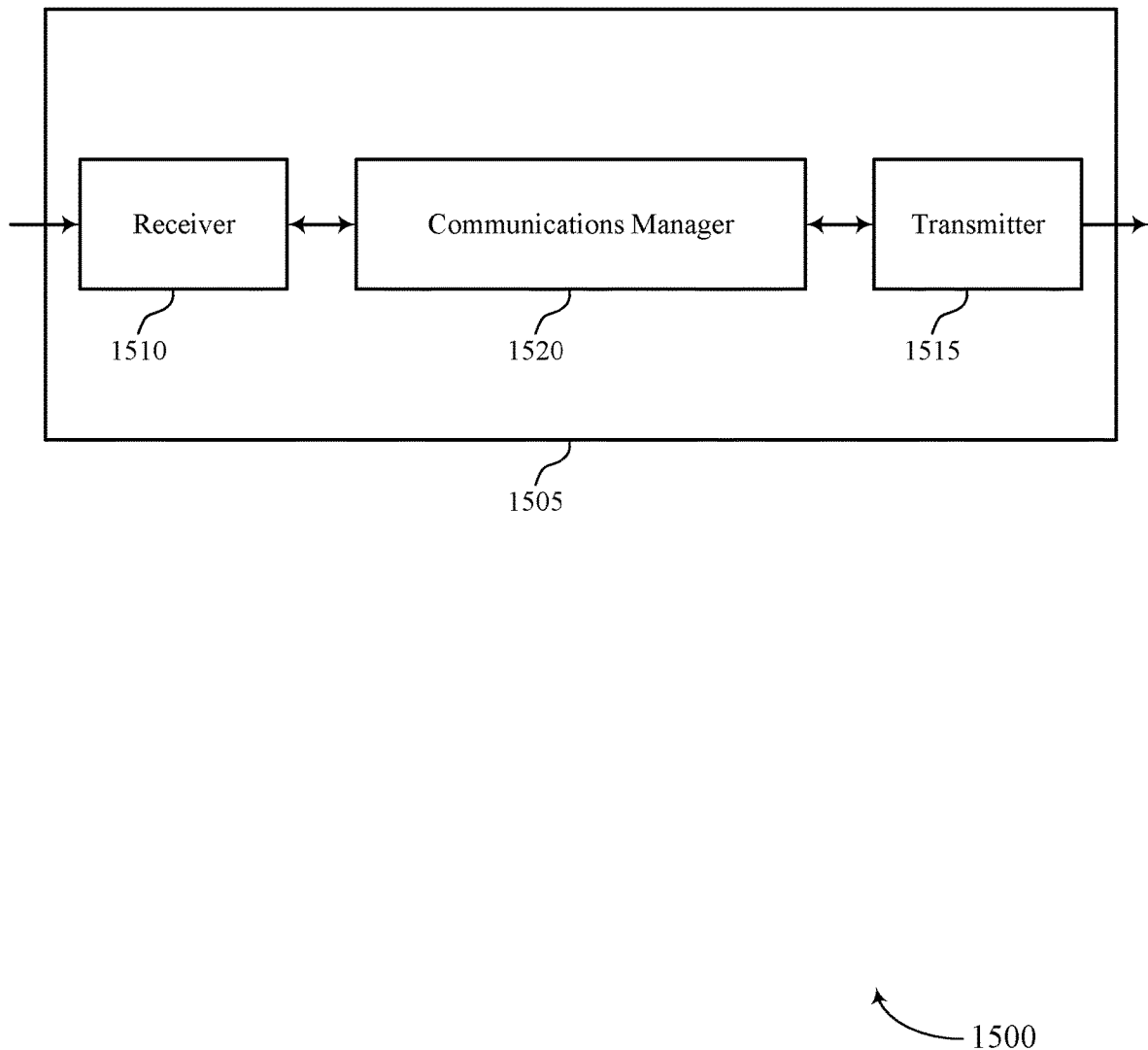
FIGS. 15 and 16 show block diagrams of devices that support techniques for sidelink control signaling in accordance with aspects of the present disclosure.

FIG. 15 shows a block diagram 1500 of a device 1505 that supports techniques for sidelink control signaling in accordance with aspects of the present disclosure. The device 1505 may be an example of aspects of a base station 105 as described herein. The device 1505 may include a receiver 1510, a transmitter 1515, and a communications manager 1520. The device 1505 may also include a processor. Each of these components may be in communication with one another (e.g., via one or more buses).

The receiver 1510 may provide a means for receiving information such as packets, user data, control information, or any combination thereof associated with various information channels (e.g., control channels, data channels, information channels related to techniques for sidelink control signaling). Information may be passed on to other components of the device 1505. The receiver 1510 may utilize a single antenna or a set of multiple antennas.

The transmitter 1515 may provide a means for transmitting signals generated by other components of the device 1505. For example, the transmitter 1515 may transmit information such as packets, user data, control information, or any combination thereof associated with various information channels (e.g., control channels, data channels, information channels related to techniques for sidelink control signaling). In some examples, the transmitter 1515 may be co-located with a receiver 1510 in a transceiver module. The transmitter 1515 may utilize a single antenna or a set of multiple antennas.

The communications manager 1520, the receiver 1510, the transmitter 1515, or various combinations thereof or various components thereof may be examples of means for performing various aspects of techniques for sidelink control signaling as described herein. For example, the communications manager 1520, the receiver 1510, the transmitter 1515, or various combinations or components thereof may support a method for performing one or more of the functions described herein.

In some examples, the communications manager 1520, the receiver 1510, the transmitter 1515, or various combinations or components thereof may be implemented in hardware (e.g., in communications management circuitry). The hardware may include a processor, a DSP, an ASIC, an FPGA or other programmable logic device, a discrete gate or transistor logic, discrete hardware components, or any combination thereof configured as or otherwise supporting a means for performing the functions described in the present disclosure. In some examples, a processor and memory coupled with the processor may be configured to perform one or more of the functions described herein (e.g., by executing, by the processor, instructions stored in the memory).

Additionally or alternatively, in some examples, the communications manager 1520, the receiver 1510, the transmitter 1515, or various combinations or components thereof may be implemented in code (e.g., as communications management software or firmware) executed by a processor. If implemented in code executed by a processor, the functions of the communications manager 1520, the receiver 1510, the transmitter 1515, or various combinations or components thereof may be performed by a general-purpose processor, a DSP, a CPU, an ASIC, an FPGA, or any combination of these or other programmable logic devices (e.g., configured as or otherwise supporting a means for performing the functions described in the present disclosure).

In some examples, the communications manager 1520 may be configured to perform various operations (e.g., receiving, monitoring, transmitting) using or otherwise in cooperation with the receiver 1510, the transmitter 1515, or both. For example, the communications manager 1520 may receive information from the receiver 1510, send information to the transmitter 1515, or be integrated in combination with the receiver 1510, the transmitter 1515, or both to receive information, transmit information, or perform various other operations as described herein.

The communications manager 1520 may support wireless communication at a second wireless device in accordance with examples as disclosed herein. For example, the communications manager 1520 may be configured as or otherwise support a means for transmitting, to a first wireless device via a sidelink communication link, SCI scheduling an uplink transmission from the first wireless device to the second wireless device. The communications manager 1520 may be configured as or otherwise support a means for receiving the uplink transmission from the first wireless device via the sidelink communication link in accordance with the SCI.

Additionally or alternatively, the communications manager 1520 may support wireless communication at a second wireless device in accordance with examples as disclosed herein. For example, the communications manager 1520 may be configured as or otherwise support a means for transmitting, to a first wireless device via a sidelink communication link, a downlink transmission scheduling an additional transmission between the first wireless device and the second wireless device, where the downlink transmission is transmitted within a set of sidelink resources of the sidelink communication link which are dedicated for transmission of downlink control information or reception of uplink control information. The communications manager 1520 may be configured as or otherwise support a means for communicating with the first wireless device via the additional transmission on the sidelink communication link in accordance with the downlink transmission.

By including or configuring the communications manager 1520 in accordance with examples as described herein, the device 1505 (e.g., a processor controlling or otherwise coupled to the receiver 1510, the transmitter 1515, the communications manager 1520, or a combination thereof) may support techniques for scheduling sidelink-related transmissions to be scheduled via SCI (e.g., SCI-2) and/or S-DCI even in the absence of sidelink data. In particular, techniques described herein may enable S-UCI, S-DCI, and/or PSSCH transmissions to be scheduled via SCI-2 and/or S-DCI, thereby enabling such sidelink transmissions to be scheduled via PSCCH resources, PSSCH resources, or both. By allowing for sidelink-related control information to be scheduled even in the absence of sidelink data, techniques described herein may reduce latency of sidelink communications and lead to more efficient use of sidelink resources.

Figure 16:
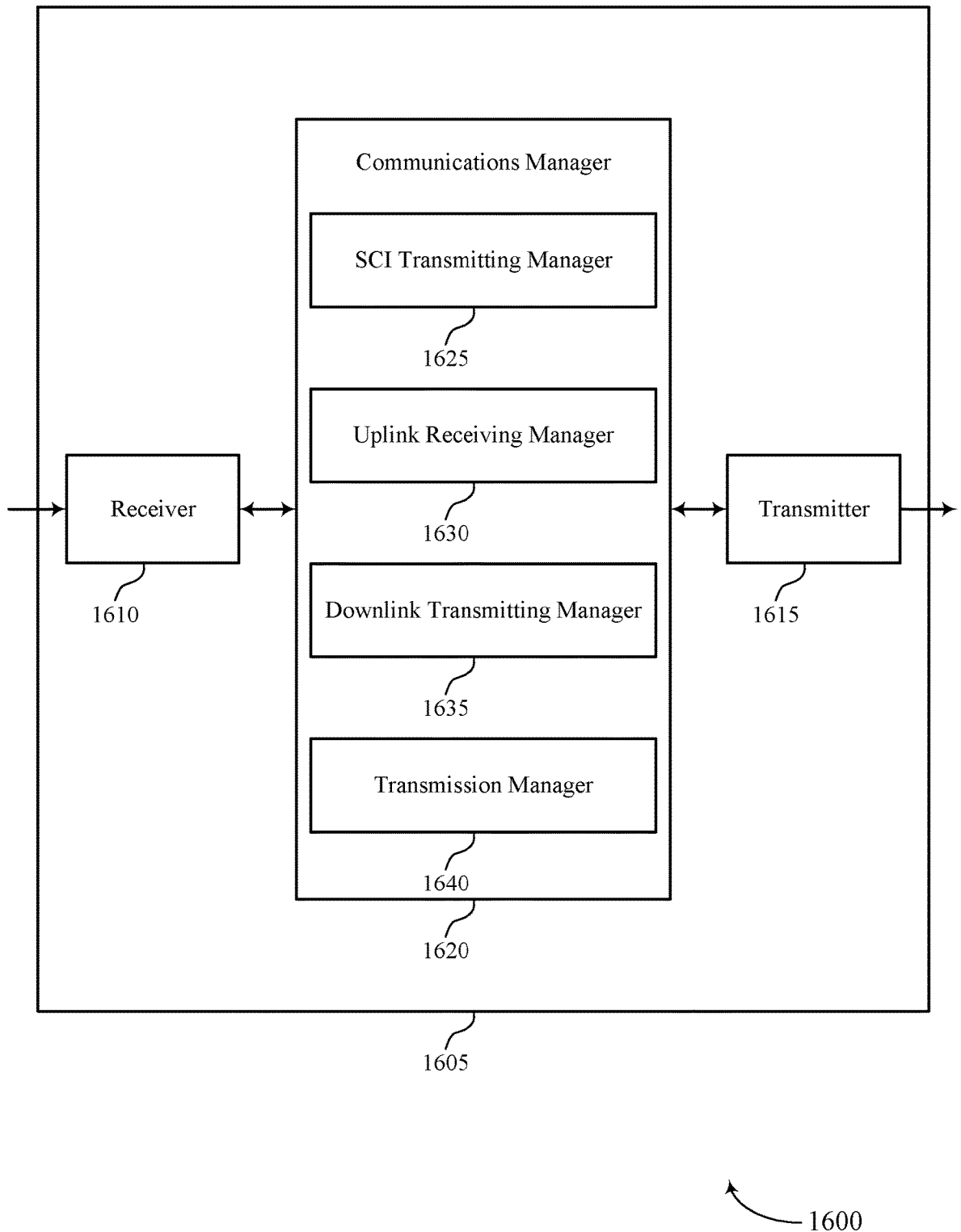

FIG. 16 shows a block diagram 1600 of a device 1605 that supports techniques for sidelink control signaling in accordance with aspects of the present disclosure. The device 1605 may be an example of aspects of a device 1505 or a base station 105 as described herein. The device 1605 may include a receiver 1610, a transmitter 1615, and a communications manager 1620. The device 1605 may also include a processor. Each of these components may be in communication with one another (e.g., via one or more buses).

The receiver 1610 may provide a means for receiving information such as packets, user data, control information, or any combination thereof associated with various information channels (e.g., control channels, data channels, information channels related to techniques for sidelink control signaling). Information may be passed on to other components of the device 1605. The receiver 1610 may utilize a single antenna or a set of multiple antennas.

The transmitter 1615 may provide a means for transmitting signals generated by other components of the device 1605. For example, the transmitter 1615 may transmit information such as packets, user data, control information, or any combination thereof associated with various information channels (e.g., control channels, data channels, information channels related to techniques for sidelink control signaling). In some examples, the transmitter 1615 may be co-located with a receiver 1610 in a transceiver module. The transmitter 1615 may utilize a single antenna or a set of multiple antennas.

The device 1605, or various components thereof, may be an example of means for performing various aspects of techniques for sidelink control signaling as described herein. For example, the communications manager 1620 may include an SCI transmitting manager 1625, an uplink receiving manager 1630, a downlink transmitting manager 1635, a transmission manager 1640, or any combination thereof. The communications manager 1620 may be an example of aspects of a communications manager 1520 as described herein. In some examples, the communications manager 1620, or various components thereof, may be configured to perform various operations (e.g., receiving, monitoring, transmitting) using or otherwise in cooperation with the receiver 1610, the transmitter 1615, or both. For example, the communications manager 1620 may receive information from the receiver 1610, send information to the transmitter 1615, or be integrated in combination with the receiver 1610, the transmitter 1615, or both to receive information, transmit information, or perform various other operations as described herein.

The communications manager 1620 may support wireless communication at a second wireless device in accordance with examples as disclosed herein. The SCI transmitting manager 1625 may be configured as or otherwise support a means for transmitting, to a first wireless device via a sidelink communication link, SCI scheduling an uplink transmission from the first wireless device to the second wireless device. The uplink receiving manager 1630 may be configured as or otherwise support a means for receiving the uplink transmission from the first wireless device via the sidelink communication link in accordance with the SCI.

Additionally or alternatively, the communications manager 1620 may support wireless communication at a second wireless device in accordance with examples as disclosed herein. The downlink transmitting manager 1635 may be configured as or otherwise support a means for transmitting, to a first wireless device via a sidelink communication link, a downlink transmission scheduling an additional transmission between the first wireless device and the second wireless device, where the downlink transmission is transmitted within a set of sidelink resources of the sidelink communication link which are dedicated for transmission of downlink control information or reception of uplink control information. The transmission manager 1640 may be configured as or otherwise support a means for communicating with the first wireless device via the additional transmission on the sidelink communication link in accordance with the downlink transmission.

Figure 17:
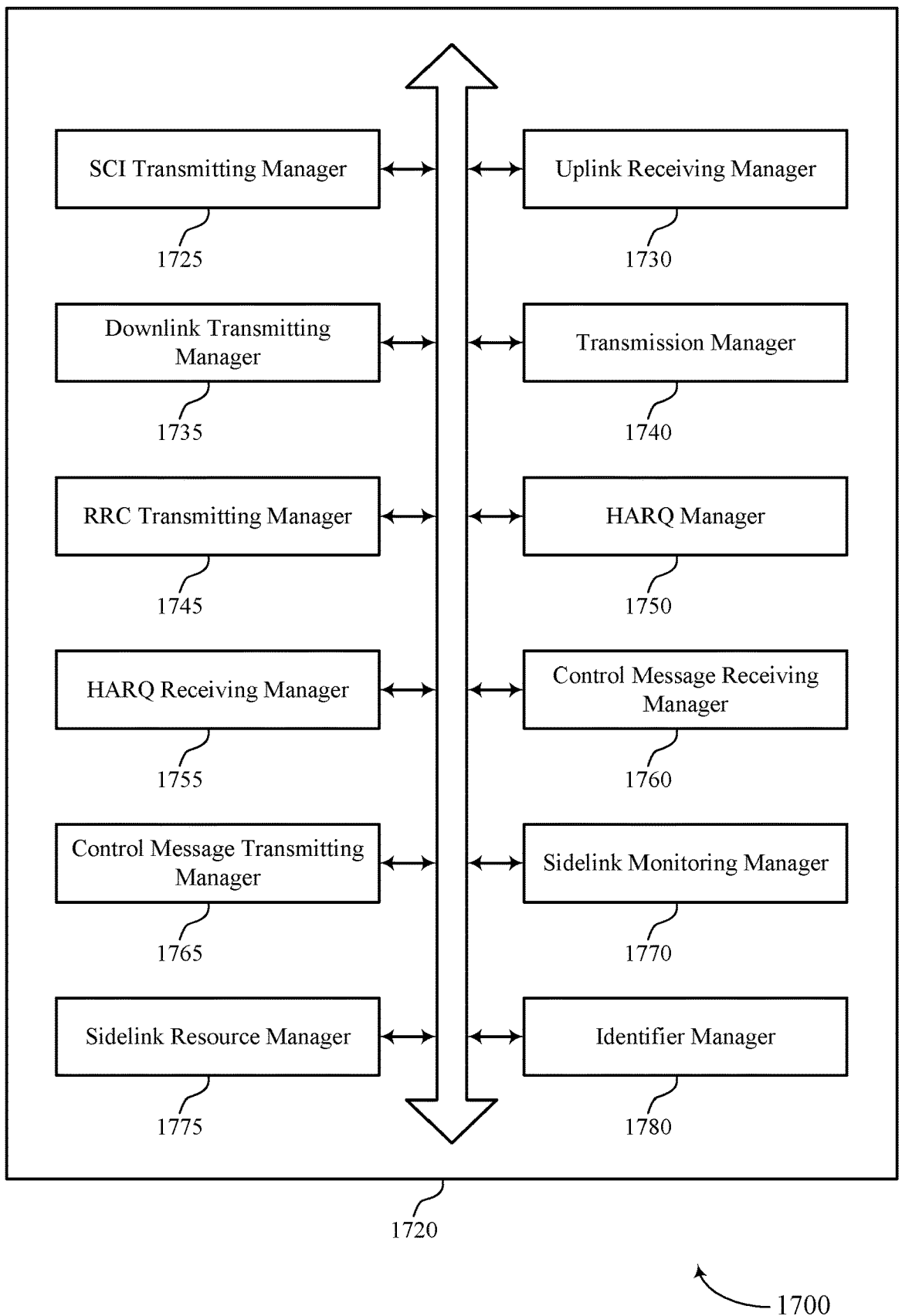
FIG. 17 shows a block diagram of a communications manager that supports techniques for sidelink control signaling in accordance with aspects of the present disclosure.

FIG. 17 shows a block diagram 1700 of a communications manager 1720 that supports techniques for sidelink control signaling in accordance with aspects of the present disclosure. The communications manager 1720 may be an example of aspects of a communications manager 1520, a communications manager 1620, or both, as described herein. The communications manager 1720, or various components thereof, may be an example of means for performing various aspects of techniques for sidelink control signaling as described herein. For example, the communications manager 1720 may include an SCI transmitting manager 1725, an uplink receiving manager 1730, a downlink transmitting manager 1735, a transmission manager 1740, an RRC transmitting manager 1745, an HARQ manager 1750, an HARQ receiving manager 1755, a control message receiving manager 1760, a control message transmitting manager 1765, a sidelink monitoring manager 1770, a sidelink resource manager 1775, an identifier manager 1780, or any combination thereof. Each of these components may communicate, directly or indirectly, with one another (e.g., via one or more buses).

The communications manager 1720 may support wireless communication at a second wireless device in accordance with examples as disclosed herein. The SCI transmitting manager 1725 may be configured as or otherwise support a means for transmitting, to a first wireless device via a sidelink communication link, SCI scheduling an uplink transmission from the first wireless device to the second wireless device. The uplink receiving manager 1730 may be configured as or otherwise support a means for receiving the uplink transmission from the first wireless device via the sidelink communication link in accordance with the SCI.

In some examples, the RRC transmitting manager 1745 may be configured as or otherwise support a means for transmitting, to the first wireless device, a RRC message that indicates a set of sidelink resources of the sidelink communication link which are dedicated for reception of uplink control information or transmission of downlink control information, where the uplink transmission is received via at least a portion of the set of sidelink resources.

In some examples, the SCI transmitting manager 1725 may be configured as or otherwise support a means for transmitting, via the SCI, an indication of a subset of the set of sidelink resources to be used for transmitting the uplink transmission. In some examples, the set of sidelink resources which are dedicated for transmission of uplink control information or reception of downlink control information span a first quantity of PRBs at a first boundary of a sidelink BWP. In some examples, the first quantity of PRBs span less than a full subchannel in a frequency domain.

In some examples, the set of sidelink resources which are dedicated for transmission of uplink control information or reception of downlink control information span a second quantity of PRBs at an additional boundary of the sidelink BWP, the additional boundary opposite the first boundary in a frequency domain with respect to the sidelink BWP. In some examples, the set of sidelink resources which are dedicated for transmission of uplink control information or reception of downlink control information span a second quantity of PRBs. In some examples, the first quantity of PRBs and the second quantity of PRBs are separated by at least one subchannel in a frequency domain.

In some examples, the RRC transmitting manager 1745 may be configured as or otherwise support a means for transmitting an additional RRC message that indicates a sidelink BWP configured for sidelink communications, where the RRC message which indicates the set of sidelink resources which are dedicated for transmission of uplink control information or reception of downlink control information reclaims the set of sidelink resources from the sidelink BWP.

In some examples, the SCI transmitting manager 1725 may be configured as or otherwise support a means for transmitting, via the SCI, an indication of a set of sidelink resources to be used for transmitting the uplink transmission, where the uplink transmission is received via at least a portion of the set of sidelink resources.

In some examples, the indication of the set of sidelink resources is included in one or more bit fields associated with an allocation of time resources, one or more bit fields associated with an allocation of frequency resources, or both.

In some examples, the SCI transmitting manager 1725 may be configured as or otherwise support a means for transmitting, via the SCI, one or more bit field values associated with enabling or disabling CSI reporting. In some examples, the uplink receiving manager 1730 may be configured as or otherwise support a means for receiving, via the uplink transmission, a CSI report associated with the sidelink communication link based on a value of the one or more bit field values.

In some examples, the RRC transmitting manager 1745 may be configured as or otherwise support a means for transmitting, to the first wireless device, a RRC message that indicates a relationship between a first set of sidelink resources for transmitting the SCI and a second set of sidelink resources for receiving the uplink transmission, where receiving the uplink transmission is based on the relationship.

In some examples, the RRC transmitting manager 1745 may be configured as or otherwise support a means for transmitting, to the first wireless device, a RRC message including an indication of one or more parameters associated with transmission of the uplink transmission, where receiving the uplink transmission is in accordance with the one or more parameters.

In some examples, the one or more parameters include a bundling size associated with the uplink transmission, an interleaving configuration, a frequency hopping configuration, a periodicity, or any combination thereof.

In some examples, the SCI transmitting manager 1725 may be configured as or otherwise support a means for transmitting, via the SCI, an indication to transmit the uplink transmission periodically, aperiodically, semi-persistently, or any combination thereof, where the uplink transmission is transmitted in accordance with the indication.

In some examples, the SCI transmitting manager 1725 may be configured as or otherwise support a means for transmitting, via the SCI, an indication of a time interval between transmission of the SCI and reception of the uplink transmission, where receiving the uplink transmission is in accordance with the time interval. In some examples, the SCI transmitting manager 1725 may be configured as or otherwise support a means for transmitting, via the SCI, an indication of a format to be used for the uplink transmission, where the uplink transmission is generated based on the format.

In some examples, the format includes one or more fields for indicating a frequency hopping configuration, a repetition configuration, an OCC, or any combination thereof. In some examples, the uplink transmission includes an uplink control information message, an uplink data message, or both. In some examples, the SCI is transmitted via a sidelink shared channel of the sidelink communication link.

In some examples, the SCI transmitting manager 1725 may be configured as or otherwise support a means for transmitting additional SCI to the first wireless device via a sidelink control channel of the sidelink communication link, where transmitting the SCI is based on transmitting the additional SCI. In some examples, the additional SCI is in a first SCI format. In some examples, the SCI is in a second SCI format different from the first SCI format.

In some examples, the HARQ manager 1750 may be configured as or otherwise support a means for identifying that the first wireless device is configured to transmit a HARQ message to the second wireless device via a sidelink feedback channel of the sidelink communication link. In some examples, the HARQ receiving manager 1755 may be configured as or otherwise support a means for receiving the HARQ message multiplexed with the uplink transmission without receiving the HARQ message via the sidelink feedback channel.

In some examples, the HARQ manager 1750 may be configured as or otherwise support a means for identifying that a payload size of the HARQ message is less than or equal to a threshold payload size, where receiving the HARQ message multiplexed with the uplink transmission is based on identifying that the payload size is less than or equal to the threshold payload size.

In some examples, the HARQ manager 1750 may be configured as or otherwise support a means for identifying the payload size of the HARQ message based on a periodicity of transmissions performed via the sidelink feedback channel.

In some examples, the HARQ manager 1750 may be configured as or otherwise support a means for identifying that the first wireless device is configured to transmit a HARQ message to the second wireless device via a sidelink feedback channel of the sidelink communication link. In some examples, the HARQ receiving manager 1755 may be configured as or otherwise support a means for receiving at least a first portion of the HARQ message from the first wireless device via the sidelink feedback channel of the sidelink communication link, where the uplink transmission is received on a channel which is different from the sidelink feedback channel.

In some examples, the HARQ receiving manager 1755 may be configured as or otherwise support a means for receiving at least a second portion of the HARQ message from the first wireless device via the uplink transmission. In some examples, reception of the uplink transmission at least partially overlaps with the sidelink feedback channel. In some examples, the sidelink feedback channel punctures the uplink transmission.

In some examples, the control message receiving manager 1760 may be configured as or otherwise support a means for receiving, from a third wireless device, a control message indicating a set of sidelink resources to be used for the sidelink communication link. In some examples, the control message transmitting manager 1765 may be configured as or otherwise support a means for transmitting, to the first wireless device, an indication of at least a subset of the set of sidelink resources which are to be used for transmission of the uplink transmission based on receiving the control message, where the uplink transmission is received within the at least the subset of the set of sidelink resources.

In some examples, the sidelink monitoring manager 1770 may be configured as or otherwise support a means for monitoring the sidelink communication link. In some examples, the sidelink resource manager 1775 may be configured as or otherwise support a means for determining a set of sidelink resources to be used for the sidelink communication link based on the monitoring. In some examples, the control message transmitting manager 1765 may be configured as or otherwise support a means for transmitting, to the first wireless device, an indication of at least a subset of the set of sidelink resources which are to be used for transmission of the uplink transmission based on the determining, where the uplink transmission is received within the at least the subset of the set of sidelink resources.

Additionally or alternatively, the communications manager 1720 may support wireless communication at a second wireless device in accordance with examples as disclosed herein. The downlink transmitting manager 1735 may be configured as or otherwise support a means for transmitting, to a first wireless device via a sidelink communication link, a downlink transmission scheduling an additional transmission between the first wireless device and the second wireless device, where the downlink transmission is transmitted within a set of sidelink resources of the sidelink communication link which are dedicated for transmission of downlink control information or reception of uplink control information. The transmission manager 1740 may be configured as or otherwise support a means for communicating with the first wireless device via the additional transmission on the sidelink communication link in accordance with the downlink transmission.

In some examples, the RRC transmitting manager 1745 may be configured as or otherwise support a means for transmitting a RRC message that indicates the set of sidelink resources of the sidelink communication link which are dedicated for transmission of uplink control information or reception of downlink control information.

In some examples, the control message transmitting manager 1765 may be configured as or otherwise support a means for transmitting a control message indicating a set of resources for transmitting the downlink transmission, where the downlink transmission is transmitted within the set of resources.

In some examples, the identifier manager 1780 may be configured as or otherwise support a means for determining that the first wireless device is associated with an identifier. In some examples, the identifier manager 1780 may be configured as or otherwise support a means for determining that the downlink transmission is addressed to the first wireless device via the identifier.

In some examples, the downlink transmitting manager 1735 may be configured as or otherwise support a means for transmitting a cyclic redundancy portion of the downlink transmission which is scrambled by the identifier.

In some examples, the downlink transmitting manager 1735 may be configured as or otherwise support a means for transmitting an indication of the identifier via the downlink transmission. In some examples, the identifier includes a sidelink reception identifier, a UE identifier assigned by the second wireless device, or both. In some examples, the identifier is associated with a reception opportunity for downlink transmissions which is monitored by the first wireless device.

In some examples, the control message transmitting manager 1765 may be configured as or otherwise support a means for transmitting, to the first wireless device, a control message allocating a set of resources for a set of multiple transmissions between the first wireless device and the second wireless device. In some examples, the downlink transmitting manager 1735 may be configured as or otherwise support a means for transmitting, via the downlink transmission, an indication to perform at least a subset of the set of multiple transmissions.

In some examples, the downlink transmission is transmitted in a first transmission time interval, and the downlink transmitting manager 1735 may be configured as or otherwise support a means for transmitting, via the downlink transmission, an indication of a format associated with one or more transmission time intervals subsequent to the first transmission time interval.

In some examples, the control message transmitting manager 1765 may be configured as or otherwise support a means for transmitting a control message indicating a format associated with one or more transmission time intervals associated with the sidelink communication link, where the downlink transmission is transmitted in accordance with the format associated with the one or more transmission time intervals.

In some examples, the downlink transmission spans a set of symbols of the set of sidelink resources in a time domain, and a set of PRBs of the set of sidelink resources in a frequency domain.

In some examples, the downlink transmission spans a slot of the set of sidelink resources in a time domain, and a set of PRBs of the set of sidelink resources in a frequency domain.

In some examples, the downlink transmission is associated with a set of multiple OCCs including an OCC associated with the first wireless device. In some examples, the downlink transmission is multiplexed with a sidelink shared channel transmission. In some examples, the downlink transmission includes an indication that the downlink transmission is multiplexed with the sidelink shared channel transmission. In some examples, the downlink transmission includes a common downlink transmission which is transmitted by the second wireless device to a set of wireless devices including the first wireless device.

In some examples, the downlink transmission includes a first format associated with downlink control information messages, a second format associated with downlink control information messages, a third format associated with downlink control information messages, or any combination thereof. In some examples, the downlink transmission includes a downlink control information message. In some examples, the additional transmission includes an uplink control information message, an uplink data message, a downlink data message, or any combination thereof.

Figure 18:
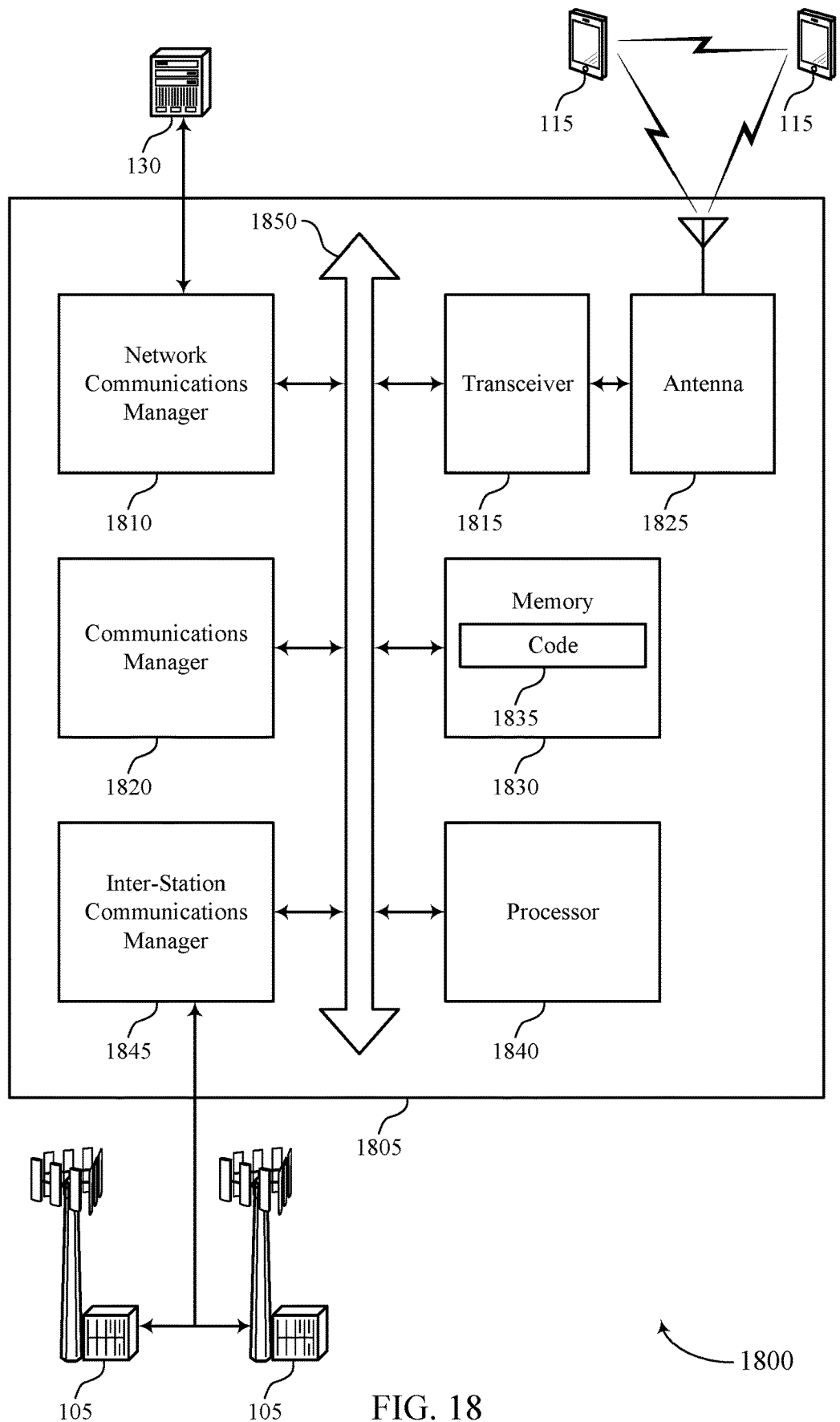
FIG. 18 shows a diagram of a system including a device that supports techniques for sidelink control signaling in accordance with aspects of the present disclosure.

FIG. 18 shows a diagram of a system 1800 including a device 1805 that supports techniques for sidelink control signaling in accordance with aspects of the present disclosure. The device 1805 may be an example of or include the components of a device 1505, a device 1605, or a base station 105 as described herein. The device 1805 may communicate wirelessly with one or more base stations 105, UEs 115, or any combination thereof. The device 1805 may include components for bi-directional voice and data communications including components for transmitting and receiving communications, such as a communications manager 1820, a network communications manager 1810, a transceiver 1815, an antenna 1825, a memory 1830, code 1835, a processor 1840, and an inter-station communications manager 1845. These components may be in electronic communication or otherwise coupled (e.g., operatively, communicatively, functionally, electronically, electrically) via one or more buses (e.g., a bus 1850).

The network communications manager 1810 may manage communications with a core network 130 (e.g., via one or more wired backhaul links). For example, the network communications manager 1810 may manage the transfer of data communications for client devices, such as one or more UEs 115.

In some cases, the device 1805 may include a single antenna 1825. However, in some other cases the device 1805 may have more than one antenna 1825, which may be capable of concurrently transmitting or receiving multiple wireless transmissions. The transceiver 1815 may communicate bi-directionally, via the one or more antennas 1825, wired, or wireless links as described herein. For example, the transceiver 1815 may represent a wireless transceiver and may communicate bi-directionally with another wireless transceiver. The transceiver 1815 may also include a modem to modulate the packets, to provide the modulated packets to one or more antennas 1825 for transmission, and to demodulate packets received from the one or more antennas 1825. The transceiver 1815, or the transceiver 1815 and one or more antennas 1825, may be an example of a transmitter 1515, a transmitter 1615, a receiver 1510, a receiver 1610, or any combination thereof or component thereof, as described herein.

The memory 1830 may include RAM and ROM. The memory 1830 may store computer-readable, computer-executable code 1835 including instructions that, when executed by the processor 1840, cause the device 1805 to perform various functions described herein. The code 1835 may be stored in a non-transitory computer-readable medium such as system memory or another type of memory. In some cases, the code 1835 may not be directly executable by the processor 1840 but may cause a computer (e.g., when compiled and executed) to perform functions described herein. In some cases, the memory 1830 may contain, among other things, a BIOS which may control basic hardware or software operation such as the interaction with peripheral components or devices.

The processor 1840 may include an intelligent hardware device (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1840 may be configured to operate a memory array using a memory controller. In some other cases, a memory controller may be integrated into the processor 1840. The processor 1840 may be configured to execute computer-readable instructions stored in a memory (e.g., the memory 1830) to cause the device 1805 to perform various functions (e.g., functions or tasks supporting techniques for sidelink control signaling). For example, the device 1805 or a component of the device 1805 may include a processor 1840 and memory 1830 coupled to the processor 1840, the processor 1840 and memory 1830 configured to perform various functions described herein.

The inter-station communications manager 1845 may manage communications with other base stations 105, and may include a controller or scheduler for controlling communications with UEs 115 in cooperation with other base stations 105. For example, the inter-station communications manager 1845 may coordinate scheduling for transmissions to UEs 115 for various interference mitigation techniques such as beamforming or joint transmission. In some examples, the inter-station communications manager 1845 may provide an X2 interface within an LTE/LTE-A wireless communications network technology to provide communication between base stations 105.

The communications manager 1820 may support wireless communication at a second wireless device in accordance with examples as disclosed herein. For example, the communications manager 1820 may be configured as or otherwise support a means for transmitting, to a first wireless device via a sidelink communication link, SCI scheduling an uplink transmission from the first wireless device to the second wireless device. The communications manager 1820 may be configured as or otherwise support a means for receiving the uplink transmission from the first wireless device via the sidelink communication link in accordance with the SCI.

Additionally or alternatively, the communications manager 1820 may support wireless communication at a second wireless device in accordance with examples as disclosed herein. For example, the communications manager 1820 may be configured as or otherwise support a means for transmitting, to a first wireless device via a sidelink communication link, a downlink transmission scheduling an additional transmission between the first wireless device and the second wireless device, where the downlink transmission is transmitted within a set of sidelink resources of the sidelink communication link which are dedicated for transmission of downlink control information or reception of uplink control information. The communications manager 1820 may be configured as or otherwise support a means for communicating with the first wireless device via the additional transmission on the sidelink communication link in accordance with the downlink transmission.

By including or configuring the communications manager 1820 in accordance with examples as described herein, the device 1805 may support techniques for scheduling sidelink-related transmissions to be scheduled via SCI (e.g., SCI-2) and/or S-DCI even in the absence of sidelink data. In particular, techniques described herein may enable S-UCI, S-DCI, and/or PSSCH transmissions to be scheduled via SCI-2 and/or S-DCI, thereby enabling such sidelink transmissions to be scheduled via PSCCH resources, PSSCH resources, or both. By allowing for sidelink-related control information to be scheduled even in the absence of sidelink data, techniques described herein may reduce latency of sidelink communications and lead to more efficient use of sidelink resources.

In some examples, the communications manager 1820 may be configured to perform various operations (e.g., receiving, monitoring, transmitting) using or otherwise in cooperation with the transceiver 1815, the one or more antennas 1825, or any combination thereof. Although the communications manager 1820 is illustrated as a separate component, in some examples, one or more functions described with reference to the communications manager 1820 may be supported by or performed by the processor 1840, the memory 1830, the code 1835, or any combination thereof. For example, the code 1835 may include instructions executable by the processor 1840 to cause the device 1805 to perform various aspects of techniques for sidelink control signaling as described herein, or the processor 1840 and the memory 1830 may be otherwise configured to perform or support such operations.

Figure 19:
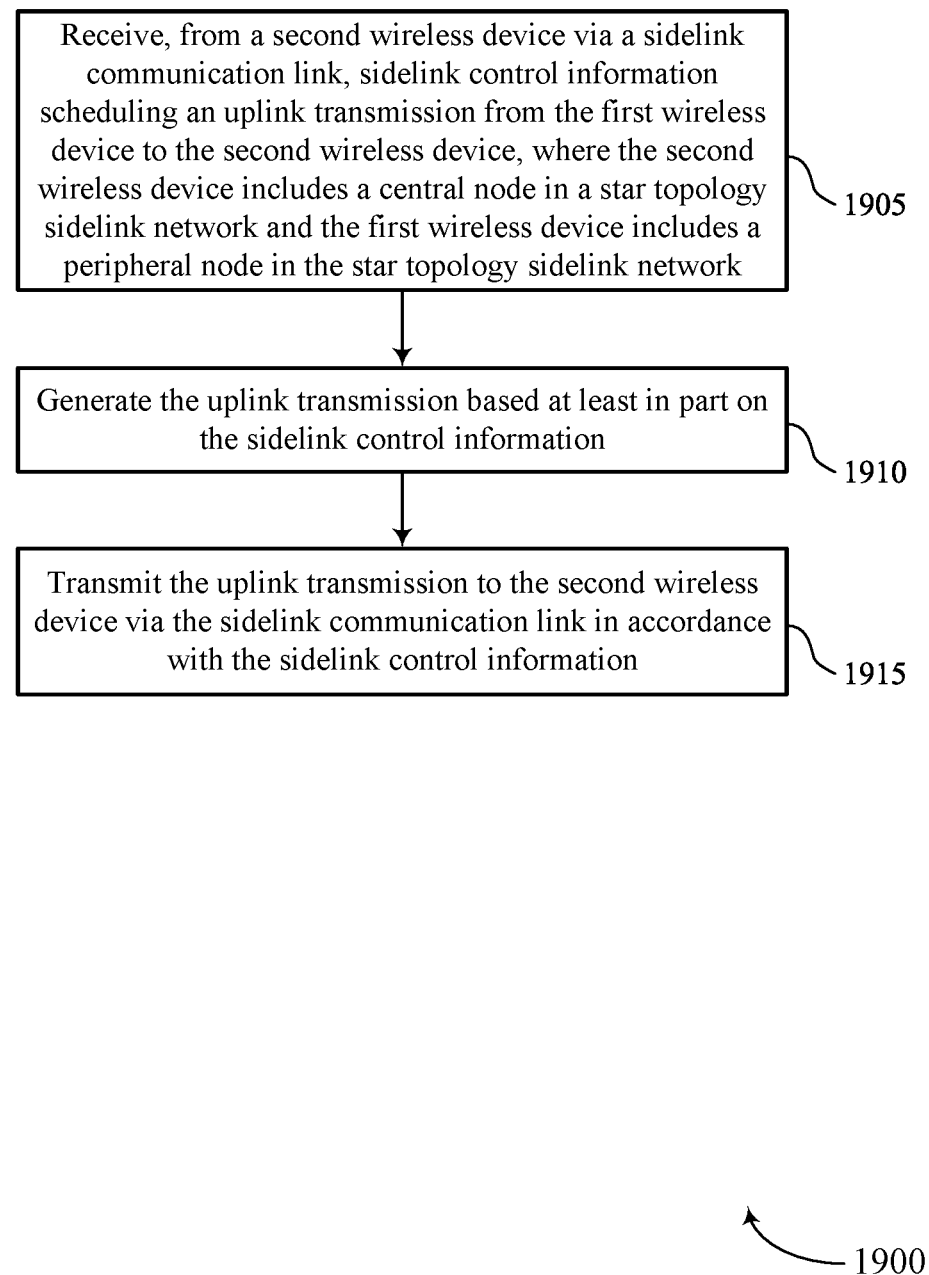
FIGS. 19 through 22 show flowcharts illustrating methods that support techniques for sidelink control signaling in accordance with aspects of the present disclosure.

FIG. 19 shows a flowchart illustrating a method 1900 that supports techniques for sidelink control signaling in accordance with aspects of the present disclosure. The operations of the method 1900 may be implemented by a UE or its components as described herein. For example, the operations of the method 1900 may be performed by a UE 115 as described with reference to FIGS. 1 through 14. In some examples, a UE may execute a set of instructions to control the functional elements of the UE to perform the described functions. Additionally or alternatively, the UE may perform aspects of the described functions using special-purpose hardware.

At 1905, the method may include receiving, from a second wireless device via a sidelink communication link, SCI scheduling an uplink transmission from the first wireless device to the second wireless device, where the second wireless device includes a central node in a star topology sidelink network and the first wireless device includes a peripheral node in the star topology sidelink network. The operations of 1905 may be performed in accordance with examples as disclosed herein. In some examples, aspects of the operations of 1905 may be performed by an SCI receiving manager 1325 as described with reference to FIG. 13.

At 1910, the method may include generating the uplink transmission based on the SCI. The operations of 1910 may be performed in accordance with examples as disclosed herein. In some examples, aspects of the operations of 1910 may be performed by an uplink transmission manager 1330 as described with reference to FIG. 13.

At 1915, the method may include transmitting the uplink transmission to the second wireless device via the sidelink communication link in accordance with the SCI. The operations of 1915 may be performed in accordance with examples as disclosed herein. In some examples, aspects of the operations of 1915 may be performed by an uplink transmission manager 1330 as described with reference to FIG. 13.

Figure 20:
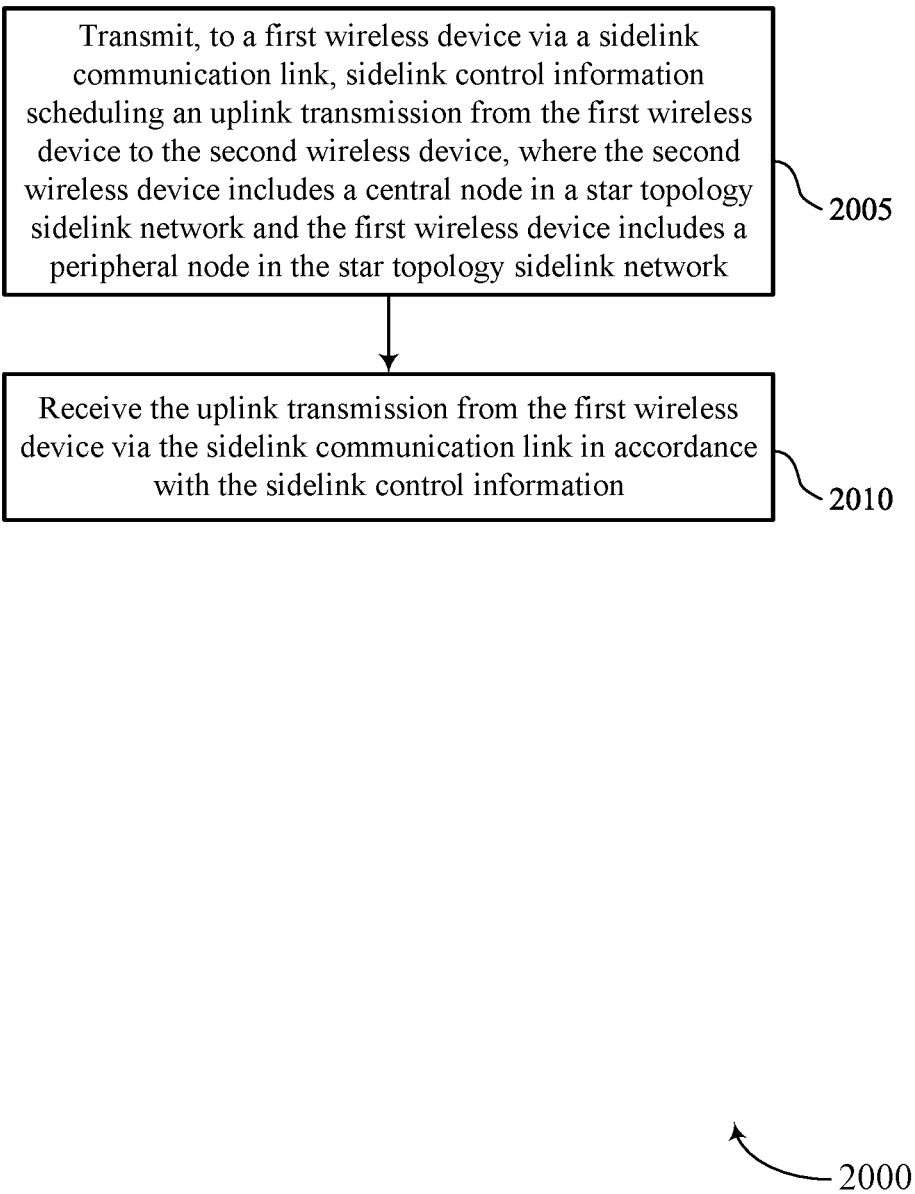

FIG. 20 shows a flowchart illustrating a method 2000 that supports techniques for sidelink control signaling in accordance with aspects of the present disclosure. The operations of the method 2000 may be implemented by a base station or its components as described herein. For example, the operations of the method 2000 may be performed by a base station 105 as described with reference to FIGS. 1 through 10 and 15 through 18. In some examples, a base station may execute a set of instructions to control the functional elements of the base station to perform the described functions. Additionally or alternatively, the base station may perform aspects of the described functions using special-purpose hardware.

At 2005, the method may include transmitting, to a first wireless device via a sidelink communication link, SCI scheduling an uplink transmission from the first wireless device to the second wireless device, where the second wireless device includes a central node in a star topology sidelink network and the first wireless device includes a peripheral node in the star topology sidelink network. The operations of 2005 may be performed in accordance with examples as disclosed herein. In some examples, aspects of the operations of 2005 may be performed by an SCI transmitting manager 1725 as described with reference to FIG. 17.

At 2010, the method may include receiving the uplink transmission from the first wireless device via the sidelink communication link in accordance with the SCI. The operations of 2010 may be performed in accordance with examples as disclosed herein. In some examples, aspects of the operations of 2010 may be performed by an uplink receiving manager 1730 as described with reference to FIG. 17.

Figure 21:
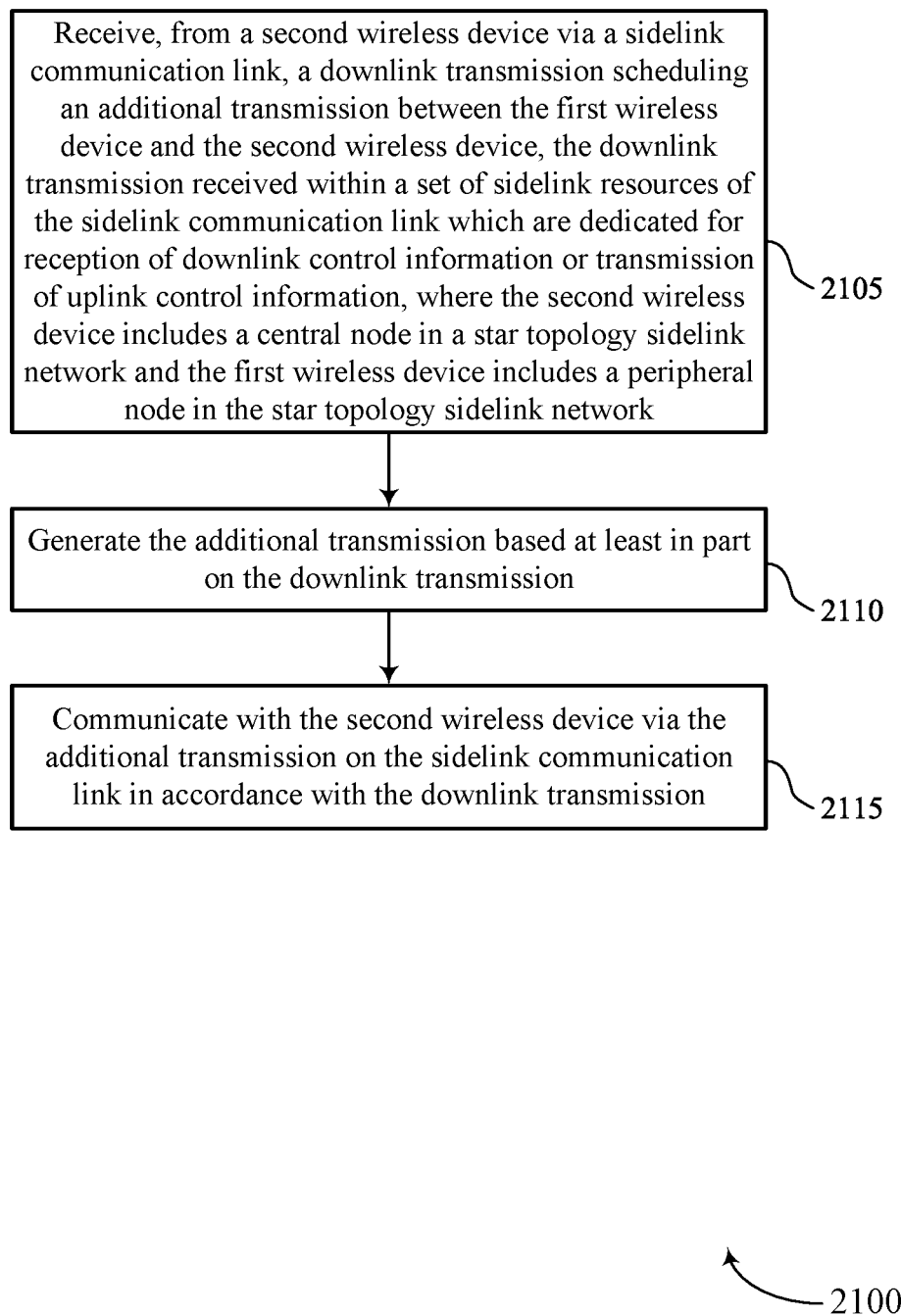

FIG. 21 shows a flowchart illustrating a method 2100 that supports techniques for sidelink control signaling in accordance with aspects of the present disclosure. The operations of the method 2100 may be implemented by a UE or its components as described herein. For example, the operations of the method 2100 may be performed by a UE 115 as described with reference to FIGS. 1 through 14. In some examples, a UE may execute a set of instructions to control the functional elements of the UE to perform the described functions. Additionally or alternatively, the UE may perform aspects of the described functions using special-purpose hardware.

At 2105, the method may include receiving, from a second wireless device via a sidelink communication link, a downlink transmission scheduling an additional transmission between the first wireless device and the second wireless device, the downlink transmission received within a set of sidelink resources of the sidelink communication link which are dedicated for reception of downlink control information or transmission of uplink control information, where the second wireless device includes a central node in a star topology sidelink network and the first wireless device includes a peripheral node in the star topology sidelink network. The operations of 2105 may be performed in accordance with examples as disclosed herein. In some examples, aspects of the operations of 2105 may be performed by a downlink receiving manager 1335 as described with reference to FIG. 13.

At 2110, the method may include generating the additional transmission based on the downlink transmission. The operations of 2110 may be performed in accordance with examples as disclosed herein. In some examples, aspects of the operations of 2110 may be performed by a transmission manager 1340 as described with reference to FIG. 13.

At 2115, the method may include communicating with the second wireless device via the additional transmission on the sidelink communication link in accordance with the downlink transmission. The operations of 2115 may be performed in accordance with examples as disclosed herein. In some examples, aspects of the operations of 2115 may be performed by a transmission manager 1340 as described with reference to FIG. 13.

Figure 22:
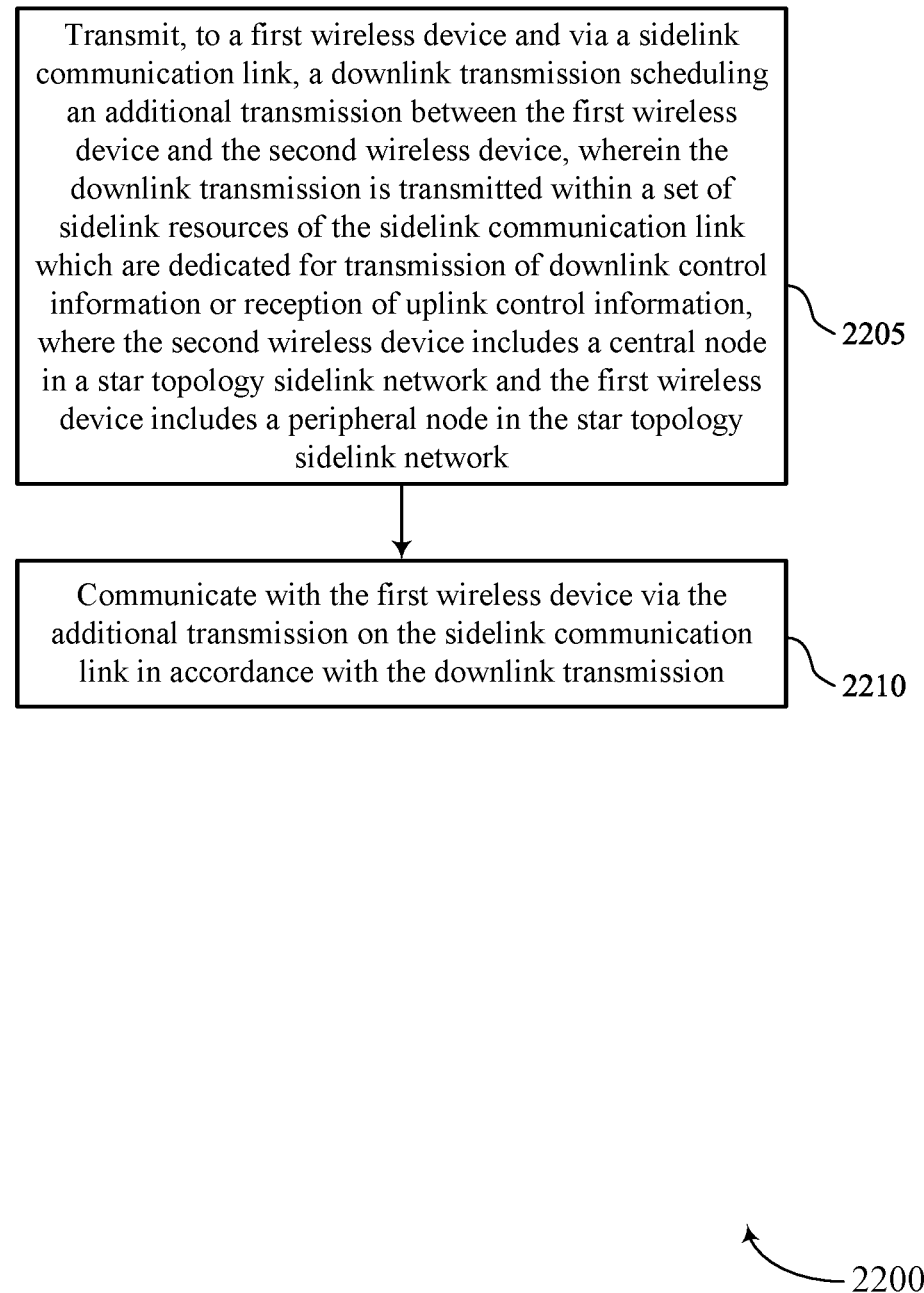

FIG. 22 shows a flowchart illustrating a method 2200 that supports techniques for sidelink control signaling in accordance with aspects of the present disclosure. The operations of the method 2200 may be implemented by a base station or its components as described herein. For example, the operations of the method 2200 may be performed by a base station 105 as described with reference to FIGS. 1 through 10 and 15 through 18. In some examples, a base station may execute a set of instructions to control the functional elements of the base station to perform the described functions. Additionally or alternatively, the base station may perform aspects of the described functions using special-purpose hardware.

At 2205, the method may include transmitting, to a first wireless device via a sidelink communication link, a downlink transmission scheduling an additional transmission between the first wireless device and the second wireless device, where the downlink transmission is transmitted within a set of sidelink resources of the sidelink communication link which are dedicated for transmission of downlink control information or reception of uplink control information, where the second wireless device includes a central node in a star topology sidelink network and the first wireless device includes a peripheral node in the star topology sidelink network. The operations of 2205 may be performed in accordance with examples as disclosed herein. In some examples, aspects of the operations of 2205 may be performed by a downlink transmitting manager 1735 as described with reference to FIG. 17.

At 2210, the method may include communicating with the first wireless device via the additional transmission on the sidelink communication link in accordance with the downlink transmission. The operations of 2210 may be performed in accordance with examples as disclosed herein. In some examples, aspects of the operations of 2210 may be performed by a transmission manager 1740 as described with reference to FIG. 17.

The following provides an overview of aspects of the present disclosure:

Aspect 1: A method for wireless communication at a first wireless device, comprising: receiving, from a second wireless device via a sidelink communication link, SCI scheduling an uplink transmission from the first wireless device to the second wireless device, where the second wireless device includes a central node in a star topology sidelink network and the first wireless device includes a peripheral node in the star topology sidelink network; generating the uplink transmission based at least in part on the SCI; and transmitting the uplink transmission to the second wireless device via the sidelink communication link in accordance with the SCI.

Aspect 2: The method of aspect 1, further comprising: receiving, from the second wireless device, a base station, or both, an RRC message that indicates a set of sidelink resources of the sidelink communication link which are dedicated for transmission of UCI or reception of DCI, wherein the uplink transmission is transmitted via at least a portion of the set of sidelink resources.

Aspect 3: The method of aspect 2, further comprising: receiving, via the SCI, an indication of a subset of the set of sidelink resources to be used for transmitting the uplink transmission.

Aspect 4: The method of any of aspects 2 through 3, wherein the set of sidelink resources which are dedicated for transmission of UCI or reception of DCI spans a first quantity of PRBs at a first boundary of a sidelink BWP.

Aspect 5: The method of aspect 4, wherein the first quantity of PRBs spans less than a full subchannel in a frequency domain.

Aspect 6: The method of any of aspects 4 through 5, wherein the set of sidelink resources which are dedicated for transmission of UCI or reception of DCI spans a second quantity of PRBs at an additional boundary of the sidelink BWP, the additional boundary opposite the first boundary in a frequency domain with respect to the sidelink BWP.

Aspect 7: The method of any of aspects 4 through 6, wherein the set of sidelink resources which are dedicated for transmission of UCI or reception of DCI spans a second quantity of PRBs, the first quantity of PRBs and the second quantity of PRBs are separated by at least one subchannel in a frequency domain.

Aspect 8: The method of any of aspects 2 through 7, further comprising: receiving an additional RRC message that indicates a sidelink BWP configured for sidelink communications, wherein the RRC message which indicates the set of sidelink resources which are dedicated for transmission of UCI or reception of DCI reclaims the set of sidelink resources from the sidelink BWP.

Aspect 9: The method of any of aspects 1 through 8, further comprising: receiving, via the SCI, an indication of a set of sidelink resources to be used for transmitting the uplink transmission, wherein the uplink transmission is transmitted via at least a portion of the set of sidelink resources.

Aspect 10: The method of aspect 9, wherein the indication of the set of sidelink resources is included in one or more bit fields associated with an allocation of time resources, one or more bit fields associated with an allocation of frequency resources, or both.

Aspect 11: The method of any of aspects 1 through 10, further comprising: receiving, via the SCI, one or more bit field values associated with enabling or disabling CSI reporting; and transmitting, via the uplink transmission, a CSI report associated with the sidelink communication link based at least in part on a value of the one or more bit field values.

Aspect 12: The method of any of aspects 1 through 11, further comprising: receiving an RRC message that indicates a relationship between a first set of sidelink resources for receiving the SCI and a second set of sidelink resources for transmitting the uplink transmission, wherein transmitting the uplink transmission is based at least in part on the relationship.

Aspect 13: The method of any of aspects 1 through 12, further comprising: receiving an RRC message comprising an indication of one or more parameters associated with transmission of the uplink transmission, wherein transmitting the uplink transmission is in accordance with the one or more parameters.

Aspect 14: The method of aspect 13, wherein the one or more parameters comprise a bundling size associated with the uplink transmission, an interleaving configuration, a frequency hopping configuration, a periodicity, or any combination thereof.

Aspect 15: The method of any of aspects 1 through 14, further comprising: receiving, via the SCI, an indication to transmit the uplink transmission periodically, aperiodically, semi-persistently, or any combination thereof, wherein the uplink transmission is transmitted in accordance with the indication.

Aspect 16: The method of any of aspects 1 through 15, further comprising: receiving, via the SCI, an indication of a time interval between reception of the SCI and transmission of the uplink transmission, wherein transmitting the uplink transmission is in accordance with the time interval.

Aspect 17: The method of any of aspects 1 through 16, further comprising: receiving, via the SCI, an indication of a format to be used for the uplink transmission, wherein generating the uplink transmission is based at least in part on the format.

Aspect 18: The method of aspect 17, wherein the format includes one or more fields for indicating a frequency hopping configuration, a repetition configuration, an OCC, or any combination thereof.

Aspect 19: The method of any of aspects 1 through 18, wherein the uplink transmission comprises an UCI message, an uplink data message, or both.

Aspect 20: The method of any of aspects 1 through 19, wherein the SCI is received via a sidelink shared channel of the sidelink communication link.

Aspect 21: The method of any of aspects 1 through 20, further comprising: receiving additional SCI from the second wireless device via a sidelink control channel of the sidelink communication link, wherein receiving the SCI is based at least in part on receiving the additional SCI.

Aspect 22: The method of aspect 21, wherein the additional SCI is in a first SCI format, and the SCI is in a second SCI format different from the first SCI format.

Aspect 23: The method of any of aspects 1 through 22, further comprising: identifying that the first wireless device is configured to transmit a HARQ message to the second wireless device via a sidelink feedback channel of the sidelink communication link; and multiplexing the HARQ message with the uplink transmission without transmitting the HARQ message via the sidelink feedback channel.

Aspect 24: The method of aspect 23, further comprising: identifying that a payload size of the HARQ message is less than or equal to a threshold payload size, wherein multiplexing the HARQ message with the uplink transmission is based at least in part on identifying that the payload size is less than or equal to the threshold payload size.

Aspect 25: The method of aspect 24, further comprising: identifying the payload size of the HARQ message based at least in part on a periodicity of transmissions performed via the sidelink feedback channel.

Aspect 26: The method of any of aspects 1 through 25, further comprising: identifying that the first wireless device is configured to transmit a HARQ message to the second wireless device via a sidelink feedback channel of the sidelink communication link; and transmitting at least a first portion of the HARQ message to the second wireless device via the sidelink feedback channel of the sidelink communication link, wherein the uplink transmission is transmitted on a channel which is different from the sidelink feedback channel.

Aspect 27: The method of aspect 26, further comprising: transmitting at least a second portion of the HARQ message to the second wireless device via the uplink transmission.

Aspect 28: The method of any of aspects 26 through 27, wherein transmission of the uplink transmission at least partially overlaps with the sidelink feedback channel.

Aspect 29: The method of aspect 28, wherein the sidelink feedback channel punctures the uplink transmission.

Aspect 30: The method of any of aspects 1 through 29, further comprising: receiving, from a third wireless device, a control message indicating a set of sidelink resources to be used for the sidelink communication link, wherein the uplink transmission is transmitted within at least a subset of the set of sidelink resources.

Aspect 31: A method for wireless communication at a second wireless device, comprising: transmitting, to a first wireless device via a sidelink communication link, SCI scheduling an uplink transmission from the first wireless device to the second wireless device, where the second wireless device includes a central node in a star topology sidelink network and the first wireless device includes a peripheral node in the star topology sidelink network; and receiving the uplink transmission from the first wireless device via the sidelink communication link in accordance with the SCI.

Aspect 32: The method of aspect 31, further comprising: transmitting, to the first wireless device, an RRC message that indicates a set of sidelink resources of the sidelink communication link which are dedicated for reception of UCI or transmission of DCI, wherein the uplink transmission is received via at least a portion of the set of sidelink resources.

Aspect 33: The method of aspect 32, further comprising: transmitting, via the SCI, an indication of a subset of the set of sidelink resources to be used for transmitting the uplink transmission.

Aspect 34: The method of any of aspects 32 through 33, wherein the set of sidelink resources which are dedicated for transmission of UCI or reception of DCI span a first quantity of PRBs at a first boundary of a sidelink BWP.

Aspect 35: The method of aspect 34, wherein the first quantity of PRBs span less than a full subchannel in a frequency domain.

Aspect 36: The method of any of aspects 34 through 35, wherein the set of sidelink resources which are dedicated for transmission of UCI or reception of DCI span a second quantity of PRBs at an additional boundary of the sidelink BWP, the additional boundary opposite the first boundary in a frequency domain with respect to the sidelink BWP.

Aspect 37: The method of any of aspects 34 through 36, wherein the set of sidelink resources which are dedicated for transmission of UCI or reception of DCI span a second quantity of PRBs, the first quantity of PRBs and the second quantity of PRBs are separated by at least one subchannel in a frequency domain.

Aspect 38: The method of any of aspects 32 through 37, further comprising: transmitting an additional RRC message that indicates a sidelink BWP configured for sidelink communications, wherein the RRC message which indicates the set of sidelink resources which are dedicated for transmission of UCI or reception of DCI reclaims the set of sidelink resources from the sidelink BWP.

Aspect 39: The method of any of aspects 31 through 38, further comprising: transmitting, via the SCI, an indication of a set of sidelink resources to be used for transmitting the uplink transmission, wherein the uplink transmission is received via at least a portion of the set of sidelink resources.

Aspect 40: The method of aspect 39, wherein the indication of the set of sidelink resources is included in one or more bit fields associated with an allocation of time resources, one or more bit fields associated with an allocation of frequency resources, or both.

Aspect 41: The method of any of aspects 31 through 40, further comprising: transmitting, via the SCI, one or more bit field values associated with enabling or disabling CSI reporting; and receiving, via the uplink transmission, a CSI report associated with the sidelink communication link based at least in part on a value of the one or more bit field values.

Aspect 42: The method of any of aspects 31 through 41, further comprising: transmitting, to the first wireless device, an RRC message that indicates a relationship between a first set of sidelink resources for transmitting the SCI and a second set of sidelink resources for receiving the uplink transmission, wherein receiving the uplink transmission is based at least in part on the relationship.

Aspect 43: The method of any of aspects 31 through 42, further comprising: transmitting, to the first wireless device, an RRC message comprising an indication of one or more parameters associated with transmission of the uplink transmission, wherein receiving the uplink transmission is in accordance with the one or more parameters.

Aspect 44: The method of aspect 43, wherein the one or more parameters comprise a bundling size associated with the uplink transmission, an interleaving configuration, a frequency hopping configuration, a periodicity, or any combination thereof.

Aspect 45: The method of any of aspects 31 through 44, further comprising: transmitting, via the SCI, an indication to transmit the uplink transmission periodically, aperiodically, semi-persistently, or any combination thereof, wherein the uplink transmission is transmitted in accordance with the indication.

Aspect 46: The method of any of aspects 31 through 45, further comprising: transmitting, via the SCI, an indication of a time interval between transmission of the SCI and reception of the uplink transmission, wherein receiving the uplink transmission is in accordance with the time interval.

Aspect 47: The method of any of aspects 31 through 46, further comprising: transmitting, via the SCI, an indication of a format to be used for the uplink transmission, wherein the uplink transmission is generated based at least in part on the format.

Aspect 48: The method of aspect 47, wherein the format includes one or more fields for indicating a frequency hopping configuration, a repetition configuration, an OCC, or any combination thereof.

Aspect 49: The method of any of aspects 31 through 48, wherein the uplink transmission comprises an UCI message, an uplink data message, or both.

Aspect 50: The method of any of aspects 31 through 49, wherein the SCI is transmitted via a sidelink shared channel of the sidelink communication link.

Aspect 51: The method of any of aspects 31 through 50, further comprising: transmitting additional SCI to the first wireless device via a sidelink control channel of the sidelink communication link, wherein transmitting the SCI is based at least in part on transmitting the additional SCI.

Aspect 52: The method of aspect 51, wherein the additional SCI is in a first SCI format, and the SCI is in a second SCI format different from the first SCI format.

Aspect 53: The method of any of aspects 31 through 52, further comprising: identifying that the first wireless device is configured to transmit a HARQ message to the second wireless device via a sidelink feedback channel of the sidelink communication link; and receiving the HARQ message multiplexed with the uplink transmission without receiving the HARQ message via the sidelink feedback channel.

Aspect 54: The method of aspect 53, further comprising: identifying that a payload size of the HARQ message is less than or equal to a threshold payload size, wherein receiving the HARQ message multiplexed with the uplink transmission is based at least in part on identifying that the payload size is less than or equal to the threshold payload size.

Aspect 55: The method of aspect 54, further comprising: identifying the payload size of the HARQ message based at least in part on a periodicity of transmissions performed via the sidelink feedback channel.

Aspect 56: The method of any of aspects 31 through 55, further comprising: identifying that the first wireless device is configured to transmit a HARQ message to the second wireless device via a sidelink feedback channel of the sidelink communication link; and receiving at least a first portion of the HARQ message from the first wireless device via the sidelink feedback channel of the sidelink communication link, wherein the uplink transmission is received on a channel which is different from the sidelink feedback channel.

Aspect 57: The method of aspect 56, further comprising: receiving at least a second portion of the HARQ message from the first wireless device via the uplink transmission.

Aspect 58: The method of any of aspects 56 through 57, wherein reception of the uplink transmission at least partially overlaps with the sidelink feedback channel.

Aspect 59: The method of aspect 58, wherein the sidelink feedback channel punctures the uplink transmission.

Aspect 60: The method of any of aspects 31 through 59, further comprising: receiving, from a third wireless device, a control message indicating a set of sidelink resources to be used for the sidelink communication link; and transmitting, to the first wireless device, an indication of at least a subset of the set of sidelink resources which are to be used for transmission of the uplink transmission based at least in part on receiving the control message, wherein the uplink transmission is received within the at least the subset of the set of sidelink resources.

Aspect 61: The method of any of aspects 31 through 60, further comprising: monitoring the sidelink communication link; determining a set of sidelink resources to be used for the sidelink communication link based at least in part on the monitoring; and transmitting, to the first wireless device, an indication of at least a subset of the set of sidelink resources which are to be used for transmission of the uplink transmission based at least in part on the determining, wherein the uplink transmission is received within the at least the subset of the set of sidelink resources.

Aspect 62: A method for wireless communication at a first wireless device, comprising: receiving, from a second wireless device via a sidelink communication link, a downlink transmission scheduling an additional transmission between the first wireless device and the second wireless device, the downlink transmission received within a set of sidelink resources of the sidelink communication link which are dedicated for reception of DCI or transmission of UCI, where the second wireless device includes a central node in a star topology sidelink network and the first wireless device includes a peripheral node in the star topology sidelink network; generating the additional transmission based at least in part on the downlink transmission; and communicating with the second wireless device via the additional transmission on the sidelink communication link in accordance with the downlink transmission.

Aspect 63: The method of aspect 62, further comprising: receiving an RRC message that indicates the set of sidelink resources of the sidelink communication link which are dedicated for transmission of UCI or reception of DCI.

Aspect 64: The method of any of aspects 62 through 63, further comprising: receiving a control message indicating a set of resources for receiving the downlink transmission; and monitoring the set of resources based at least in part on the control message, wherein receiving the downlink transmission is based at least in part on the monitoring.

Aspect 65: The method of any of aspects 62 through 64, further comprising: determining that the first wireless device is associated with an identifier; and determining that the downlink transmission is addressed to the first wireless device via the identifier.

Aspect 66: The method of aspect 65, further comprising: receiving a cyclic redundancy portion of the downlink transmission which is scrambled by the identifier; and demodulating the cyclic redundancy portion of the downlink transmission based at least in part on the identifier, wherein generating the uplink transmission is based at least in part on demodulating the cyclic redundancy portion.

Aspect 67: The method of any of aspects 65 through 66, further comprising: receiving an indication of the identifier via the downlink transmission.

Aspect 68: The method of any of aspects 65 through 67, wherein the identifier comprises a sidelink reception identifier, a UE identifier assigned by the second wireless device, or both.

Aspect 69: The method of any of aspects 65 through 68, wherein the identifier is associated with a reception opportunity for downlink transmissions which is monitored by the first wireless device.

Aspect 70: The method of any of aspects 62 through 69, further comprising: receiving, from the second wireless device, a control message allocating a set of resources for a plurality of transmissions between the first wireless device and the second wireless device; and receiving, via the downlink transmission, an indication to perform at least a subset of the plurality of transmissions, wherein generating the uplink transmission is based at least in part on receiving the indication.

Aspect 71: The method of any of aspects 62 through 70, wherein the downlink transmission is received in a first transmission time interval, the method further comprising: receiving, via the downlink transmission, an indication of a format associated with one or more transmission time intervals subsequent to the first transmission time interval, wherein generating the uplink transmission is based at least in part on the indication.

Aspect 72: The method of any of aspects 62 through 71, further comprising: receiving a control message indicating a format associated with one or more transmission time intervals associated with the sidelink communication link; and monitoring the sidelink communication link based at least in part on the format associated with the one or more transmission time intervals, wherein the downlink transmission is received based at least in part on the monitoring.

Aspect 73: The method of any of aspects 62 through 72, wherein the downlink transmission spans a set of symbols of the set of sidelink resources in a time domain, and a set of PRBs of the set of sidelink resources in a frequency domain.

Aspect 74: The method of any of aspects 62 through 73, wherein the downlink transmission spans a slot of the set of sidelink resources in a time domain, and a set of PRBs of the set of sidelink resources in a frequency domain.

Aspect 75: The method of any of aspects 62 through 74, wherein the downlink transmission is associated with a plurality of OCCs, generating the additional transmission is based at least in part on an OCC of the plurality of OCCs being associated with the first wireless device.

Aspect 76: The method of any of aspects 62 through 75, wherein the downlink transmission is multiplexed with a sidelink shared channel transmission.

Aspect 77: The method of aspect 76, wherein the downlink transmission comprises an indication that the downlink transmission is multiplexed with the sidelink shared channel transmission.

Aspect 78: The method of any of aspects 62 through 77, wherein the downlink transmission comprises a common downlink transmission which is transmitted by the second wireless device to a set of wireless devices including the first wireless device.

Aspect 79: The method of any of aspects 62 through 78, wherein the downlink transmission comprises a first format associated with DCI messages, a second format associated with DCI messages, a third format associated with DCI messages, or any combination thereof.

Aspect 80: The method of any of aspects 62 through 79, wherein the downlink transmission comprises a DCI message, and the additional transmission comprises an UCI message, an uplink data message, a downlink data message, or any combination thereof.

Aspect 81: A method for wireless communication at a second wireless device, comprising: transmitting, to a first wireless device via a sidelink communication link, a downlink transmission scheduling an additional transmission between the first wireless device and the second wireless device, wherein the downlink transmission is transmitted within a set of sidelink resources of the sidelink communication link which are dedicated for transmission of DCI or reception of UCI, where the second wireless device includes a central node in a star topology sidelink network and the first wireless device includes a peripheral node in the star topology sidelink network; and communicating with the first wireless device via the additional transmission on the sidelink communication link in accordance with the downlink transmission.

Aspect 82: The method of aspect 81, further comprising: transmitting an RRC message that indicates the set of sidelink resources of the sidelink communication link which are dedicated for transmission of UCI or reception of DCI.

Aspect 83: The method of any of aspects 81 through 82, further comprising: transmitting a control message indicating a set of resources for transmitting the downlink transmission, wherein the downlink transmission is transmitted within the set of resources.

Aspect 84: The method of any of aspects 81 through 83, further comprising: determining that the first wireless device is associated with an identifier; and determining that the downlink transmission is addressed to the first wireless device via the identifier.

Aspect 85: The method of aspect 84, further comprising: transmitting a cyclic redundancy portion of the downlink transmission which is scrambled by the identifier.

Aspect 86: The method of any of aspects 84 through 85, further comprising: transmitting an indication of the identifier via the downlink transmission.

Aspect 87: The method of any of aspects 84 through 86, wherein the identifier comprises a sidelink reception identifier, a UE identifier assigned by the second wireless device, or both.

Aspect 88: The method of any of aspects 84 through 87, wherein the identifier is associated with a reception opportunity for downlink transmissions which is monitored by the first wireless device.

Aspect 89: The method of any of aspects 81 through 88, further comprising: transmitting, to the first wireless device, a control message allocating a set of resources for a plurality of transmissions between the first wireless device and the second wireless device; and transmitting, via the downlink transmission, an indication to perform at least a subset of the plurality of transmissions.

Aspect 90: The method of any of aspects 81 through 89, wherein the downlink transmission is transmitted in a first transmission time interval, the method further comprising: transmitting, via the downlink transmission, an indication of a format associated with one or more transmission time intervals subsequent to the first transmission time interval.

Aspect 91: The method of any of aspects 81 through 90, further comprising: transmitting a control message indicating a format associated with one or more transmission time intervals associated with the sidelink communication link, wherein the downlink transmission is transmitted in accordance with the format associated with the one or more transmission time intervals.

Aspect 92: The method of any of aspects 81 through 91, wherein the downlink transmission spans a set of symbols of the set of sidelink resources in a time domain, and a set of PRBs of the set of sidelink resources in a frequency domain.

Aspect 93: The method of any of aspects 81 through 92, wherein the downlink transmission spans a slot of the set of sidelink resources in a time domain, and a set of PRBs of the set of sidelink resources in a frequency domain.

Aspect 94: The method of any of aspects 81 through 93, wherein the downlink transmission is associated with a plurality of OCCs including an OCC associated with the first wireless device.

Aspect 95: The method of any of aspects 81 through 94, wherein the downlink transmission is multiplexed with a sidelink shared channel transmission.

Aspect 96: The method of aspect 95, wherein the downlink transmission comprises an indication that the downlink transmission is multiplexed with the sidelink shared channel transmission.

Aspect 97: The method of any of aspects 81 through 96, wherein the downlink transmission comprises a common downlink transmission which is transmitted by the second wireless device to a set of wireless devices including the first wireless device.

Aspect 98: The method of any of aspects 81 through 97, wherein the downlink transmission comprises a first format associated with DCI messages, a second format associated with DCI messages, a third format associated with DCI messages, or any combination thereof.

Aspect 99: The method of any of aspects 81 through 98, wherein the downlink transmission comprises a DCI message, and the additional transmission comprises an UCI message, an uplink data message, a downlink data message, or any combination thereof.

Aspect 100: An apparatus for wireless communication at a first wireless device, comprising a processor; memory coupled with the processor; and instructions stored in the memory and executable by the processor to cause the apparatus to perform a method of any of aspects 1 through 30.

Aspect 101: An apparatus for wireless communication at a first wireless device, comprising at least one means for performing a method of any of aspects 1 through 30.

Aspect 102: A non-transitory computer-readable medium storing code for wireless communication at a first wireless device, the code comprising instructions executable by a processor to perform a method of any of aspects 1 through 30.

Aspect 103: An apparatus for wireless communication at a second wireless device, comprising a processor; memory coupled with the processor; and instructions stored in the memory and executable by the processor to cause the apparatus to perform a method of any of aspects 31 through 61.

Aspect 104: An apparatus for wireless communication at a second wireless device, comprising at least one means for performing a method of any of aspects 31 through 61.

Aspect 105: A non-transitory computer-readable medium storing code for wireless communication at a second wireless device, the code comprising instructions executable by a processor to perform a method of any of aspects 31 through 61.

Aspect 106: An apparatus for wireless communication at a first wireless device, comprising a processor; memory coupled with the processor; and instructions stored in the memory and executable by the processor to cause the apparatus to perform a method of any of aspects 62 through 80.

Aspect 107: An apparatus for wireless communication at a first wireless device, comprising at least one means for performing a method of any of aspects 62 through 80.

Aspect 108: A non-transitory computer-readable medium storing code for wireless communication at a first wireless device, the code comprising instructions executable by a processor to perform a method of any of aspects 62 through 80.

Aspect 109: An apparatus for wireless communication at a second wireless device, comprising a processor; memory coupled with the processor; and instructions stored in the memory and executable by the processor to cause the apparatus to perform a method of any of aspects 81 through 99.

Aspect 110: An apparatus for wireless communication at a second wireless device, comprising at least one means for performing a method of any of aspects 81 through 99.

Aspect 111: A non-transitory computer-readable medium storing code for wireless communication at a second wireless device, the code comprising instructions executable by a processor to perform a method of any of aspects 81 through 99.

It should be noted that the methods described herein describe possible implementations, and that the operations and the steps may be rearranged or otherwise modified and that other implementations are possible. Further, aspects from two or more of the methods may be combined.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special-purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an example step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in block diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. An apparatus for wireless communication at a first wireless device, comprising:
   one or more processors;
   one or more memories coupled with the one or more processors; and
   instructions stored in the one or more memories and executable by the one or more processors to cause the apparatus to:
   receive, from a second wireless device via a sidelink communication link between the first wireless device and the second wireless device, a control message comprising a first indication of one or more parameters associated with transmission of an uplink transmission and a second indication of a set of sidelink resources of the sidelink communication link that are dedicated for transmission of uplink control information or reception of downlink control information;
   receive, from the second wireless device via the sidelink communication link, a sidelink control information scheduling the uplink transmission from the first wireless device to the second wireless device via the sidelink communication link, wherein the second wireless device comprises a central node in a star topology sidelink network and the first wireless device comprises a peripheral node in the star topology sidelink network and wherein the sidelink control information is a downlink transmission from the second wireless device to the first wireless device via the sidelink communication link;
   generate the uplink transmission based at least in part on the sidelink control information; and
   transmit the uplink transmission to the second wireless device via the sidelink communication link in accordance with the sidelink control information and in accordance with the control message, the uplink transmission being transmitted via at least a portion of the set of sidelink resources.

2. The apparatus of claim 1, wherein the instructions are further executable by the one or more processors to cause the apparatus to:
   receive, from the second wireless device, a base station, or both, a radio resource control message that indicates the set of sidelink resources of the sidelink communication link which are dedicated for the transmission of uplink control information or the reception of downlink control information.

3. The apparatus of claim 2, wherein the instructions are further executable by the one or more processors to cause the apparatus to:
   receive, via the sidelink control information, an indication of a subset of the set of sidelink resources to be used for transmitting the uplink transmission.

4. The apparatus of claim 2, wherein the set of sidelink resources which are dedicated for the transmission of uplink control information or the reception of downlink control information spans a first quantity of physical resource blocks at a first boundary of a sidelink bandwidth part.

5. The apparatus of claim 4, wherein the first quantity of physical resource blocks spans less than a full subchannel in a frequency domain.

6. The apparatus of claim 4, wherein the set of sidelink resources which are dedicated for the transmission of uplink control information or the reception of downlink control information spans a second quantity of physical resource blocks at an additional boundary of the sidelink bandwidth part, the additional boundary opposite the first boundary in a frequency domain with respect to the sidelink bandwidth part.

7. The apparatus of claim 4, wherein the set of sidelink resources which are dedicated for the transmission of uplink control information or the reception of downlink control information spans a second quantity of physical resource blocks, and wherein the first quantity of physical resource blocks and the second quantity of physical resource blocks are separated by at least one subchannel in a frequency domain.

8. The apparatus of claim 2, wherein the instructions are further executable by the one or more processors to cause the apparatus to:
receive an additional radio resource control message that indicates a sidelink bandwidth part configured for sidelink communications, wherein the radio resource control message which indicates the set of sidelink resources which are dedicated for the transmission of uplink control information or the reception of downlink control information reclaims the set of sidelink resources from the sidelink bandwidth part.

9. The apparatus of claim 1, wherein the instructions are further executable by the one or more processors to cause the apparatus to:
receive, via the sidelink control information, an indication of a set of sidelink resources to be used for transmitting the uplink transmission, wherein the uplink transmission is transmitted via at least a portion of the set of sidelink resources.

10. The apparatus of claim 9, wherein the indication of the set of sidelink resources is included in one or more bit fields associated with an allocation of time resources, one or more bit fields associated with an allocation of frequency resources, or both.

11. The apparatus of claim 1, wherein the instructions are further executable by the one or more processors to cause the apparatus to:
receive, via the sidelink control information, one or more bit field values associated with enabling or disabling channel state information reporting; and
transmit, via the uplink transmission, a channel state information report associated with the sidelink communication link based at least in part on a value of the one or more bit field values.

12. The apparatus of claim 1, wherein the instructions are further executable by the one or more processors to cause the apparatus to:
receive a radio resource control message that indicates a relationship between a first set of sidelink resources for receiving the sidelink control information and a second set of sidelink resources for transmitting the uplink transmission, wherein transmitting the uplink transmission is based at least in part on the relationship.

13. The apparatus of claim 1, wherein the instructions are further executable by the one or more processors to cause the apparatus to:
receive a radio resource control message comprising the control message.

14. The apparatus of claim 1, wherein the one or more parameters indicated via the control message comprise a bundling size associated with the uplink transmission, an interleaving configuration, a frequency hopping configuration, a periodicity, or any combination thereof.

15. The apparatus of claim 1, wherein the instructions are further executable by the one or more processors to cause the apparatus to:
receive, via the sidelink control information, an indication to transmit the uplink transmission periodically, aperiodically, semi-persistently, or any combination thereof, wherein the uplink transmission is transmitted in accordance with the indication.

16. The apparatus of claim 1, wherein the instructions are further executable by the one or more processors to cause the apparatus to:
receive, via the sidelink control information, an indication of a time interval between reception of the sidelink control information and transmission of the uplink transmission, wherein transmitting the uplink transmission is in accordance with the time interval.

17. The apparatus of claim 1, wherein the instructions are further executable by the one or more processors to cause the apparatus to:
receive, via the sidelink control information, an indication of a format to be used for the uplink transmission, wherein generating the uplink transmission is based at least in part on the format.

18. The apparatus of claim 17, wherein the format includes one or more fields for indicating a frequency hopping configuration, a repetition configuration, an orthogonal cover code, or any combination thereof.

19. The apparatus of claim 1, wherein the uplink transmission comprises an uplink control information message, an uplink data message, or both.

20. The apparatus of claim 1, wherein the sidelink control information is received via a sidelink shared channel of the sidelink communication link.

21. The apparatus of claim 1, wherein the instructions are further executable by the one or more processors to cause the apparatus to:
receive additional sidelink control information from the second wireless device via a sidelink control channel of the sidelink communication link, wherein receiving the sidelink control information is based at least in part on receiving the additional sidelink control information.

22. The apparatus of claim 21, wherein the additional sidelink control information is in a first sidelink control information format, and wherein the sidelink control information is in a second sidelink control information format different from the first sidelink control information format.

23. The apparatus of claim 1, wherein the instructions are further executable by the one or more processors to cause the apparatus to:
identify that the first wireless device is configured to transmit a hybrid automatic repeat request message to the second wireless device via a sidelink feedback channel of the sidelink communication link; and
multiplex the hybrid automatic repeat request message with the uplink transmission without transmitting the hybrid automatic repeat request message via the sidelink feedback channel.

24. The apparatus of claim 23, wherein the instructions are further executable by the one or more processors to cause the apparatus to:
identify that a payload size of the hybrid automatic repeat request message is less than or equal to a threshold payload size, wherein multiplexing the hybrid automatic repeat request message with the uplink transmission is based at least in part on identifying that the payload size is less than or equal to the threshold payload size.

25. The apparatus of claim 24, wherein the instructions are further executable by the one or more processors to cause the apparatus to:

identify the payload size of the hybrid automatic repeat request message based at least in part on a periodicity of transmissions performed via the sidelink feedback channel.

26. The apparatus of claim 1, wherein the instructions are further executable by the one or more processors to cause the apparatus to:

identify that the first wireless device is configured to transmit a hybrid automatic repeat request message to the second wireless device via a sidelink feedback channel of the sidelink communication link; and transmit at least a first portion of the hybrid automatic repeat request message to the second wireless device via the sidelink feedback channel of the sidelink communication link, wherein the uplink transmission is transmitted on a channel which is different from the sidelink feedback channel.

27. The apparatus of claim 1, wherein the instructions are further executable by the one or more processors to cause the apparatus to:

receive, from a third wireless device, a control message indicating a set of sidelink resources to be used for the sidelink communication link, wherein the uplink transmission is transmitted within at least a subset of the set of sidelink resources.

28. An apparatus for wireless communication at a second wireless device, comprising:

one or more processors;

one or more memories coupled with the one or more processors; and instructions stored in the one or more memories and executable by the one or more processors to cause the apparatus to:

transmit, to a first wireless device via a sidelink communication link between the first wireless device and the second wireless device, a control message comprising a first indication of one or more parameters associated with transmission of an uplink transmission and a second indication of a set of sidelink resources of the sidelink communication link that are dedicated for transmission of downlink control information or reception of uplink control information;

transmit, to the first wireless device via the sidelink communication link, a sidelink control information scheduling the uplink transmission from the first wireless device to the second wireless device via the sidelink communication link, wherein the second wireless device comprises a central node in a star topology sidelink network and the first wireless device comprises a peripheral node in the star topology sidelink network and wherein the sidelink control information is a downlink transmission from the second wireless device to the first wireless device via the sidelink communication link; and receive the uplink transmission from the first wireless device via the sidelink communication link in accordance with the sidelink control information and in accordance with the control message, the uplink transmission being received via at least a portion of the set of sidelink resources.

29. An apparatus for wireless communication at a first wireless device, comprising:

one or more processors;

one or more memories coupled with the one or more processors; and instructions stored in the one or more memories and executable by the one or more processors to cause the apparatus to:

receive, from a second wireless device via a sidelink communication link between the first wireless device and the second wireless device, a control message comprising a first indication of one or more parameters associated with transmission of an additional transmission between the first wireless device and the second wireless device via the sidelink communication link and a second indication of a set of sidelink resources of the sidelink communication link that are dedicated for reception of downlink control information or transmission of uplink control information;

receive, from the second wireless device via the sidelink communication link, a downlink transmission scheduling the additional transmission, the downlink transmission received within the set of sidelink resources of the sidelink communication link which are dedicated for the reception of downlink control information or the transmission of uplink control information, wherein the second wireless device comprises a central node in a star topology sidelink network and the first wireless device comprises a peripheral node in the star topology sidelink network;

generate the additional transmission based at least in part on the downlink transmission; and communicate with the second wireless device via the additional transmission on the sidelink communication link in accordance with the downlink transmission and in accordance with the control message.

30. The apparatus of claim 29, wherein the instructions are further executable by the one or more processors to cause the apparatus to:

receive a radio resource control message that indicates the set of sidelink resources of the sidelink communication link which are dedicated for the transmission of uplink control information or the reception of downlink control information.

31. The apparatus of claim 29, wherein the instructions are further executable by the one or more processors to cause the apparatus to:

receive a control message indicating a set of resources for receiving the downlink transmission; and monitor the set of resources based at least in part on the control message, wherein receiving the downlink transmission is based at least in part on the monitoring.

32. The apparatus of claim 29, wherein the instructions are further executable by the one or more processors to cause the apparatus to:

determine that the first wireless device is associated with an identifier; and determine that the downlink transmission is addressed to the first wireless device via the identifier.

33. The apparatus of claim 32, wherein the instructions are further executable by the one or more processors to cause the apparatus to:

receive a cyclic redundancy portion of the downlink transmission which is scrambled by the identifier; and demodulate the cyclic redundancy portion of the downlink transmission based at least in part on the identifier, wherein generating the additional transmission is based at least in part on demodulating the cyclic redundancy portion.

34. The apparatus of claim 32, wherein the instructions are further executable by the one or more processors to cause the apparatus to:
receive an indication of the identifier via the downlink transmission.

35. The apparatus of claim 32, wherein the identifier comprises a sidelink reception identifier, a user equipment (UE) identifier assigned by the second wireless device, or both.

36. The apparatus of claim 32, wherein the identifier is associated with a reception opportunity for downlink transmissions which is monitored by the first wireless device.

37. The apparatus of claim 29, wherein the instructions are further executable by the one or more processors to cause the apparatus to:
receive, from the second wireless device, a control message allocating a set of resources for a plurality of transmissions between the first wireless device and the second wireless device; and
receive, via the downlink transmission, an indication to perform at least a subset of the plurality of transmissions, wherein generating the additional transmission is based at least in part on receiving the indication.

38. The apparatus of claim 29, wherein the downlink transmission is received in a first transmission time interval, wherein the instructions are further executable by the one or more processors to cause the apparatus to:
receive, via the downlink transmission, an indication of a format associated with one or more transmission time intervals subsequent to the first transmission time interval, wherein generating the additional transmission is based at least in part on the indication.

39. The apparatus of claim 29, wherein the instructions are further executable by the one or more processors to cause the apparatus to:
receive a control message indicating a format associated with one or more transmission time intervals associated with the sidelink communication link; and
monitor the sidelink communication link based at least in part on the format associated with the one or more transmission time intervals, wherein the downlink transmission is received based at least in part on the monitoring.

40. An apparatus for wireless communication at a second wireless device, comprising:
one or more processors;
one or more memories coupled with the processor one or more processors; and
instructions stored in the one or more memories and executable by the one or more processors to cause the apparatus to:
transmit, to a first wireless device via a sidelink communication link between the first wireless device and the second wireless device, a control message comprising a first indication of one or more parameters associated with transmission of an additional transmission between the first wireless device and the second wireless device via the sidelink communication link and a second indication of a set of sidelink resources of the sidelink communication link that are dedicated for transmission of downlink control information or reception of uplink control information;
transmit, to the first wireless device via the sidelink communication link, a downlink transmission scheduling the additional transmission, wherein the downlink transmission is transmitted within the set of sidelink resources of the sidelink communication link which are dedicated for the transmission of downlink control information or the reception of uplink control information, wherein the second wireless device comprises a central node in a star topology sidelink network and the first wireless device comprises a peripheral node in the star topology sidelink network; and
communicate with the first wireless device via the additional transmission on the sidelink communication link in accordance with the downlink transmission and in accordance with the control message.

* * * * *